US011431718B2

(12) United States Patent
Asai et al.

(10) Patent No.: US 11,431,718 B2
(45) Date of Patent: Aug. 30, 2022

(54) TEXT CHAT MANAGEMENT SYSTEM CONNECTED TO A VIDEO CONFERENCE MANAGEMENT SYSTEM

(71) Applicant: Ricoh Company, Ltd., Tokyo (JP)

(72) Inventors: Takahiro Asai, Kanagawa (JP); Osamu Takayasu, Kanagawa (JP); Tatsuya Nagase, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 113 days.

(21) Appl. No.: 16/508,426

(22) Filed: Jul. 11, 2019

(65) Prior Publication Data

US 2019/0334916 A1 Oct. 31, 2019

Related U.S. Application Data

(63) Continuation of application No. 14/872,463, filed on Oct. 1, 2015, now Pat. No. 10,425,418.

(30) Foreign Application Priority Data

Oct. 7, 2014 (JP) ................................ 2014-206230
Jul. 24, 2015 (JP) ................................ 2015-146952

(51) Int. Cl.
*H04L 9/40* (2022.01)
*H04L 65/403* (2022.01)
(Continued)

(52) U.S. Cl.
CPC .......... *H04L 63/102* (2013.01); *G06F 21/31* (2013.01); *H04L 12/1818* (2013.01);
(Continued)

(58) Field of Classification Search
None
See application file for complete search history.

(56) References Cited

U.S. PATENT DOCUMENTS 4,953,159 A * 8/1990 Hayden .............. H04L 12/1813
348/14.08
5,623,490 A * 4/1997 Richter .............. H04L 12/1818
348/E7.081

(Continued)

FOREIGN PATENT DOCUMENTS

JP  2002-330234     11/2002
JP  2015-146952 A   8/2015

OTHER PUBLICATIONS

Rosenberg et al.; SIP: Session Initiation Protocol; 2002; retrieved from the Internet https://tools.ietf.org/pdf/rfc3261.pdf; pp. 1-269, as printed. (Year: 2002).*

(Continued)

*Primary Examiner* — Michael W Chao
(74) *Attorney, Agent, or Firm* — Xsensus LLP

(57) ABSTRACT

An information processing apparatus includes a first communications connector configured to implement first data communications connection between a first transmission terminal specified by first identification information and a second transmission terminal specified by second identification information when authentication of the first transmission terminal is established, an identification information acquisition part configured to acquire third identification information and fourth identification information by referring to correspondence information registering the third identification information in association with the first identification information, and the fourth identification information in association with the second identification information when acquiring a second data communications connecting request including the first identification information and the second identification information from the first transmission terminal, and a connection request part configured to transmit the second data communications connecting request together with the third identification information and the (Continued)

fourth identification information acquired by the identification information acquisition part to another information processing apparatus.

22 Claims, 32 Drawing Sheets

(51) Int. Cl.
    *H04L 65/1073*      (2022.01)
    *H04L 12/18*      (2006.01)
    *H04L 51/046*      (2022.01)
    *H04L 65/1069*      (2022.01)
    *H04L 51/043*      (2022.01)
    *G06F 21/31*      (2013.01)
    *H04L 65/1089*      (2022.01)

(52) U.S. Cl.
    CPC .......... *H04L 51/043* (2013.01); *H04L 51/046* (2013.01); *H04L 63/0815* (2013.01); *H04L 63/104* (2013.01); *H04L 63/105* (2013.01); *H04L 65/1069* (2013.01); *H04L 65/1073* (2013.01); *H04L 65/403* (2013.01); *H04L 63/083* (2013.01); *H04L 65/1089* (2013.01)

(56) References Cited

U.S. PATENT DOCUMENTS

| | | | | |
|---|---|---|---|---|
| 6,094,688 | A * | 7/2000 | Mellen-Garnett | ...... G06F 9/466 718/101 |
| 6,138,144 | A * | 10/2000 | DeSimone | .............. H04L 12/18 709/204 |
| 6,163,796 | A | 12/2000 | Yokomizo | |
| 6,396,840 | B1 * | 5/2002 | Rose | ................... H04L 12/4608 370/401 |
| 6,937,612 | B1 * | 8/2005 | Mauger | .................. H04L 29/06 370/465 |
| 7,487,211 | B2 | 2/2009 | Beavers | |
| 7,620,384 | B2 | 11/2009 | Cai | |
| 7,653,192 | B1 * | 1/2010 | Sylvain | ................. H04M 3/567 379/202.01 |
| 7,653,735 | B2 | 1/2010 | Mandato | |
| 7,735,122 | B1 | 6/2010 | Johnson | |
| 7,890,583 | B2 * | 2/2011 | Castro | ................. H04L 12/1822 709/204 |
| 8,327,428 | B2 * | 12/2012 | Bailey | ..................... G06F 21/31 726/8 |
| 8,388,440 | B2 * | 3/2013 | Patterson | ............... G06Q 30/04 463/29 |
| 8,467,514 | B1 * | 6/2013 | Makhmudov | ..... H04M 3/42365 379/201.1 |
| 8,472,376 | B2 * | 6/2013 | Przybysz | ............ H04L 65/1016 370/328 |
| 8,701,014 | B1 * | 4/2014 | Schlegel | ................. H04L 51/22 715/741 |
| 8,955,079 | B2 | 2/2015 | Mani | |
| 9,130,892 | B2 * | 9/2015 | Singh | ..................... G06Q 30/01 |
| 9,148,512 | B1 * | 9/2015 | Kumar | ................ H04M 3/5166 |
| 9,565,297 | B2 | 2/2017 | Maes | |
| 9,681,095 | B2 * | 6/2017 | Krishnamoorthy | .......................... H04L 65/1069 |
| 10,027,723 | B2 | 7/2018 | Keskitalo | |
| 10,104,174 | B2 | 10/2018 | Anderl | |
| 10,735,552 | B2 * | 8/2020 | Vaish | ....................... H04L 67/32 |
| 11,065,552 | B2 * | 7/2021 | Perlman | ................ H04L 65/403 |
| 11,153,266 | B2 * | 10/2021 | Gutt | ...................... H04L 67/306 |
| 11,159,584 | B2 * | 10/2021 | Tuculescu | ............. H04L 61/307 |
| 2002/0023131 | A1 * | 2/2002 | Wu | ..................... H04M 7/0009 709/205 |
| 2002/0103850 | A1 * | 8/2002 | Moyer | .................. H04L 61/2564 709/202 |
| 2002/0118809 | A1 * | 8/2002 | Eisenberg | ............. H04M 3/567 379/202.01 |
| 2004/0141594 | A1 | 7/2004 | Brunson | |
| 2006/0053380 | A1 * | 3/2006 | Spataro | .................... G06F 16/93 715/753 |
| 2006/0276179 | A1 * | 12/2006 | Ghaffari | .................. H04W 4/16 455/412.2 |
| 2007/0072605 | A1 * | 3/2007 | Poczo | ..................... H04W 8/18 455/461 |
| 2007/0285503 | A1 * | 12/2007 | Asthana | .................. H04L 12/18 348/14.08 |
| 2007/0286101 | A1 * | 12/2007 | Gagne | ..................... H04L 12/66 370/260 |
| 2008/0069011 | A1 * | 3/2008 | Sekaran | ............. H04L 65/4038 370/260 |
| 2008/0086564 | A1 | 4/2008 | Putman | |
| 2008/0120358 | A1 * | 5/2008 | Yano | ................... H04L 65/1069 709/201 |
| 2008/0120381 | A1 * | 5/2008 | Awan | ..................... G06Q 10/10 709/206 |
| 2008/0244610 | A1 | 10/2008 | Zhang | |
| 2008/0261569 | A1 | 10/2008 | Britt | |
| 2008/0271126 | A1 * | 10/2008 | Saraf | ................ H04W 12/0602 726/5 |
| 2009/0158425 | A1 | 6/2009 | Chan | |
| 2009/0209235 | A1 | 8/2009 | Lawler | |
| 2009/0213206 | A1 * | 8/2009 | Niu | ......................... H04N 7/148 348/14.09 |
| 2010/0115598 | A1 | 5/2010 | Barriga | |
| 2010/0199320 | A1 * | 8/2010 | Ramanathan | ...... H04N 21/4516 725/109 |
| 2010/0296640 | A1 | 11/2010 | Stucker | |
| 2011/0087970 | A1 | 4/2011 | Swink | |
| 2011/0103265 | A1 | 5/2011 | Dilipkumar Saklikar | |
| 2011/0119340 | A1 * | 5/2011 | Van Elburg | ....... H04L 29/06027 709/206 |
| 2011/0138453 | A1 | 6/2011 | Verma | |
| 2011/0277025 | A1 | 11/2011 | Counterman | |
| 2011/0289201 | A1 * | 11/2011 | Lochbaum | .......... H04L 65/1053 709/223 |
| 2011/0299675 | A1 | 12/2011 | Stucker | |
| 2012/0045040 | A1 | 2/2012 | Maes | |
| 2012/0087302 | A1 * | 4/2012 | Chaturvedi | ........... H04L 67/104 370/328 |
| 2012/0173736 | A1 * | 7/2012 | Klein | .................... H04L 65/104 709/227 |
| 2012/0246229 | A1 * | 9/2012 | Carr | ...................... H04M 3/565 709/204 |
| 2012/0274725 | A1 * | 11/2012 | Robertson | ............... H04N 7/152 348/14.01 |
| 2013/0174241 | A1 | 7/2013 | Cha | |
| 2013/0290700 | A1 * | 10/2013 | Davis | .................... H04L 9/0894 713/153 |
| 2013/0294595 | A1 | 11/2013 | Michaud | |
| 2014/0130138 | A1 * | 5/2014 | Ma | .......................... H04L 63/08 726/4 |
| 2015/0324526 | A1 * | 11/2015 | Cambray | ............... G16H 10/60 705/3 |
| 2015/0372951 | A1 * | 12/2015 | MacDonald | ........... H04L 51/04 709/206 |
| 2016/0269349 | A1 | 9/2016 | Bolinger | |
| 2018/0224291 | A1 | 8/2018 | Tuukkanen | |
| 2020/0301645 | A1 * | 9/2020 | Furutani | ................ G06F 1/1643 |
| 2022/0086196 | A1 * | 3/2022 | Drose | ................. H04L 65/1069 |

OTHER PUBLICATIONS

Office Action dated Sep. 15, 2020 in corresponding Japanese Patent Application No. 2019-175543, 2 pages.
Japanese Office Action dated Jan. 29, 2019 in Japanese Patent Application No. 2015-146952, 2 pages.
Tasaka, K., et al., "A Session Synchronization Method for Communication Support Among Users", Multimedia, Distribution, Collaboration and Mobility (DOCOMO 20 (2) Symposium), Jul. 2012, pp. 646-653 (with partial English translation).
J. Rosenberg; RFC 3261; SIP: Session Initiation Protocol; 2002; Retrieved from the Internet <URL: https://www.ietf.org/rfc/rfc3261.txt.pdf>; pp. 1-269, as printed.

(56) References Cited

OTHER PUBLICATIONS

Johnston et al; RFC 4579—Session Initiation Protocol (SIP) Call Control—Conferencing for User Agents; 2006; Retrieved from the Internet <URL; https://tools. ietf.org/pdf/rfc4579.pdf>; pp.1-43, as printed. (Year; 2006).

Shekh-Yusef et al., The Session Initiation Protocol (SIP) OAuth draft-yusef-sipcore-sip-oauth-00; May 2014; Retrieved from the Internet <URL: https://tools.ietf.org/pdf/draft-yusef-sipcore-sip-oauth-00.pdf>; pp. 1-18, as printed. (Year: 2014).

Rosenberg et al.; RFC 5360—A Framework for Consent-Based Communications in the Session Initiation Protocol (SIP); 2008; Retrieved from the Internet <URL: https://tools.ietf.org/pdf/rfc5360.pdf>; pp. 1-31; as printed (Year 2008).

Camarillo et al.; RFC 5366—Conference Establishment Using Request-Contained Lists in the Session Initiation Protocol (SIP); 2008; Retrieved from the Internet <URL; https://tools.ietf.org/pdf/rfc5366.pdf>; pp. 1-13, as printed (Year 2008).

Rosenberg et al.; Indicating User Agent Capabilities in the Session Initiation Protocol (SIP); 2004; Retrieved from the Internet <URL; https://tools.ietf.org;/pdf/rfc3840.pdf>; pp. 1-36, as printed. (Year: 2004).

* cited by examiner

FIG.6

| SESSION ID | RELAY APPARATUS ID | REQUEST SOURCE COMMUNICATIONS ID | DESTINATION COMMUNICATIONS ID |
|---|---|---|---|
| se1 | 111a | 02aa | 01ab |
| se2 | 111b | 01ba | 01ca |
| se3 | 111d | 01bb | 01da |
| ... | ... | ... | ... |

FIG.7A

| COMMUNICATIONS ID | DESTINATION LIST |
|---|---|
| 01aa | 01ab@TV CONFERENCE MANAGEMENT SYSTEM, ... |
| 01ab | 01aa@TV CONFERENCE MANAGEMENT SYSTEM, 02AA@TEXT CHAT MANAGEMENT SYSTEM, ... |
| ... | ... |
| 01ba | 01bb@TV CONFERENCE MANAGEMENT SYSTEM, 01ca@TV CONFERENCE MANAGEMENT SYSTEM, ... |
| 01bb | 01ba@TV CONFERENCE MANAGEMENT SYSTEM, 02BB@TEXT CHAT MANAGEMENT SYSTEM, ... |
| ... | ... |

FIG.7B

| USER ID | DESTINATION LIST |
|---|---|
| 02AA | 02AB@TEXT CHAT MANAGEMENT SYSTEM, 01ab@TV CONFERENCE MANAGEMENT SYSTEM, ... |
| 02AB | 02AA@TEXT CHAT MANAGEMENT SYSTEM, ... |
| ... | ... |
| 02BA | 02BB@TEXT CHAT MANAGEMENT SYSTEM, ... |
| 02BB | 02BA@TEXT CHAT MANAGEMENT SYSTEM, 01bb@TV CONFERENCE MANAGEMENT SYSTEM, ... |
| ... | ... |

FIG.8A

| COMMUNICATIONS ID | PASSWORD |
|---|---|
| 01aa | aaaa |
| 01ab | abab |
| 01ba | baba |
| ... | ... |
| 02aa | aabb |
| 02ab | bbaa |
| ... | ... |

FIG.8B

| USER ID | PASSWORD | USER NAME |
|---|---|---|
| 01AA | AAAA | kazu |
| 01AB | ABAB | Hiro |
| 01BA | BABA | TOM |
| 01BB | BBBB | eiko |
| 02AA | AAAA | Mike |
| 02AB | ABAB | Ryu |
| 02BA | BABA | keiko |
| 02BB | BBBB | satoru |

FIG.9

| MANAGEMENT NUMBER | COMMUNICATIONS ID | USER ID |
|---|---|---|
| 1 | 01aa | 01AA |
| 2 | 01ab | 01AB |
| 3 | 01ba | 01BA |
| 4 | 01bb | 01BB |
| 5 | 02aa | 02AA |
| 6 | 02ab | 02AB |
| 7 | 02ba | 02BA |
| 8 | 02bb | 02BB |
| 9 | 02ca | 02CA |

FIG.10

| MANAGER ID | PASSWORD |
|---|---|
| X001 | 999 |
| X002 | 998 |
| X003 | 997 |
| ... | ... |

FIG.11

| SERVICE NAME | MANAGEMENT SYSTEM NAME |
|---|---|
| TV CONFERENCE | TV CONFERENCE MANAGEMENT SYSTEM |
| TEXT CHAT | TEXT CHAT MANAGEMENT SYSTEM |
| ... | ... |

FIG.12

| TERMINAL TYPE NAME | SERVICE NAME |
|---|---|
| TV CONFERENCE-SPECIFIC | TV CONFERENCE |
| GENERAL-PURPOSE | TV CONFERENCE, TEXT CHAT |
| CHAT-SPECIFIC | TEXT CHAT |
| ... | ... |

FIG.13

| COMMUNICATIONS ID /USER ID | NAME | OPERATING STATUS | REPORTING DESTINATION | RECEIVED DATE AND TIME | IP ADDRESS |
|---|---|---|---|---|---|
| 01aa | AA CONFERENCE TERMINAL | ONLINE (COMMUNICATIVE) | – | 2013.11.10.13:40 | 1.2.1.3 |
| 01ab | AB CONFERENCE TERMINAL | OFFLINE | – | 2013.11.09.12:00 | 1.2.1.4 |
| ... | ... | ... | ... | ... | ... |
| 01ba | BA CONFERENCE TERMINAL | ONLINE (ENGAGED) | – | 2013.11.10.13:45 | 1.2.2.3 |
| 01bb | BB CONFERENCE TERMINAL | ONLINE | – | 2013.11.10.13:50 | 1.2.2.4 |
| ... | ... | ... | ... | ... | ... |
| 02AA | AA MOBILE TERMINAL | ONLINE (COMMUNICATIVE) | TV CONFERENCE MANAGEMENT SYSTEM | 2013.11.25.14:30 | 1.4.1.1 |
| 02AB | AB MOBILE TERMINAL | ONLINE (COMMUNICATIVE) | – | 2013.11.25.14:29 | 1.4.1.2 |
| ... | ... | ... | ... | ... | ... |
| 02BA | BA MOBILE TERMINAL | OFFLINE | – | 2013.11.24.13:30 | 1.5.1.1 |
| 02BB | BB MOBILE TERMINAL | ONLINE (COMMUNICATIVE) | TV CONFERENCE MANAGEMENT SYSTEM | 2013.11.15.14:25 | 1.5.1.2 |
| ... | ... | ... | ... | ... | ... |

| NUMBER | USER ID | PASSWORD | SYSTEM ID OF ANOTHER SYSTEM A | SYSTEM ID OF ANOTHER SYSTEM B |
|---|---|---|---|---|
| 1 | 01AA | AAAA | – | – |
| 2 | 01AB | – | 1234 | – |
| 3 | 01BA | BABA | – | 9876 |
| 4 | 01BB | – | – | 8765 |
| 5 | 02AA | – | 3456 | 6543 |
| 6 | 02AB | ABAB | – | – |
| 7 | 02BA | BABA | – | – |
| 8 | 02BB | BBBB | – | – |
| 9 | – | – | 4567 | – |

FIG.28

| NUMBER | COMMUNICATIONS ID | PASSWORD | SYSTEM ID OF ANOTHER SYSTEM A | SYSTEM ID OF ANOTHER SYSTEM B |
|---|---|---|---|---|
| 1 | 01aa | aaaa | – | – |
| 2 | 01ab | abab | 1234 | – |
| 3 | 01ba | baba | – | 9876 |
| 4 | 01bb | bbbb | – | 8765 |
| 5 | 02aa | aaaa | 3456 | 6543 |
| 6 | 02ab | abab | – | – |
| 7 | 02ba | baba | – | – |
| 8 | 02bb | bbbb | – | – |

FIG.31

| REQUEST SOURCE COMMUNICATIONS ID | DESTINATION COMMUNICATIONS ID |
|---|---|
| 02aa | 02ab, ⋯ 02ba, 02bb, ⋯, 02cb, 02da, 02db, ⋯ |
| 04aa | 01ab, 01ba, 01bb, 01ca |
| 01ab | 01ba, 01bb, 01ca⋯ |
| ⋯ | ⋯ |
| 01db | 01aa, ⋯ 01bb, 01cc, ⋯, 01zb, 01xa, 03db, ⋯ |

TEXT CHAT MANAGEMENT SYSTEM CONNECTED TO A VIDEO CONFERENCE MANAGEMENT SYSTEM

CROSS-REFERENCE TO RELATED APPLICATIONS

This application is a continuation of U.S. application Ser. No. 14/872,463, filed Oct. 1, 2015, based upon and claims benefit of priority from Japanese Patent Application No. 2014-206230 filed Oct. 7, 2014 and Japanese Patent Application No. 2015-146952, filed Jul. 24, 2015, the entire contents of which are incorporated herein by reference.

BACKGROUND OF THE INVENTION

1. Field of the Invention

The disclosures discussed herein relate to an information processing apparatus, a communications method, and a system.

2. Description of the Related Art

TV conference systems have been widely used for holding a TV conference between multiple terminal apparatuses via a communications network such as the Internet. In such a TV conference system, one of transmission terminals transmits image data and sound data. The other one of the transmission terminals subsequently receives the transmitted image data and sound data, may display images on a display, or output sound from a speaker to implement a TV conference between the transmission terminals.

In addition, text chat systems have also been widely used for performing a text chat by transmitting and receiving text data between multiple terminal apparatuses via a communications network such as the Internet.

In general, the TV conference system and chat system are mutually independent from each other, and hence users are provided with different IDs and passwords for use in different systems. Accordingly, the users generally manage their IDs and passwords for each of the systems.

In order to improve linking such independent systems, there is proposed a technology to associate phone numbers with respective electronic mail addresses in the two independent systems of electronic mail system and telephone system (e.g., Japanese Laid-open Patent Publication No. 2002-330234, hereinafter referred to as "Patent Document 1"). For example, Patent Document 1 discloses a linking system for associating phone numbers with respective electronic mail addresses in the separate independent electronic mail system and telephone system. In the linking system, a phone number of a communication partner is reported to an electronic mail system after calling or receiving a phone call, and the electronic mail system saves the transmitted or received electronic mails. Subsequently, the electronic mail containing a string corresponding to the phone number of the communication partner in the body of the electronic mail is extracted by searching for the electronic mails saved at the time of calling or receiving the phone call, and the extracted electronic mail is displayed. This linking system registers associated information between the phone number of the communication partner and the address of the extracted electronic mail.

In this linking system, users need to be authenticated with different IDs and passwords for using the independent systems; that is, a first set of an ID and a password is only effective in a first system, and a second set of an ID and a password is only effective in a second system.

For example, the text chat system authenticates a user by using mail address capable of uniquely specifying the user as an ID whereas the TV conference system authenticates the user with an ID uniquely allocated to the user. Hence, when one of the users desires to hold a TV conference with the other user while performing the text chat with the other user, the former user needs to be authenticated by the TV conference system to log in the TV conference system in order to start the TV conference with the latter user.

RELATED ART DOCUMENT

Patent Document

Patent Document 1: Japanese Laid-open Patent Publication No. 2002-330234

SUMMARY OF THE INVENTION

Accordingly, it is a general object in one embodiment of the present invention to provide a technology capable of allowing users to use services of different systems that substantially obviates one or more problems caused by the limitations and disadvantages of the related art.

According to an aspect of embodiments, there is provided an information processing apparatus implementing communications connection between a first transmission terminal and a second transmission terminal. The information processing apparatus includes a first communications connector configured to implement first data communications connection between the first transmission terminal specified by first identification information and the second transmission terminal specified by second identification information when authentication of the first transmission terminal is established; an identification information acquisition part configured to acquire third identification information and fourth identification information by referring to correspondence information registering the third identification information in association with the first identification information, and the fourth identification information in association with the second identification information when acquiring a second data communications connecting request including the first identification information and the second identification information from the first transmission terminal; and a connection request part configured to transmit the second data communications connecting request together with the third identification information and the fourth identification information acquired by the identification information acquisition part to another information processing apparatus.

Other objects, features and advantages of the present invention will become more apparent from the following detailed description when read in conjunction with the accompanying drawings.

BRIEF DESCRIPTION OF THE DRAWINGS

FIG. 6 is a diagram illustrating an example of a session management table;

FIGS. 7A and 7B are diagrams illustrating examples of destination list management tables of the TV conference management system and the text chat management system;

FIGS. 8A and 8B are diagrams illustrating examples of authentication management tables;

FIG. 9 is a diagram illustrating an example of an ID information registration table;

FIG. 10 is a diagram illustrating an example of an authentication management table;

FIG. 11 is a diagram illustrating an example of a service management table;

FIG. 12 is a diagram illustrating an example of a terminal type table;

FIG. 13 is a diagram illustrating an example of an ID management table;

FIG. 28 is a diagram illustrating an example of an authentication management table registering system IDs of other systems;

FIG. 31 is a diagram illustrating another example of the destination list management table;

DETAILED DESCRIPTION OF THE PREFERRED EMBODIMENTS

In the following, a description is given of embodiments with reference to the accompanying drawings.

A transmission system according to an embodiment enables a user to log into another transmission system using one of the IDs of the two transmission systems. That is, the user is able to communicate with a destination terminal in the other transmission system without being aware of the ID of the other transmission system.

Further, the transmission system according to this embodiment also enables the user to log into the transmission system using the ID and password of the other system independent of the former transmission system. The user who has been able to log into the other system is able to communicate with the destination terminal without inputting the ID of the transmission system. Note that examples of the other system include, but are not specifically limited to, Twitter (registered trademark), Google (registered trademark), Facebook (registered trademark), Line (registered trademark), and Yahoo (registered trademark).

In this specification, the ID is defined as follows.

ID of TV conference management system among the transmission systems: A communications ID (used in authentication of a user when the user logs into the TV conference management system). The communications ID is an example of third identification information or fourth identification information. Data (mainly indicating image data, sound data, and display data) transmitted and received in the TV conference are an example of second data.

ID of text chat management system among the transmission systems: A user ID (used in authentication of a user when the user logs into the text chat management system). The user ID is an example of first identification information or second identification information. Data (mainly indicating text data but not being limited to text data) transmitted and received in the text chat are an example of first data.

A manager ID of the transmission system: A manager ID (used in authentication of a manager when the manager logs into the TV conference management system to associate the communications ID with the user ID). ID of another system: A system ID (used in authentication of a user when the user logs into another system). The ID of another system is an example of fifth identification information.

The IDs of the embodiment indicate identification information such as a language, characters, symbols, or various types of marks used for uniquely identifying a transmission terminal or a user of the transmission terminal. Further, the communications ID may be identification information composed of a combination of at least two of the above language, characters, symbols, and marks.

Overall Configuration

Figure 1:
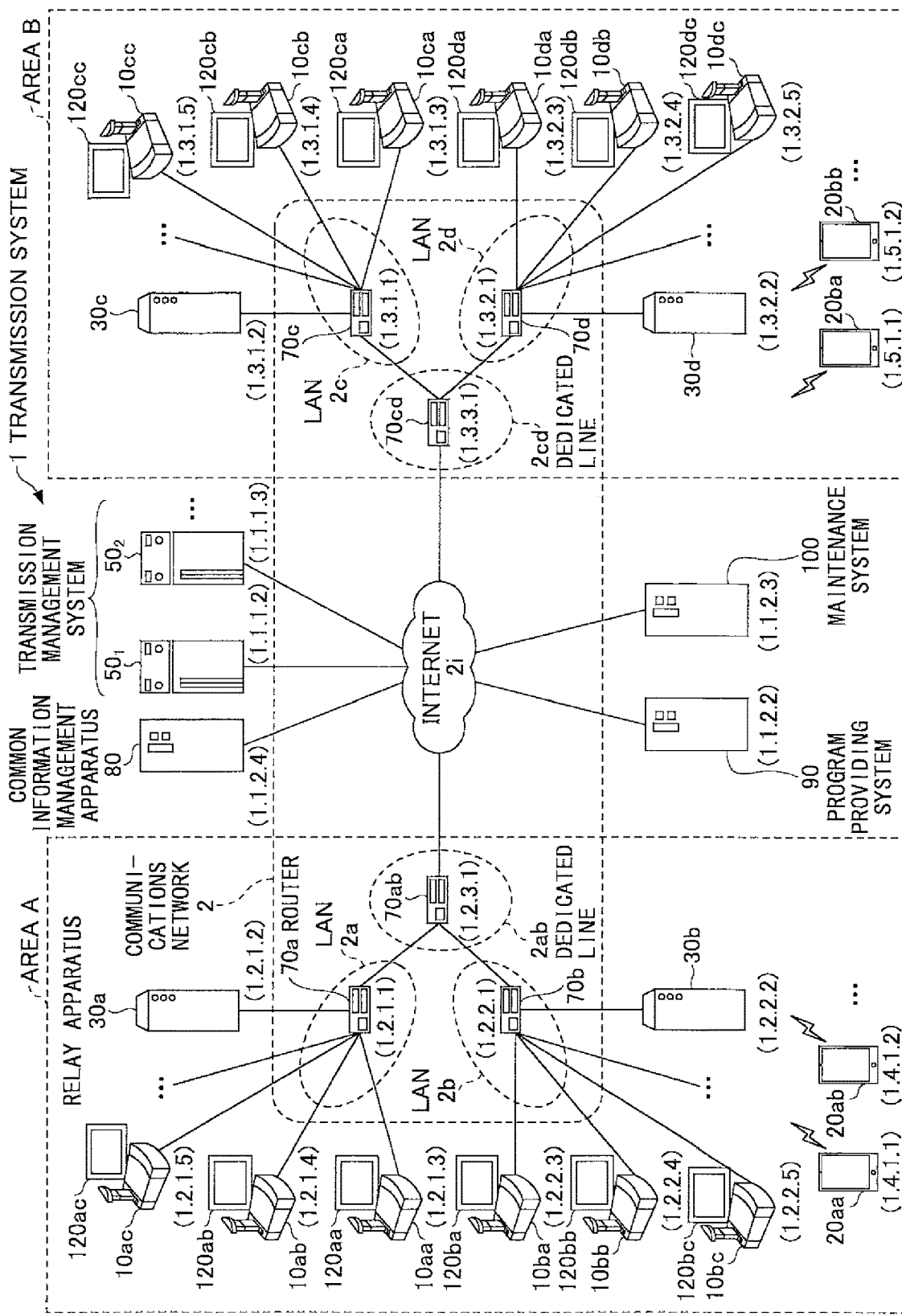
FIG. 1 is a schematic diagram illustrating an example of a transmission system according to an embodiment.

FIG. 1 is a schematic diagram illustrating an example of a transmission system according to an embodiment. Examples of the transmission system include a data providing system configured to transmit content data in one direction from one transmission terminal to another transmission terminal via a transmission management system, or a communications system configured to communicate information, emotions, and the like between two or more transmission terminals via a transmission management system. The communications system is configured to mutually communicate information, emotions, and the like between two or more communication terminals (corresponding to the "transmission terminals") via a communication management system (corresponding to the "transmission management system"). Examples of such a communications system include a TV conference system, a video telephony system, an audio teleconference system, a voice telephony system, a PC (personal computer) screen sharing system, a text chat system, and the like.

In the present embodiment, the transmission system is described as an example of a communications system based on the assumption of a system conducting a TV conference or text chat. That is, the communications system of the embodiment indicates a transmission system capable of providing a TV conference service and a text chat service. Further, in this embodiment, a transmission management system is described based on the assumption of the TV conference management system and the text chat management system serving as an example of the communication management system. Similarly, a transmission terminal is described based on the assumption of a terminal serving as an example of a communication terminal capable of performing one or both of the TV conference and the text chat.

That is, the transmission terminal or the transmission management system of the embodiment is not only applied to the above-described transmission system but is also applied to other communications systems, a data providing system, and the like.

The transmission system 1 illustrated in FIG. 1 includes multiple transmission terminals (10aa, 10ab, . . . , 20aa, 20ab, . . . ), respective displays (120aa, 120ab, . . . ) for the transmission terminals (10aa, 10ab, . . . ), multiple relay apparatuses (30a, 30b, . . . ), multiple transmission management systems ($50_1$, $50_2$, . . . ), a common information management apparatus 80, a program providing system 90, and a maintenance system 100.

The transmission terminals 10 are configured to transmit or receive image data and sound data as an example of content data. That is, the transmission terminals 10 are TV conference terminals capable of utilizing the TV conference service. In this embodiment, the transmission terminals 10 may be TV conference service-specific terminals (TV conference-specific terminals). Hereinafter, the transmission terminals 10 may represent the TV conference-specific terminals 10. The TV conference-specific terminals 10 may be managed by the transmission management system $50_1$ configured to manage calling control of the TV conference service. Note that the TV conference-specific terminal 10 is not necessarily limited to a terminal having hardware itself being specifically configured for the TV conference service but includes a terminal having general-purpose hardware capable of utilizing applications specifically written for the TV conference service.

Further, when the communication management system serves as the audio teleconference system, or the voice telephony system, sound data may be used as an example of content data to be transmitted and received for utilizing the voice telephony service.

On the other hand, the transmission terminals 20 are configured to transmit or receive image data and sound data, or text data as an example of content data. That is, the transmission terminals 20 are terminals capable of utilizing the TV conference or the text chat. In this embodiment, the transmission terminal 20 may be a general-purpose mobile terminal such as a tablet terminal, a mobile phone, and a smartphone capable of utilizing both the TV conference service and the chat service unless otherwise specified. The transmission terminal 20 may be configured to at least utilize the text chat service and is not necessarily configured to utilize the TV conference service. Note that the transmission terminals 20 may, for example, be wirelessly connected to a communications network 2 via a mobile phone communications network or WiFi (wireless fidelity). Hereinafter, the transmission terminals 20 may be represented as the mobile terminals 20. The mobile terminals 20 may be managed by the transmission management system $50_2$ configured to manage calling control of the text chat service.

Note that the above-described TV conference specific terminals 10 and the mobile terminals 20 are examples of the communication terminals. Examples of the communication terminals include various types of electronic apparatuses such as gaming apparatuses, general-purpose PC terminals, car navigation terminals installed on vehicles, projection apparatuses such as projectors, electronic whiteboards, wearable terminals in addition to conference-specific terminals, tablet terminals, mobile phones, and smartphones.

Note that any one of the TV conference-specific terminals (10aa, 10ab, . . . ) may be represented by a "TV conference-specific terminal 10", and any one of the mobile terminals (20aa, 20ab, . . . ) may be represented by a "mobile terminal 20".

Further, any one of the displays (120aa, 120ab, . . . ) may be represented by a "display 120", and any one of the relay apparatuses (30a, 30b, . . . ) may be represented by a "relay apparatus 30". Moreover, any one of the transmission management systems ($50_1$, $50_2$, . . . ) may be represented by a "transmission management system 50". Further, one of the TV conference-specific terminal 10 and the mobile terminal 20 serving as a terminal that requests the other one of the TV conference-specific terminal 10 and the mobile terminal 20 to start a TV conference or the text chat may be represented by a "request source terminal", and a terminal serving as a request destination may be represented by a "destination terminal".

In addition, in the transmission system 1, a management information session (i.e., communications connection) is established between the request source terminal and the destination terminal for transmitting and receiving various types of management information via the transmission management system 50. Further, a session for transmitting and receiving content data via the relay apparatus 30 is established between the request source terminal and the destination terminal. Note that when the content data transmitted and received between the request source terminal and the destination terminal are text data alone, a session is established via the transmission management system 50 between the request source terminal and the destination terminal, or a session may be directly established between the request source terminal and the destination terminal.

Note that in this embodiment, when the TV conference-specific terminal 10 serves as the request source terminal, a session is established via the transmission management system $50_1$. On the other hand, when the mobile terminal 20 serves as the request source terminal, a session is established via the transmission management system $50_2$. Specifically, calling control of the TV conference-specific terminal 10 utilizing the TV conference service alone is managed by the transmission management system $50_1$ whereas calling control of the mobile terminal 20 utilizing the text chat service is managed by the transmission management system $50_2$. In this embodiment, calling control for different services may be managed by different transmission management systems 50. Hence, calling control for any one of the services may be managed by a corresponding one of the transmission management systems 50. In the following, the management system $50_1$ is represented by a "TV conference management system $50_1$", and the management system $50_2$ is represented by a "text chat management system $50_2$". The transmission management system $50_2$ is an example of a first information processing apparatus, and the transmission management system $50_1$ is an example of a second information processing apparatus.

The relay apparatuses 30 illustrated in FIG. 1 are configured to relay content data between the TV conference-specific terminals 10 and the mobile terminals 20.

The transmission management systems 50 are configured to perform login authentication, calling status management and destination list management of the transmission terminals, and calling status management of the relay apparatuses 30. The transmission management system 50 is an example of the information processing apparatus. Further, the above-described management is performed by each of the transmission management systems 50 configured to manage calling control of respective services. Specifically, the login authentication, the calling status management and the destination list management of the TV conference-specific terminals 10, the calling statuses of the relay apparatuses 30, and the like are managed by the TV conference management system $50_1$. On the other hand, the login authentication, the calling status management and the destination list management of the mobile terminals 20, the calling statuses of the relay apparatuses 30, and the like are managed by the text chat management system $50_2$. Note that as described later, status information of the transmission terminals such as calling status management is mutually reported to one another and between the associated transmission management systems 50.

The common information management apparatus 80 includes a DB (database) server or the like configured to manage information common between the transmission management systems 50. The common information management apparatus 80 may be a storage device such as a network storage configured to store information common between the transmission management systems 50. Note that in this embodiment, the common information management apparatus 80 is provided separately from the transmission management systems 50. However, the common information management apparatus 80 may be provided in each of the transmission management systems 50.

Routers ($70a$, $70b$, $70c$, $70d$, $70ab$, and $70cd$) are configured to select an optimal one of routes for the content data. Note that in the following, any one of the routers ($70a$, $70b$, $70c$, $70d$, $70ab$, and $70cd$) is represented by a "router 70".

The program providing system 90 includes a later-described HD (hard disk) 204, and is configured to store terminal-specific programs for causing the TV conference-specific terminals 10 or the mobile terminals 20 to implement various types of functional components or causing the TV conference-specific terminals 10 or the mobile terminals 20 to function as various types of components, and to transmit the terminal-specific programs to the TV conference-specific terminals 10 or the mobile terminals 20. Note that the TV conference-specific terminals 10 and the mobile terminals 20 are configured to transmit different terminal programs, respectively. Specifically, the program providing system 90 is configured to transmit terminal-specific programs for utilizing the TV conference service to the TV conference-specific terminals 10, and to transmit terminal-specific programs for utilizing the TV conference service and the text chat service to the mobile terminals 20. Note that the program providing system 90 may alternatively be configured to transmit the terminal-specific programs for utilizing the text chat service alone to the mobile terminals 20.

The HD 204 of the program providing system 90 is configured to further store relay apparatus-specific programs for causing the relay apparatuses 30 to implement various types of functional components or causing the relay apparatuses 30 to function as various types of components, and to transmit the relay apparatus-specific programs to the relay apparatuses 30. Further, the HD 204 of the program providing system 90 is configured to further store transmission management programs for causing the transmission management systems 50 to implement various types of functional components or causing the transmission management systems 50 to function as various types of components, and to transmit the transmission management programs to the transmission management systems 50. The HD 204 of the program providing system 90 is configured to further store information management programs for causing the common information management apparatus 80 to implement various types of functional components or causing the common information management apparatus 80 to function as various types of components, and to transmit the information management programs to the common information management apparatus 80.

The maintenance system 100 is a computer configured to perform maintenance, management, or support on the TV conference-specific terminals 10, the mobile terminals 20, the relay apparatuses 30, the transmission management systems 50, the common information management apparatus 80, and the program providing system 90. For example, when the maintenance system 100 is located domestically, and the TV conference-specific terminals 10, the mobile terminals 20, the relay apparatuses 30, the transmission management systems 50, the common information management apparatus 80, and the program providing system 90 are located abroad, the maintenance system 100 remotely performs maintenance, management, support, and the like on one or more of the TV conference-specific terminals 10, the mobile terminals 20, the relay apparatuses 30, the transmission management systems 50, the common information management apparatus 80, and the program providing system 90 via the communications network 2. Further, the maintenance system 100 may perform maintenance such as the management of model numbers, manufacturer's serial numbers, customers, maintenance and inspection, the malfunction history, and the like on one or more of the TV conference-specific terminals 10, the mobile terminals 20, the relay apparatuses 30, the transmission management systems 50, the common information management apparatus 80, and the program providing system 90 without being intervened by the communication network 2.

The TV conference-specific terminals (10aa, 10ab, 10ac, ... ), the relay apparatus 30a, and the router 70a are connected to one another via a LAN 2a such that the TV conference-specific terminals (10aa, 10ab, 10ac, ... ), the relay apparatus 30a, and the router 70a may be in communications with one another. The TV conference-specific terminals (10ba, 10bb, 10bc, ... ), the relay apparatus 30b, and the router 70b are connected to one another via a LAN 2b such that the TV conference-specific terminals (10ba, 10bb, 10bc, ... ), the relay apparatus 30b, and the router 70b may be in communications with one another. Moreover, the LAN 2a and the LAN 2b are connected via a dedicated line 2ab including a router 70ab such that the LAN 2a and the LAN 2b may be in communications with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office. Further, the mobile terminals (20aa, 20ab, ... ) are utilized in the area A.

Meanwhile, the TV conference-specific terminals (10ca, 10cb, 10cc, ... ), the relay apparatus 30c, and the router 70c are connected to one another via a LAN 2c such that the TV conference-specific terminals (10ca, 10cb, 10cc, ... ), the relay apparatus 30c, and the router 70c may be in communications with one another. The TV conference-specific terminals (10da, 10dd, 10dc, ... ), the relay apparatus 30d, and the router 70d are connected to one another via a LAN 2d such that the TV conference-specific terminals (10da, 10dd, 10dc, ... ), the relay apparatus 30d, and the router 70d may be in communications with one another. Moreover, the LAN 2c and the LAN 2d are connected via a dedicated line 2cd including a router 70cd such that the LAN 2c and the LAN 2d may be in communications with each other. The LAN 2c and the LAN 2d are constructed within a predetermined area B. For example, the predetermined area B may be the United States of America, the LAN 2c may be constructed within a NY Office, and the LAN 2d may be constructed within a Washington, D.C. Office. Further, the mobile terminals (20ba, 20bb, ... ) are utilized in the area B.

The area A and the area B are connected via the Internet 2i from the routers 70ab and 70cd, respectively, such that the area A and the area B may be in communications with each other.

Note that the TV conference-specific terminals 10 are not necessarily connected by a dedicated line, and may directly connected to the Internet 2i.

In addition, the transmission management systems 50, the program providing system 90, and the maintenance system 100 are connected via the Internet 2i to the TV conference-specific terminals 10, the mobile terminals 20, the relay apparatuses 30, and the common information management apparatus 80 such that the transmission management systems 50, the program providing system 90, and the maintenance system 100 may be in communications with the TV conference-specific terminals 10, the mobile terminals 20, the relay apparatuses 30, and the common information management apparatus 60. The transmission management systems 50, the common information management apparatus 80, and the program providing system 90 may be installed within the area A or the area B, or may be installed within an area other than these areas A and B.

Note that the LAN 2a, the LAN 2b, the dedicated line 2ab, the Internet 2i, the dedicated line 2cd, the LAN 2c, and the LAN 2d form the communications network 2 in this embodiment. The communications network 2 not only includes wired communications but partially includes wireless communications such as WiFi (Wireless Fidelity) or Bluetooth (registered trademark).

In FIG. 1, a combination of four numbers provided beneath each of the TV conference-specific terminals 10, the mobile terminals 20, the relay apparatuses 30, the transmission management systems 50, the common information management apparatus 80, the routers 70, the program providing system 90, and the maintenance system 100 simply represents an IP address using IPv4. For example, the IP address of the TV conference-specific terminal 10aa is "1.2.1.3". Further, the IP address may be IPv6 instead of IPv4; however, the IPv4 is employed for simplifying the illustration.

Note that each of the TV conference-specific terminals 10 and the mobile terminals 20 may be used for communications between two or more offices, and communications between different rooms within the same office, in addition to communications within the same room, communications between indoor and outdoor, and communications between outdoor and outdoor. The TV conference-specific terminals 10 and the mobile terminals 20 used outdoors may perform communications via wireless communications such as a mobile communications network.

Hardware Configuration

Figure 2:
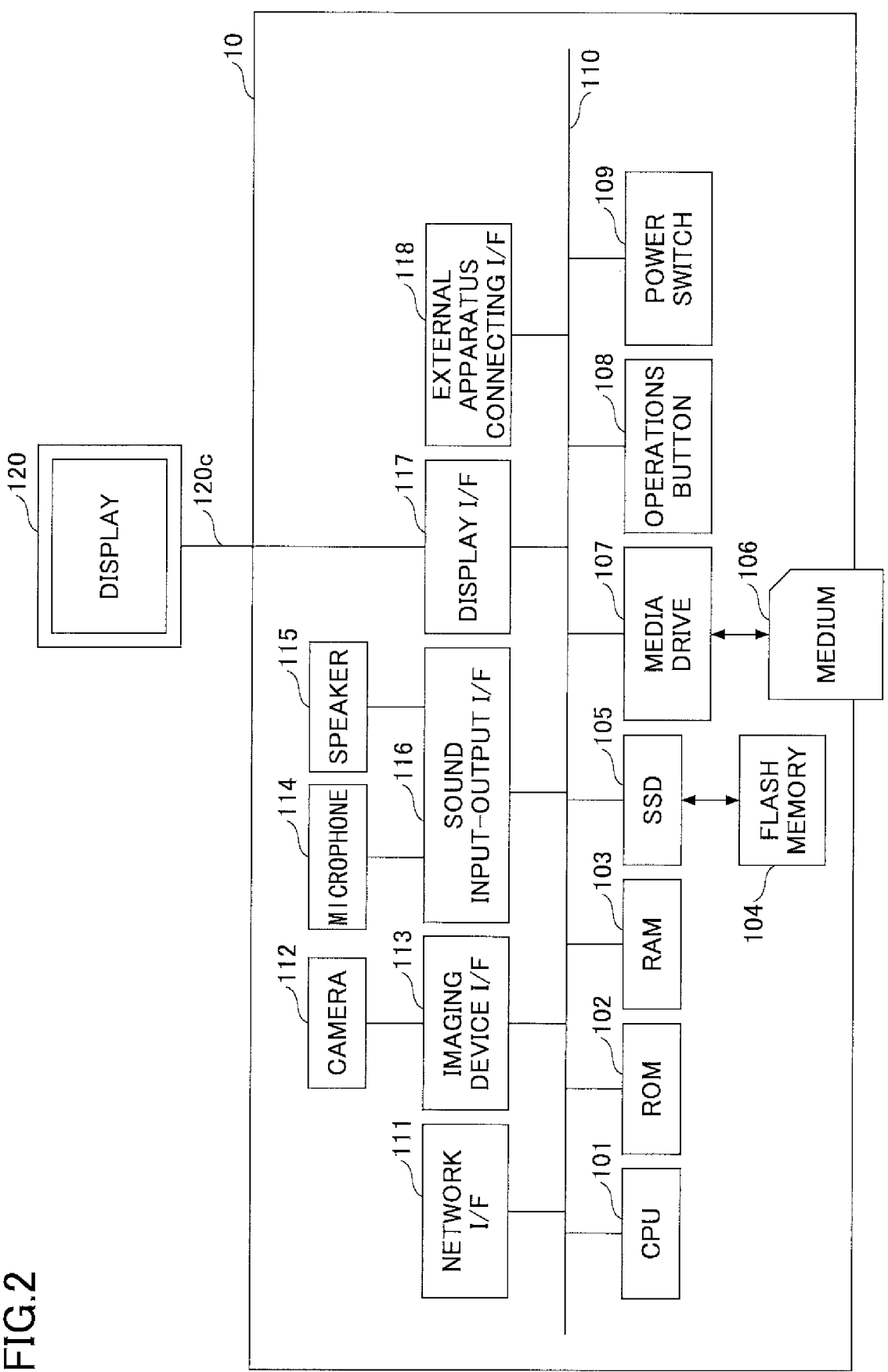
FIG. 2 is a hardware configuration diagram illustrating an example of a TV conference-specific terminal according to an embodiment.

Next, a description is given of a hardware configuration of the TV conference-specific terminal 10 with reference to FIG. 2. FIG. 2 is a hardware configuration diagram illustrating a TV conference-specific terminal according to an embodiment. As illustrated in FIG. 2, the TV conference-specific terminal 10 includes a CPU (central processing unit) 101 configured to control operations of the entire TV conference-specific terminal 10, a ROM (read only memory) 102 storing programs for driving the CPU 101 such as initial program loader (IPL), a RAM (random access memory) 103 serving as a work area of the CPU 101, a flash memory 104 storing various types of data such as terminal programs, image data, and sound data, an SDD (solid state drive) 105 configured to control reading or writing of various types of data with respect to the flash memory 104 based on the control of the CPU 101, a media drive 107 configured to control reading or writing (storing) of data with respect to a recording medium 106 such as a flash memory, an operations button 108 to be operated when selecting a destination of the TV conference-specific terminal 10, a power switch 109 to switch ON/OFF of the power supply of the TV conference-specific terminal 10, and a network I/F (interface) 111 for transmitting data via the communications network 2.

The TV conference-specific terminal 10 further includes a built-in camera 112 configured to image a subject to acquire image data in accordance with the control of the CPU 101, an imaging device I/F 113 configured to control the drive of the camera 112, a built-in microphone 114 configured to input sound, a built-in speaker 115 configured to output sound, a sound input-output I/F 116 configured to process input and output of sound signals between the microphone 114 and the speaker 115 in accordance with the control of the CPU 101, a display I/F 117 configured to transmit image data to an externally attached display 120 in accordance with the control of the CPU 101, an external apparatus connecting I/F 118 for connecting various types of external apparatuses, and a bus line 110 such as an address bus or a data bus for electrically connecting the above-described components illustrated in FIG. 2.

The display 120 is a display part formed of liquid crystal or organic EL (OLED), and configured to display an image of the subject or operational icons. Further, the display 120 is connected to the display I/F 117 via a cable 120c. The cable 120c may be an analog RGB (VGA) signal-specific cable, a component video-specific cable, an high-definition multimedia interface (HDMI) (registered trademark) or a DVI (digital video interactive) signal-specific cable.

The camera 112 includes lenses or a solid-state image sensor configured to convert an image (video) of a subject into electronic data by converting light waves into electric charges. Examples of the solid-state image sensor include a CMOS (complementary metal oxide semiconductor) and a CCD (charge coupled device).

The external apparatus connecting I/F 118 is configured to be connected via a USB (universal serial bus) to external apparatuses such as an external camera, an external microphone, and an external speaker. When the external camera is connected to the external apparatus connecting I/F 118, the external camera is driven in preference to the built-in camera 112 in accordance with the control of the CPU 101. Similarly, when the external microphone or the external speaker is connected to the external apparatus connecting I/F 118, the external microphone or the external speaker connected to the external apparatus connecting I/F 118 is driven in preference to a corresponding one of the built-in microphone 114 and the built-in speaker 115 in accordance with the control of the CPU 101. Note that the TV conference-specific terminal 10 is not necessarily provided with the built-in camera 112, and may be connected to the external camera alone via the external apparatus connecting I/F 118. Similarly, the TV conference-specific terminal 10 is not necessarily provided with the built-in microphone 114 or the built-in speaker 115, and may be connected to the external microphone or the external speaker alone via the external apparatus connecting I/F 118. Moreover, the display 120 of the TV conference-specific terminal 10 is connected to the display I/F 117 via a cable 120c, but is not necessarily connected to the display I/F 117. The display 120 may be incorporated in the TV conference-specific terminal 10.

Further, the TV conference-specific terminal 10 may be provided with an external recording medium I/F configured to read an external recording medium such as an SD card or SIM (subscriber identity module) card in addition to the external apparatus connecting I/F 118.

Note that the recording medium 106 is configured to be removable from the TV conference-specific terminal 10. Further, when the recording medium 106 is a nonvolatile memory configured to read or write data in accordance with the control of the CPU 101, such a nonvolatile memory is not limited to the flash memory 104. The nonvolatile memory to be used may be an EEPROM (Electrically Erasable and Programmable ROM), or the like.

Further, the above-described terminal-specific programs may be distributed in a form of a computer-readable recording medium, such as the recording medium 106, and the like storing the programs in files of an installable format or an executable format. Alternatively, the above-described terminal-specific programs may be stored in the ROM 102 instead of the flash memory 104.

Mobile Terminal

Figure 3:
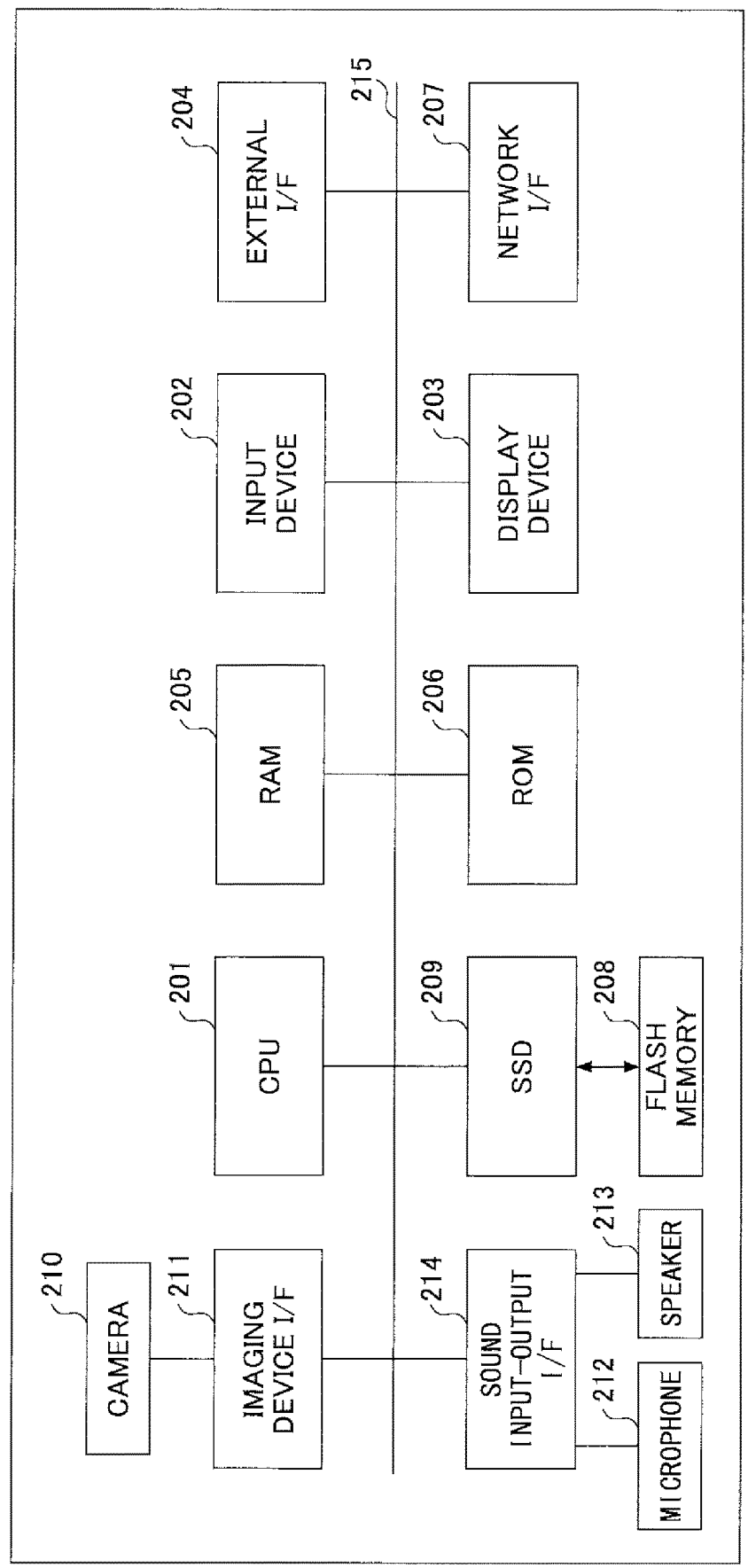
FIG. 3 is a hardware configuration diagram illustrating an example of a mobile terminal according to an embodiment.

FIG. 3 is a hardware configuration diagram illustrating an example of the mobile terminal according to an embodiment. As illustrated in FIG. 3, the mobile terminal 20 according to the embodiment includes a CPU 201 configured to control overall operations of the mobile terminal 20, an input device 202 configured to input various types of signals into the mobile terminal 20, a display device 203 configured to display a process result obtained by the mobile terminal 20, an external I/F 204 serving as an interface between various types of external apparatuses such as an external microphone, an external camera, and an external recording medium, and the mobile terminal 20, a RAM 205 utilized as a work area of the CPU 201, a ROM 206 configured to store programs and data such as settings of the OS of the mobile terminal 20 and network settings, a network I/F 207 configured to transmit data by utilizing a mobile phone communications network, a flash memory 208 configured to store various types of data such as terminal-specific programs, and an SSD 209 configured to control reading or writing of various types of data with respect to the flash memory 208 in accordance with the control of the CPU 201.

Figure 4:
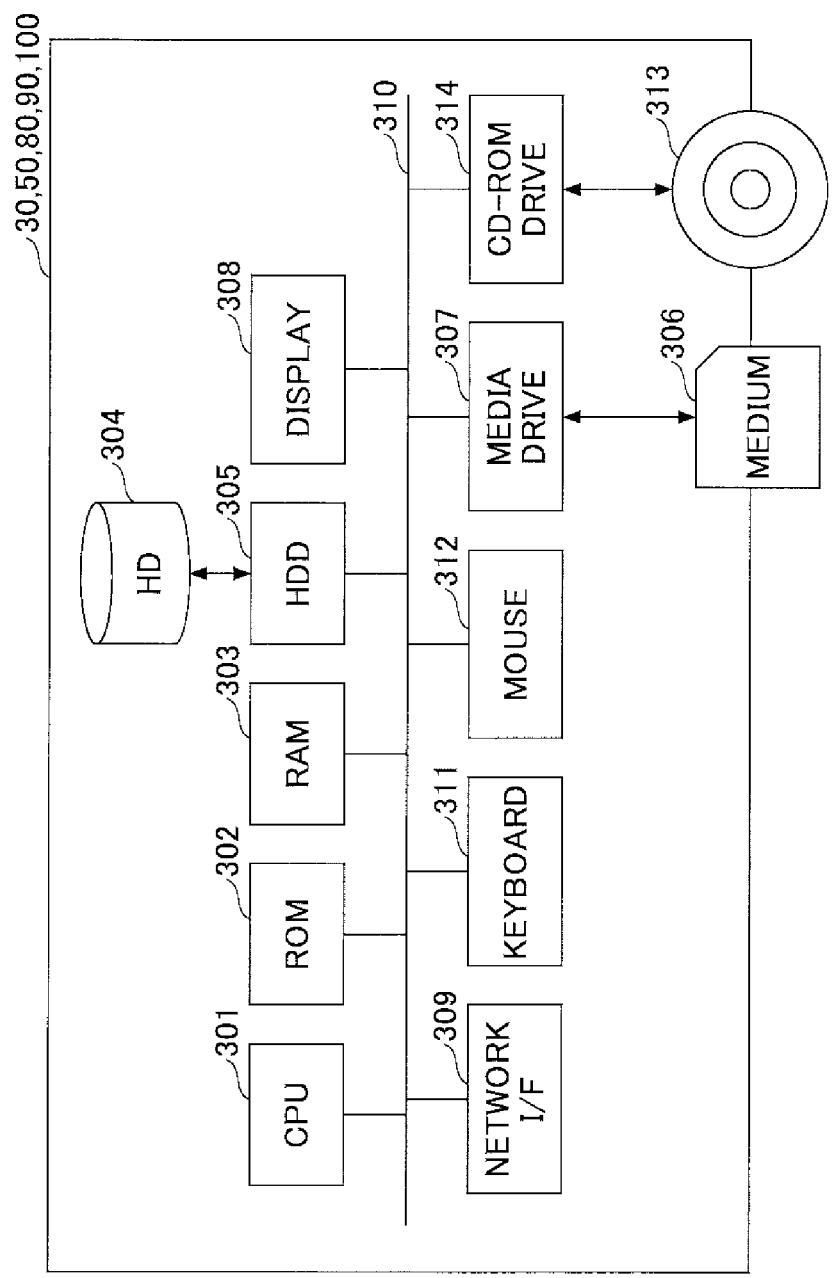
FIG. 4 illustrates a hardware configuration diagram illustrating examples of a relay apparatus, a transmission management system, a common information management apparatus, a program providing system, and a maintenance system according to an embodiment.

Further, the mobile terminal 20 includes a built-in camera 210 configured to image a subject to acquire image data in accordance of the control of the CPU 201, an imaging device I/F 211 configured to control driving of the camera 210, a built-in microphone 212 configured to input sound, a built-in speaker 213 configured to output sound, a sound input-output I/F 214 configured to input/output of sound signals between the microphone 212 and the speaker 213 in accordance with the control of the CPU 201, and a bus line such as an address bus or a data bus configured to electrically connect the above-described components as illustrated in FIG. 4. Note that when the mobile terminal 20 utilizes a text chat service alone, the mobile terminal 20 is not necessarily provided with the camera 210, the microphone 212, the speaker 213, and the like.

Further, when the recording medium 106 is a nonvolatile memory configured to read or write data in accordance with the control of the CPU 101, the recording medium 106 is not limited to the flash memory 208. The recording medium 106 may be an EEPROM (electrically erasable and programmable ROM).

The above-described terminal-specific programs may be distributed in a form of a computer-readable recording medium, such as the recording medium 106, and the like storing the programs in files of an installable format or an executable format. Alternatively, the above-described terminal-specific programs may be stored in the ROM 206 instead of the flash memory 208.

Relay Apparatus, Transmission Management System, Common Information Management Apparatus, Program Providing System, and Maintenance System Next, a description is given of hardware configurations of the relay apparatus 30, the transmission management system 50, the common information management apparatus 80, the program providing system 90, and the maintenance system 100. FIG. 4 is a hardware configuration diagram of the relay apparatus 30, the transmission management system 50, the common information management apparatus 60, the program providing system 90, and the maintenance system 100 according to an embodiment.

The transmission management system 50 includes a CPU 301 configured to control overall operations of the transmission management system 50, a ROM 302 configured to store a program for use in driving the CPU 301 such as an IPL (Initial Program Loader), a RAM 303 configured to serve as a work area of the CPU 301, an HD 304 configured to store data tailored for programs of the transmission management system 50, an HDD (hard disk drive) 305 configured to control reading or writing of the data with respect to the HD 304 in accordance of the control of the CPU 301, a media drive 307 configured to control reading or writing (storing) of data with respect to a recording medium 306 such as flash memory or the like, a display 308 configured to display various types of information such as a cursor, menus, windows, characters, or images, a network I/F 309 configured to perform data communications using the communications network 2, a keyboard 311 provided with multiple keys for inputting characters, numeric values, various types of instructions, and the like, a mouse 312 configured to select or execute various types of instructions, select a process target, and move a cursor, a CD-ROM drive 314 configured to control reading or writing of data with respect to a CD-ROM (compact disc read only memory) as an example of a removable recording medium, and a bus line 310 such as an address bus or a data bus for electrically connecting the above-described components as illustrated in FIG. 4.

Note that the above-described transmission management-specific programs may be distributed in a form of the above-described computer-readable recording medium 306, the CD-ROM 313, and the like storing the programs in files of an installable format or executable format. Alternatively, the above-described transmission management-specific programs may be stored in the ROM 302 instead of the HD 304.

Further, each of the relay apparatus 30 and the common information management apparatus 80 has a hardware configuration similar to that of the transmission management system 50, and hence, a duplicated illustration of the relay apparatus 30 and the common information management apparatus 60 is omitted from the specification. However, the HD 304 of the relay apparatus 30 stores relay apparatus-specific programs for controlling the relay apparatus 30, and the HD 304 of the common information management apparatus 80 stores information management-specific programs for controlling the common information management apparatus 80. In this case, the relay apparatus-specific programs and the information management-specific programs may be distributed in a form of the above-described computer-readable recording medium 306, the CD-ROM 313, and the like storing the programs in files of an installable format or executable format. Alternatively, the above-described relay apparatus-specific programs and the information management-specific programs may be stored in the ROM 302 instead of the HD 304.

Further, each of the program providing system 90 and the maintenance system 100 has a hardware configuration similar to that of the transmission management system 50, and hence, a duplicated illustration of the program providing system 90 and the maintenance system 100 is omitted from the specification. Note that the HD 304 of the program providing system 90 stores program providing-specific programs for controlling the program providing system 90. In this case, the program providing-specific programs may also be distributed in a form of the above-described computer-readable recording medium 306, the CD-ROM 313 and the like storing the programs in files of an installable format or executable format. Alternatively, the above-described program providing-specific programs may be stored in the ROM 302 instead of the HD 304.

Note that other examples of the removable computer-readable recording medium include a CD-R (compact disc recordable), a DVD (digital versatile disk), a Blu-ray Disc, and the like.

Functional Configuration

Figure 5:
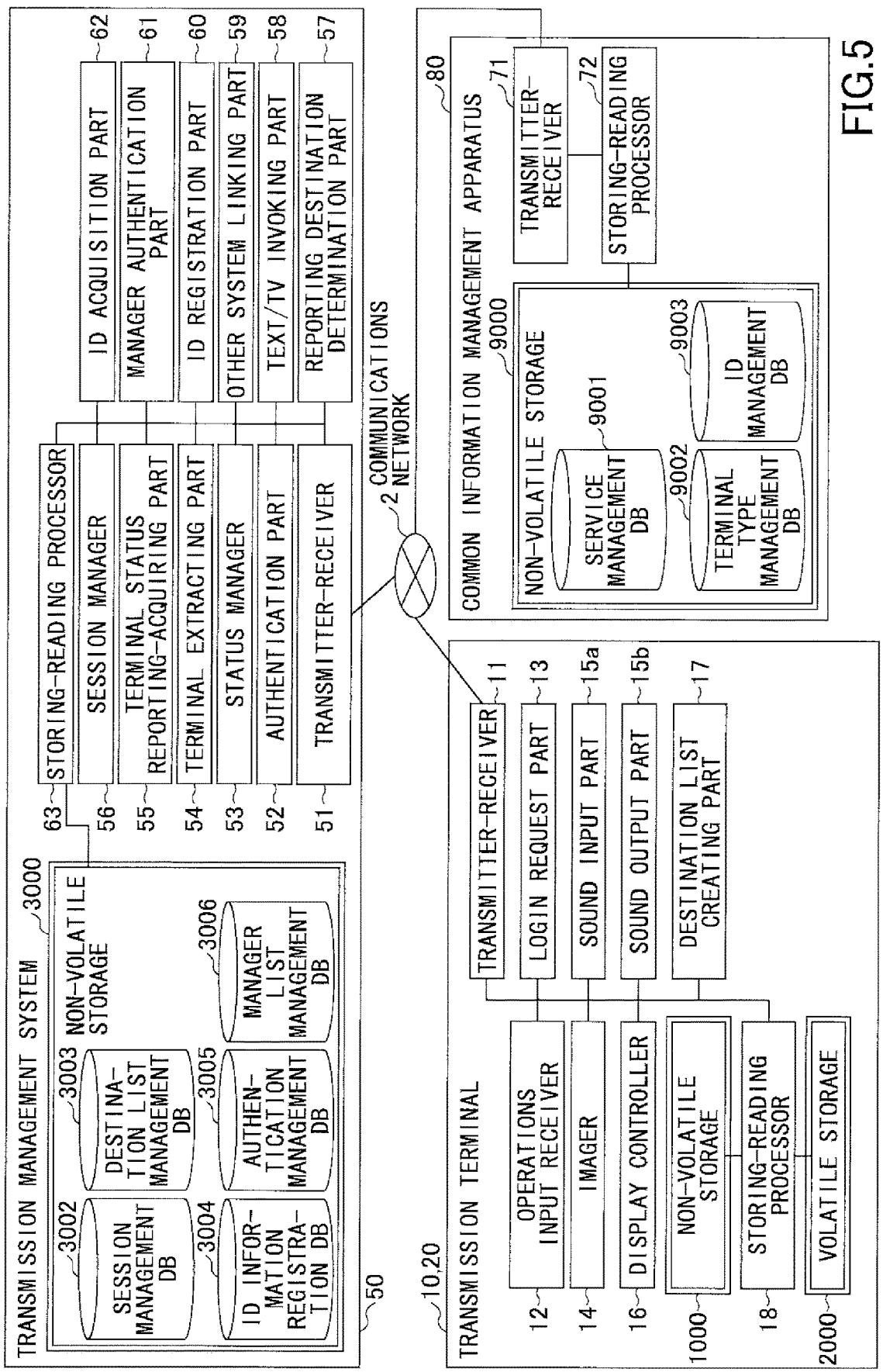
FIG. 5 is a functional block diagram illustrating examples of the transmission terminal, the common information management apparatus, and the transmission management system constituting a transmission system according to an embodiment.

Next, a description is given of a hardware configuration of the transmission system 1 with reference to FIG. 5. FIG. 5 is a functional block diagram illustrating the terminals, the apparatus, and the system constituting the transmission system 1 according to the embodiment. In FIG. 5, the TV conference-specific terminal 10, the mobile terminal 20, the transmission management system 50, and the common information management apparatus 80 are connected via the communications network 2 to perform data communications with one another. Note that the relay apparatus 30, the program providing system 90, and the maintenance system 100 illustrated in FIG. 1 are omitted from FIG. 5 since these components are not directly associated with the embodiment.

Functional Configuration of Terminal

The TV conference-specific terminal 10 includes a transmitter-receiver 11, an operation input receiver 12, a login request part 13, an imager 14, a sound input part 15a, a sound output part 15b, a display controller 16, a destination list creating part 17, and a storing-reading processor 18. In the following, a description is mainly given of a case in which the TV conference-specific terminal 10 serves as the transmission terminal illustrated in FIG. 5.

The above-described components are functional components or functional parts implemented by causing any one of the components illustrated in FIG. 2 to operate based on instructions from the CPU 201 in accordance with the terminal-specific programs loaded from the flash memory 104 in the RAM 103.

Further, the TV conference-specific terminal 10 includes a volatile storage 2000 formed of the RAM 103 illustrated in FIG. 2, and a nonvolatile storage 1000 formed of the flash memory 104 illustrated in FIG. 2.

Next, a detailed description is given of a functional configuration of the TV conference-specific terminal 10 with reference to FIGS. 2 and 5. Note that in the following, an illustration is also given of a relationship with main components of the TV conference-specific terminal 10 for implementing the respective functional components of the TV conference-specific terminal 10, among the components illustrated in FIG. 2.

The transmitter-receiver 11 of the transmission terminal (TV conference-specific terminal) 10 illustrated in FIG. 5 is implemented by instructions from the CPU 101 illustrated in FIG. 2, and the network I/F 111 illustrated in FIG. 2, and configured to perform transmission and reception of various types of data (or information) with respect to other terminals, apparatuses, or systems via the communications network 2. The transmitter-receiver 11 starts receiving status information indicating a status of each of the transmission terminals serving as destination candidates from the TV conference management system $50_1$ before starting communications with a desired destination terminal. Note that the status information not only includes operating statuses (online or offline) of the TV conference-specific terminals 10 and/or the mobile terminals 20, but also includes whether the user of each terminal is currently speaking or currently away from the user's seat even when the operating status is online. Further, the status information also includes various statuses such as the cable 120c is disconnected from the TV conference-specific terminal 10, and sound and image statuses such as failing to display images while outputting sound, or a mute status indicating the setting disabling sound output in addition to the operating statuses of the TV conference-specific terminals 10. In the following, an illustration is given of an example when the status information indicates the operating status. Note that in the above example, when the transmission terminal in FIG. 5 is the mobile terminal 20, transmitter-receiver 11 starts receiving the status information indicating the status of each of the terminals serving as the destination candidates from the text chat management system $50_2$ before starting the communications with a desired destination terminal.

The operations input receiver 12 of the transmission terminal 10 illustrated in FIG. 5 is implemented by instructions from the CPU 101 illustrated in FIG. 2, and the operations button 108 and the power switch 109 illustrated in FIG. 2, and configured to receive various types of inputs from users. For example, when the user switches the power switch 109 illustrated in FIG. 2 ON, the operations input receiver 12 illustrated in FIG. 5 receives a power ON instruction to switch the power ON. Note that when the transmission terminal in FIG. 5 is the mobile terminal 20, the operations input receiver 12 is implemented by instructions from the CPU 201, and an input device 202.

The login request part 13 of the transmission terminal 10 illustrated in FIG. 5 is implemented by the CPU 101 illustrated in FIG. 2, and is configured to automatically transmit login request information representing an indication to request a login, terminal type information, services accessible to the request source terminal, and a current IP address of the request source terminal from the transmitter-receiver 11 to the TV conference management system $50_1$ via the communications network 2, which is triggered by the reception of the power ON instruction. Further, when the user switches the power switch 109 from a power ON status to a power OFF status, the operations input receiver 12 completely switches the power OFF after the transmitter-receiver 11 transmits status information indicating that the power will be switched OFF to the TV conference management system $50_1$. Hence, the TV conference management system $50_1$ may be able to detect change of the power status of the TV conference-specific terminal 10 from the power ON status to the power OFF status.

Note that in the above example, when the transmission terminal in FIG. 5 is the mobile terminal 20, the login request part 13 is implemented by instructions from the CPU 201, and is configured to transmit login request information representing an indication to request a login, terminal type information of the request source terminal, services accessible to the request source terminal, a current IP address of the request source terminal from the transmitter-receiver 11 to the text chat management system $50_2$ via the communications network 2, which is triggered by the reception of the login operation performed by the user of the mobile terminal 20. As described above, in the mobile terminal 20, the login request and the like are transmitted to the text chat management system $50_2$ by the user's login operation on the programs (terminal-specific programs) installed in the mobile terminal 20.

The imager 14 of the transmission terminal 10 illustrated in FIG. 5 is implemented by instructions from the CPU 101 illustrated in FIG. 2, the camera 112 and the imaging device I/F 113 illustrated in FIG. 2, and is configured to image a subject to output image data acquired by imaging the subject. Note that when the transmission terminal in FIG. 5 is the mobile terminal 20, the imager 14 is implemented by instructions from the CPU 201 illustrated in FIG. 4, the camera 210 and the imaging device I/F 211 illustrated in FIG. 3. However, when the mobile terminal 20 uses the text chat service alone, the mobile terminal 20 does not necessarily have the imager 14.

The sound input part 15a of the transmission terminal 10 illustrated in FIG. 5 is implemented by instructions from the CPU 101 illustrated in FIG. 2, and the sound input-output I/F 116 illustrated in FIG. 2, and is configured to convert sound of the user's voice input by the microphone 114 into sound signals and then input sound data associated with the sound signals. The sound output part 15b of the transmission terminal 10 illustrated in FIG. 5 is implemented by the instructions from the CPU 101 illustrated in FIG. 2, and the sound input-output I/F 116 illustrated in FIG. 2, and is configured to output the sound signals associated with the sound data to the speaker 115 to cause the speaker 115 to output sounds. Note that when the transmission terminal in FIG. 5 is the mobile terminal 20, the sound input part 15a and the sound output part 15b are implemented by instructions from the CPU 201 illustrated in FIG. 3, the sound input-output I/F 214 illustrated in FIG. 4. However, when the mobile terminal 20 uses the text chat service alone, the mobile terminal 20 does not necessarily have the sound input part 15a and the sound output part 15b.

The display controller 16 of the transmission terminal 10 illustrated in FIG. 5 is implemented by the instructions from the CPU 101 illustrated in FIG. 2, and the display I/F 117 illustrated in FIG. 2, and is configured to control transmission of image data with respect to an externally attached display 120. Note that when the transmission terminal in FIG. 5 is the mobile terminal 20, the display controller 16 illustrated in FIG. 3 is implemented by instructions from the CPU 201 illustrated in FIG. 3, and the display device illustrated in FIG. 6, and is configured to control transmission of image data or the like with respect to the display device 203.

The destination list creating part 17 of the transmission terminal 10 illustrated in FIG. 5 is implemented by instructions from the CPU 101 illustrated in FIG. 2, and is configured to create or update destination lists based on destination list information and status information of the TV conference-specific terminals 10 and/or the mobile terminals 20 serving as the destination candidates received from the transmission management system 50. Note that when the transmission terminal in FIG. 5 is the mobile terminal 20, the destination list creating part 17 is implemented by the CPU 201 illustrated in FIG. 3.

The storing-reading processor 18 of the transmission terminal 10 illustrated in FIG. 5 is implemented by instructions from the CPU 101 illustrated in FIG. 2, executed by the SDD 105 illustrated in FIG. 2, and is configured to store various types of data in the nonvolatile storage 1000 and read various types of data from the nonvolatile storage 1000. The nonvolatile storage 1000 is configured to store a communications ID (identification) and a password corresponding to the communications ID for identifying a TV conference-specific terminal 10 or a user as a communications destination. Note that it is not necessary to store the communications ID and the corresponding password in the nonvolatile storage 1000. In such a case, the communications ID and the corresponding password may be input by the user every time the user transmits a login request to the transmission management system 50.

The storing-reading processor 18 is further configured to store various types of data in the volatile storage 2000, and read various types of data from the volatile storage 2000. The volatile storage 2000 overwrites and stores image data or sound data received by performing communications with the destination terminal, and overwrites the stored image data or sound data every time the volatile storage 2000 receives the image data or sound data. Among these data, images based on the image data before being overwritten are displayed on the display 120, and sounds based on the sound data before being overwritten are output from the speaker 150. Note that in the above example, when the transmission terminal in FIG. 5 is the mobile terminal 20, the storing-reading processor 18 is implemented by instructions from the CPU 201 illustrated in FIG. 3, and the SSD 209 illustrated in FIG. 3. Further, the volatile storage 2000 also stores the text data received by performing a text chat with the destination terminal.

Functional Configuration of Transmission Management System

The transmission management system 50 includes a transmitter-receiver 51, an authentication part 52, a status manager 53, a terminal extracting part 54, a terminal status reporting-acquiring part 55, a session manager 56, a reporting destination determination part 57, a text/TV invoking part 58, another system linking part 59, an ID registration part 60, a manager authentication part 61, an ID acquisition part 62, and a storing-reading processor 63. The above-described components are functional components or functional parts implemented by causing any one of the components illustrated in FIG. 4 to operate instructions from the CPU 301 in accordance with the management system programs loaded from the HD 304 in the RAM 303. Further, the transmission management server 50 includes a nonvolatile storage 3000 configured to maintain various types of data (or information) stored even though the power of the transmission management server 50 is switched OFF. The nonvolatile storage 3000 is formed of the HD 304 illustrated in FIG. 4.

Session Management Table

The nonvolatile storage 3000 includes a session management DB 3002 composed of a session management table illustrated in FIG. 6. In the session management table, the relay apparatus ID of the relay apparatus 30 used for relaying data, the communications ID of the request source terminal, and the communications ID of the destination terminal are managed in association with each of the session IDs. For example, the in the session management table illustrated in FIG. 6, the relay apparatus 30a (the relay apparatus ID "111a") selected based on the session ID "se1" relays data between the request source terminal (the mobile terminal 02aa) having the communications ID "02aa" and the destination terminal (the TV conference-specific terminal 10ab) having the communications ID "01ab".

Destination List Management Table

Further, the nonvolatile storage 3000 includes a destination list management DB 3003 composed of destination list management tables illustrated in FIGS. 7A and 7B. FIG. 7A is an example of the destination list management table registering destination information managed by the TV conference management system 50$_1$. FIG. 7B is an example of the destination list management table registering destination information managed by the text chat management system 50$_2$. These destination list management tables are structured to manage all the communications IDs or the user IDs of the destination terminals registered as destination terminal candidates in association with the communications ID of the request source terminal that has requested starting (calling) of the connection in the TV conference service or the text chat service. Further, the communications IDs or the user IDs of the destination terminals are provided with information about the respective management systems 50 managing call control of the destination terminals after the "@" mark of the communications IDs.

For example, the destination list management table managed by the TV conference management system 50$_1$ illustrated in FIG. 7A indicates that destination terminal candidates capable of transmitting a connection start request for using the TV conference service from the request source terminal (the TV conference-specific terminal 10ab) having the communications ID "01ab" include the TV conference-specific terminal 10ab having the communications ID "01aa" managed by the TV conference management system 50$_1$, and the mobile terminal 20aa having the user ID "02AA" managed by the text chat management system 50$_2$.

On the other hand, the destination list management table managed by the text chat management system 50$_2$ illustrated in FIG. 7B indicates that destination terminal candidates capable of transmitting a connection start request for using the TV conference service or the text chat service from the request source terminal (the mobile terminal 20aa) having the user ID "02AA" include the mobile terminal 20ab having the user ID "02AB" managed by the text chat management system 50$_2$, and the TV conference-specific terminal 10ab having the communications ID "01ab" managed by the TV conference management system 50$_1$. Note that the even though the destination terminals are managed in the destination lists, the connection start request is unable to be transmit for the services unavailable to the destination terminals. For example, the mobile terminal 20aa having the user ID "02AA" is unable to transmit a connection start request for using the text chat service (but is able to transmit a connection start request for using the TV conference service) to the destination terminal having the communications ID "01ab".

Note that the description after the "@" mark illustrated in FIGS. 7A and 10B may be domain information (domain names) corresponding to the transmission management systems 50.

Authentication Management Table

Further, the nonvolatile storage 9000 includes an authentication management DB 3005 composed of authentication management tables illustrated in FIGS. 8A and 8B. FIG. 8A is the authentication management table used for authentication by the TV conference management system 50$_1$, and FIG. 8B is the authentication management table used for use in authentication of the text chat management system 50$_2$.

In the authentication management table in FIG. 8A, each of the communications IDs of all the transmission terminals (TV conference-specific terminals 10 and the mobile terminals 20) managed by the TV conference management system 501 is managed in association with a corresponding one of the passwords. For example, in the terminal authentication management table illustrated in FIG. 8A, the communications ID of the TV conference-specific terminal 10aa is "01aa", and the corresponding password is "aaaa".

Similarly, in the authentication management table in FIG. 8B, each of the communications IDs of the transmission terminals (TV conference-specific terminals 10 and the mobile terminals 20) managed by the TV conference management system 50$_2$ is managed in association with a corresponding one of the passwords. For example, in the terminal authentication management table illustrated in FIG. 8B, the user ID of the TV conference-specific terminal 10aa is "01AA", and the corresponding password is "AAAA". Further, each of the user IDs is registered in association with a corresponding one of the user names; however, the user may be able to receive the text chat service without the corresponding user name.

ID Information Registration Table

The nonvolatile storage 9000 includes an ID information registration DB 3004 composed of an ID information registration table illustrated in FIG. 9. In the ID information registration table, each of the management numbers is associated with the corresponding communications ID and the corresponding user ID. For example, In the ID information registration table illustrated in FIG. 9, the management number 1 is associated with the communications ID "01aa" and the user ID "01AA".

Note that the user IDs and the communication IDs are unique. That is, the user IDs do not overlap with any other user ID, and the communications IDs do not overlap with any other communications ID.

The ID information registration table is an example of association information.

Manager List Table

The nonvolatile storage 9000 includes a manager list management DB 3006 composed of a manager list table illustrated in FIG. 10. In the manager list table, each of the manager IDs is associated with a corresponding tone of passwords. For example, in the manager list table illustrated in FIG. 10, a manager having the manager ID "X001" is associated with a password "999".

The manager ID indicates identification information for identifying a user-side manager (a company-side manager) that receives a service provided by the TV conference management system $50_1$ or a manager of the TV conference management system $50_1$. The manager ID may indicate identification information for identifying a user-side manager (a company-side manager) that receives a service provided by the text chat management system $50_2$ or a manager of the text chat management system $50_2$. The managers are generally separated from the users because the managers are able to check or newly register the communications IDs available for the user side; however, one of the users may serve as a manager.

Functions of Transmission Management System

Next, an illustration is given of respective functional components of the transmission management system 50. Note that in the following, an illustration is also given of a relationship with main components illustrated in FIG. 4 for implementing the functional components of the transmission management system 50.

The transmitter-receiver 51 of the transmission management system 50 illustrated in FIG. 5 is implemented by instructions from the CPU 301 illustrated in FIG. 4, executed by the network I/F 309 illustrated in FIG. 4, and is configured to perform transmission and reception of various types of data (or information) with respect to other terminals, apparatuses, or servers via the communications network 2.

The authentication part 52 of the transmission management system 50 illustrated in FIG. 5 is implemented by instructions from the CPU 301 illustrated in FIG. 4, executed by the network I/F 309 illustrated in FIG. 4, and is configured to search the authentication management DB 3005 of the common information management apparatus 80 for the communications ID and the password included in the login request information received via the transmitter-receiver 51, and perform authentication by determining whether the communications ID and the password identical to those included in the login request information are managed in the authentication management DB 3005.

The status manager 53 of the transmission management system 50 illustrated in FIG. 5 is implemented by instructions from the CPU 301 illustrated in FIG. 4, and is configured to store an operating status of the request source terminal that has transmitted the login request in association with the communications ID and the like of the request source terminal in the ID management DB 9003 of the common information management apparatus 80 to manage the operating status of the request source terminal.

The terminal extracting part 54 of the transmission management system 50 illustrated in FIG. 5 is implemented by instructions from the CPU 301 illustrated in FIG. 4, is configured to search the destination list management DB 3003 for the communications ID of the request source terminal that has transmitted the login request as a key, and read the communications IDs of the destination terminal candidates capable of being connected to the request source terminal, and information about the transmission management system 50 that manages calling control of the transmission terminals having the read communications IDs.

The terminal status reporting-acquiring part 55 of the transmission management system 50 illustrated in FIG. 5 is implemented by instructions from the CPU 301 illustrated in FIG. 4, and is configured to acquire the operation statuses of the transmission terminals managed by the transmission management system 50 itself among those of the destination terminal candidates extracted by the terminal extracting part 54 having the communications IDs. Further, the terminal status reporting-acquiring part 55 is configured to report the received operating status of the request source terminal to the terminals serving as the destination candidates.

The session manager 56 of the transmission management system 50 illustrated in FIG. 5 is implemented by instructions from the CPU 301 illustrated in FIG. 4, and is configured to store in the session management DB 3002 of the nonvolatile storage 3002 the relay apparatus ID of the relay apparatus 30 that relay content data in association with the session ID, the communications ID of the request source terminal, and the communications ID of the destination terminal. The session manager 56 of the transmission management system $50_2$ is an example of a first communications connection part, and the session manager 56 of the transmission management system $50_1$ is an example of a second communications connection part.

The reporting destination determination part 57 of the transmission management system 50 illustrated in FIG. 5 is implemented by instructions from the CPU 301 illustrated in FIG. 4, and is configured to determine the transmission management system 50 to which the operating status of the request source terminal is reported based on the service name included in the login request from the request source terminal. For example, when the mobile terminal 20 allowed to use the TV conference service has logged into the text chat management system $50_2$, the reporting destination determination part 57 determines that the operating status of the mobile terminal 20 is reported to the TV conference management system $50_1$. Hence, it may be possible to report or acquire status information such as the operating statuses of the transmission terminals that are allowed to use different services managed by different call control.

The text/TV invoking part 58 illustrated in FIG. 5 is implemented by instructions from the CPU 301 illustrated in FIG. 4, and is configured to invoke the TV conference management system $50_1$ from the text chat management system $50_2$ while the user logs into the text chat management system $50_2$, and request the TV conference management system $50_1$ to start the TV conference. Similarly, the text/TV invoking part 58 is implemented by instructions from the CPU 301 illustrated in FIG. 4, and is configured to invoke the text chat management system $50_2$ from the TV conference management system 50₁ while the user logs into the TV conference management system 50₁, and request the text chat management system 50₂ to start the text chat. The text/TV invoking part 58 is an example of a connection request part.

The other system linking part 59 illustrated in FIG. 5 is implemented by instructions from the CPU 301 illustrated in FIG. 4, and is configured to acquire a system ID of another system when the user logs into the other system. Further, the other system linking part 59 is configured to register the system ID of the other system in association with the user ID in the authentication management table. The other system linking part 59 is an example of an authenticating-destination identification acquisition part.

The manager authentication part 61 of the transmission management system 50 illustrated in FIG. 5 is implemented by instructions from the CPU 301 illustrated in FIG. 4, and is configured to determine whether the authentication of the manager is established, and allows the ID registration part 60 to register the user ID and the communications ID when the authentication is successful.

The ID registration part 60 of the transmission management system 50 illustrated in FIG. 5 is implemented by instructions from the CPU 301 illustrated in FIG. 4, and is configured to register the user IDs in association with the communications IDs in the ID information registration table. The ID registration part 60 is an example of an identification information registration part.

The ID acquisition part 62 of the transmission management system 50 illustrated in FIG. 5 is implemented by instructions from the CPU 301 illustrated in FIG. 4, and is configured to acquire the communications ID associated with the user ID, or the user ID associated with the communications ID from the ID information registration table. The ID acquisition part 62 is an example of an identification information acquisition part.

The storing-reading processor 63 of the transmission management system 50 illustrated in FIG. 5 is implemented by instructions from the CPU 301 illustrated in FIG. 4, and executed by the HDD 305 illustrated in FIG. 4, and is configured to store various types of data in the nonvolatile storage 3000, and read various types of data from the nonvolatile storage 3000.

Functional Configuration of Common Information Management Apparatus

The common information management apparatus 80 includes a transmitter-receiver 71, and a storing-reading processor 72. The above-described components are functional components or functional parts implemented by causing any one of the components illustrated in FIG. 4 to operate based on instructions from the CPU 301 in accordance with the management system programs loaded from the HD 304 in the RAM 303. Further, the common information management apparatus 80 includes a nonvolatile storage 9000 configured to maintain various types of data (or information) stored even though the power of the common information management apparatus 80 is switched OFF. The nonvolatile storage 9000 is formed of the HD 304 illustrated in FIG. 4.

Service Management Table

The nonvolatile storage 9000 includes a service management DB 9001 composed of a service management table illustrated in FIG. 11. In the service management table, the names of the transmission management systems that perform call control of the respective services are managed in association with the corresponding service names of the transmission system 1. For example, in the service management table illustrated in FIG. 11, the service name "TV conference" indicating call control is managed by the transmission management system having a name "TV conference management system" (the transmission management system 50₁). Similarly, the service name "text chat" indicating call control is managed by the transmission management system having a name "text chat management system" (the transmission management system 50₂).

Note that the management system names illustrated in FIG. 11 may be domain information (domain names) corresponding to the transmission management systems 50.

Terminal Type Management Table

Further, the nonvolatile storage 9000 includes a terminal type management DB 9002 composed of a terminal type management table illustrated in FIG. 12. In the terminal type management table, each of the terminal type names of all the transmission terminals forming the transmission system 1 is managed in association with a corresponding one of the service names available to the terminals of these types. For example, in the terminal type table illustrated in FIG. 12, the terminals having the terminal type name "TV conference-specific" may be able to use the service having the service name "TV conference". Similarly, the terminals having the terminal type name "general-purpose" may be able to use the service having the service name "TV conference" and the service having the service name "text chat". Further, the terminals having the terminal type name "chat-specific" may be able to use the service having the service name "text chat".

Note that in this embodiment, the terminal type name of the TV conference-specific terminals 10 is "TV conference-specific", and the terminal type name of the mobile terminals 20 is "general-purpose". Note that the mobile terminals 20 having installed the program for utilizing the text chat service alone may serve as the terminals having the terminal type name "chat-specific". Similarly, the mobile terminals 20 having installed the program for utilizing the TV conference service alone may serve as the terminals having the terminal type name "TV conference-specific". Thus, the mobile terminals 20 may be able to serve as the terminals of different terminal types in accordance with the different types of terminal-specific programs installed.

ID Management Table

The nonvolatile storage 9000 further includes a ID management DB 9003 composed of an ID management table illustrated in FIG. 13. In the ID management table, a name of the terminal when the communications ID of the terminal is specified as a destination, an operating status of the terminal, a reporting destination of the operating status, received date and time at which the login information is received by the transmission management system 50, and an IP address of the terminal are managed in association with each of the communications IDs of the terminals forming the transmission system 1. For example, in the ID management table illustrated in FIG. 13, the TV conference-specific terminal 10*aa* having the communications ID "01*aa*" has a name "AA conference terminal", the operating status "online (communicative)", the reporting destination "−", the received date and time "2013.11.10.13:40" at which the login request information is received by the transmission management system 50 (the TV conference management system 50₁), and the IP address "1.2.1.3". Note that when the reporting destination has "−" (no setting), the operating status of the terminal is not transmitted to another transmission management system 50. That is, the operating status of the terminal is transmitted to the transmission management system 50 only when the terminal has transmitted the login request. In the above example, the operating status of the TV conference-specific terminal 10aa is reported only to the transmission management system $50_1$ (TV conference management system).

Meanwhile, the mobile terminal 20aa having the communications ID "02AA" has a name "AA mobile terminal", the operating status "online (communicative)", the reporting destination "TV conference management system", the received date and time "2013.11.25.14:30" at which the login request information is received by the transmission management system 50 (the text chat management system $50_2$), and the IP address "1.4.1.1". Note that when the reporting destination is set, the operating status of the terminal is reported to the other transmission management system 50 set as the reporting destination. In the above example, the operating status of the mobile terminal 20aa is reported only to the transmission management system $50_1$ (TV conference management system). Note that multiple reporting destinations such as "TV conference management system, XXX management system, etc." may be set as the reporting destination.

Next, an illustration is given of functional configurations of the common information management apparatus 80. Note that in the following, an illustration is also given of a relationship with main components for implementing the functional configurations of the common information management apparatus 80, among the components illustrated in FIG. 5.

The transmitter-receiver 71 of the common information management apparatus 60 illustrated in FIG. 5 is implemented by instructions from the CPU 301 illustrated in FIG. 4, and executed by the network I/F 309 illustrated in FIG. 4, and is configured to perform transmission and reception of various types of data (or information) with respect to the transmission management systems 50 via the communications network 2.

The storing-reading processor 72 of the transmission management system 50 illustrated in FIG. 5 is implemented by instructions from the CPU 301 illustrated in FIG. 4, and executed by the HDD 305 illustrated in FIG. 4, and is configured to store various types of data in the nonvolatile storage 9000, and read various types of data from the nonvolatile storage 9000.

Details of Process

There may be two cases in this embodiment. In the first case, the user initially logs into the TV conference management system $50_1$, and in the second case, the user initially logs into the text chat management system $50_2$. In the following, a process of the first case, and a process of the second case are described in this order. However, regardless of either cases, the ID (the user ID or the communications ID) and the password (password for the text chat management system or the password for the TV conference management system) that the user may use for logging into a system after the user has logged into the initial system may be omitted.

Logging into TV Conference Management System

Figure 14:
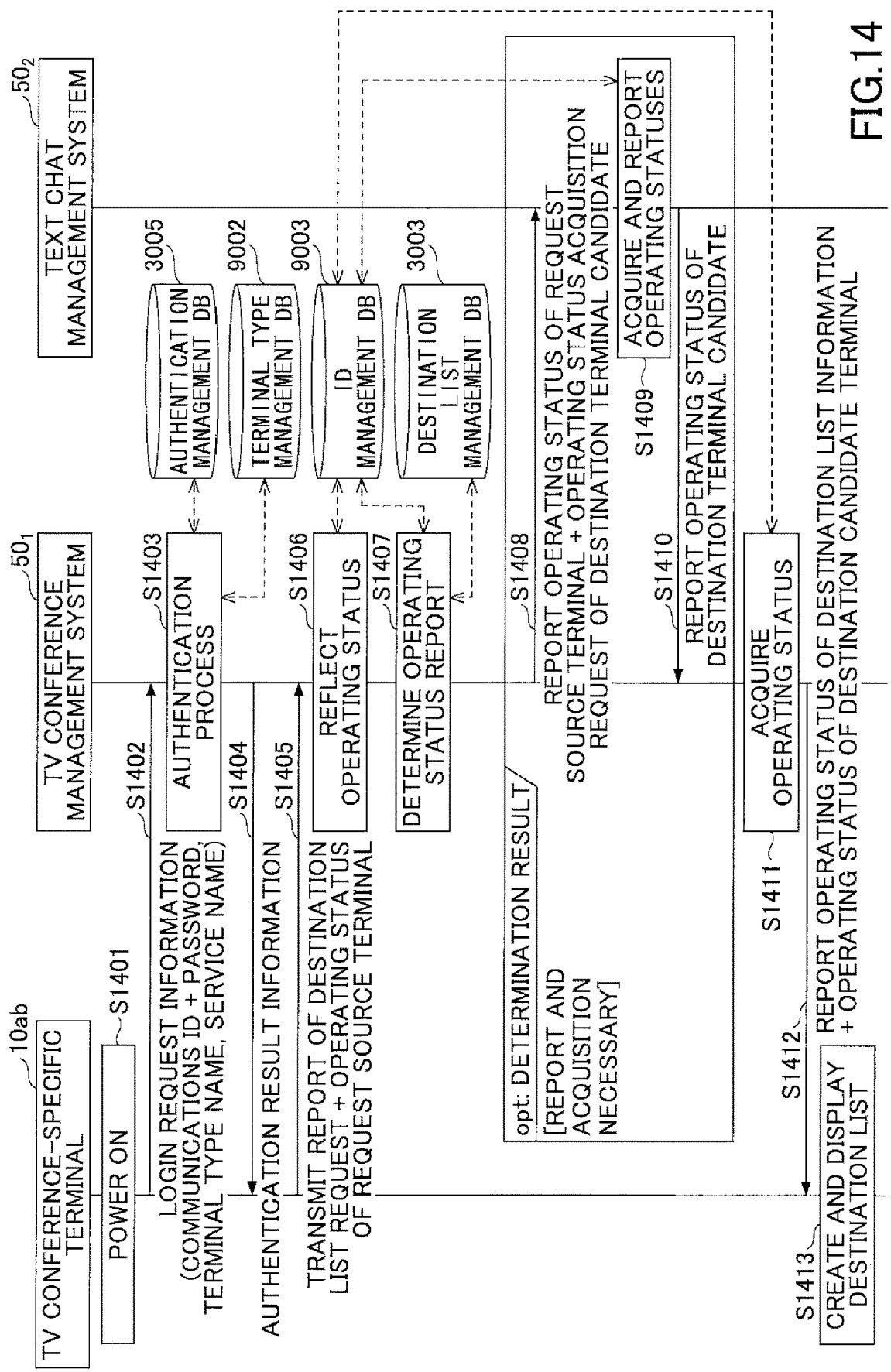
FIG. 14 is a sequence diagram illustrating an example of a process from a TV conference-specific terminal login step to a destination list display step according to an embodiment.

In the following, a description is given, with reference to FIG. 1 of a detailed process of displaying a certain destination list composed of destination terminal candidates for the TV conference-specific terminal 10ab by a user operating the TV conference-specific terminal 10ab. FIG. 14 is a sequence diagram illustrating an example of a process from a TV conference-specific terminal login step to a destination list display step according to an embodiment.

When the user switches the power switch 109 illustrated in FIG. 2 ON, the operations input receiver 12 illustrated in FIG. 5 receives a power ON instruction to switch the power ON. Subsequently, the login request part 13 automatically transmits login request information indicating a login request from the transmitter-receiver 11 to the TV conference management system 501 via the communications network 2 (step S1402) on receiving the power on instruction as the trigger. Note that the login request may be transmitted in accordance with the user's input of instructions. This login request information includes a communications ID and a password for identifying the TV conference-specific terminal 10ab of the user's own terminal serving as a request source terminal. Further, the login request information includes a terminal type name, and service names of the TV conference-specific terminal 10ab. Note that the communications ID and the password may be read from the nonvolatile storage 100 via the storing-reading processor 18, or may be input by the user via the operations input receiver 12. In addition, the communications ID, the password, the service name, and the terminal type name stored in an external recording medium may be read via the storing-reading processor 18. Note that when the login request information is transmitted from the TV conference-specific terminal 10ab to the TV conference management system $50_1$, the TV conference management system $50_1$ serving as the receiver may be able to detect the IP address of the TV conference-specific terminal 10ab serving as the transmitter.

In the subsequent process, the terminal type name and the service name included in the request information transmitted by the TV conference-specific terminal 10ab are the "TV conference-specific", and the "TV conference", respectively.

Subsequently, when the authentication part 52 of the TV conference management system $50_1$ receives the login request information via the transmitter-receiver 51, the authentication part 52 performs an authentication process (step S1403). The authentication process is performed based on whether the communications ID and the password transmitted in step S1402 is registered in the authentication management table.

The transmitter-receiver 51 of the TV conference management system $50_1$ transmits an authentication result generated in the authentication process of the step S1403 to the TV conference-specific terminal 10ab (step S1404). In the following description, it is assumed that the TV conference management system $50_1$ has transmitted the authentication result indicating a successful login to the TV conference-specific terminal 10ab. Note that when the TV conference-specific terminal 10ab receives the authentication information indicating login failure from the TV conference management system $50_1$, the TV conference-specific terminal 10ab displays a screen indicating the login failure on the display device 120ab of the TV conference-specific terminal 10ab and ends the process.

Subsequently, the transmitter-receiver 11 of the TV conference-specific terminal 10ab receives the authentication result indicating the successful login from the TV conference management system $50_1$, the TV conference-specific terminal 10ab transmits a destination list information request and a report of an operating status of the TV conference-specific terminal 10ab (step S1405). Note that the operating status of the TV conference-specific terminal 10ab is information indicating the operating status being "online (communicative)". However, in a state where the TV conference-specific terminal 10ab the operating status of which is online fails to perform communications with other transmission terminals for some reasons, such information may indicate "online (communication disabled)" or the like.

Subsequently, the status manager 53 of the TV conference management system $50_1$ changes the operating status of the request source terminal (the TV conference-specific terminal 10ab) in the ID management DB 9003 of the common information management apparatus 80 into "online (communicative)" (step S1406).

Figure 15:
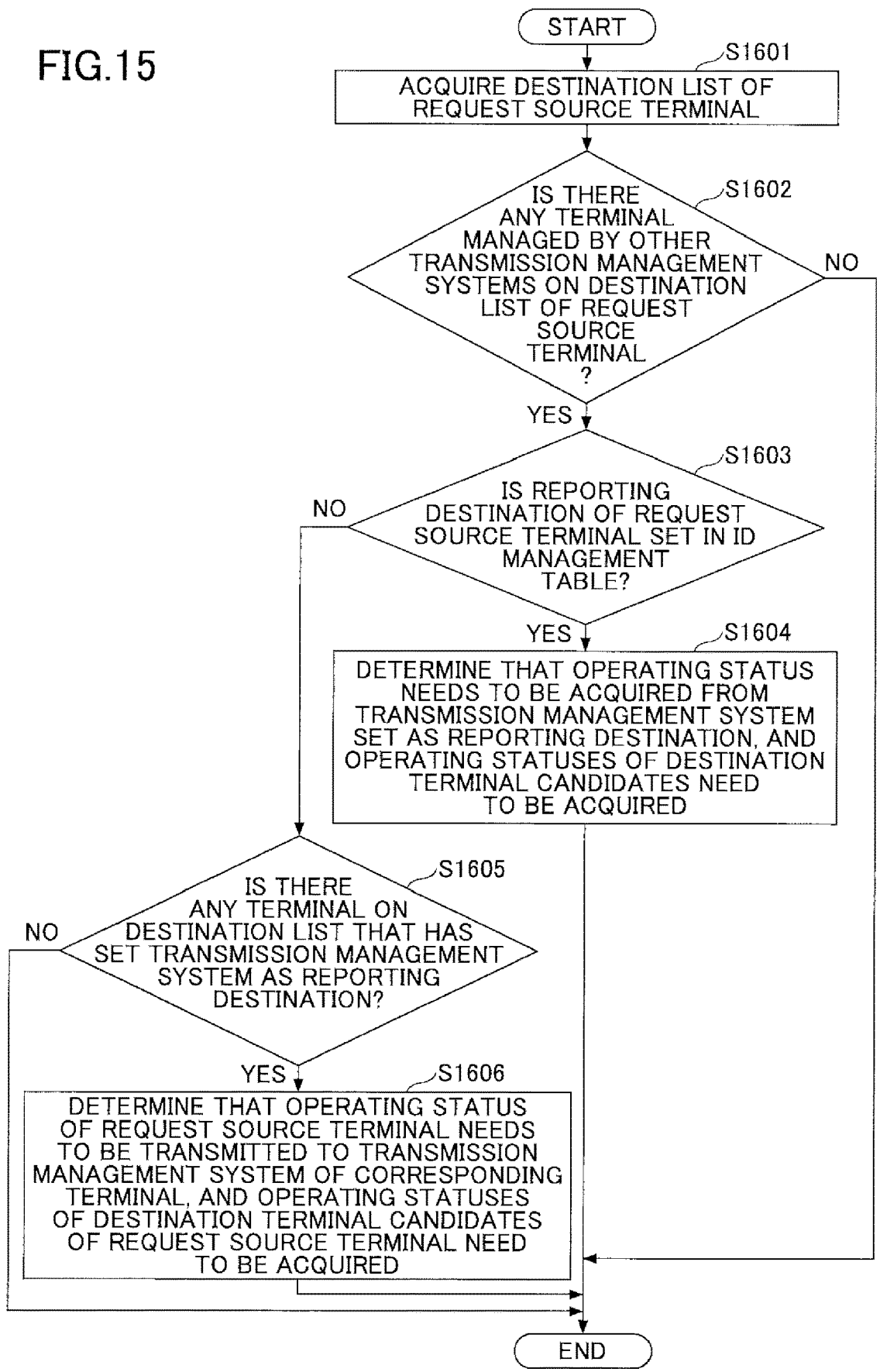
FIG. 15 is a flowchart illustrating an example of an operating status report determination process according to an embodiment.

Then, the TV conference management system $50_1$ performs a process of determining the operating status report (an operating status report determination process) (step S1407). The operating status report determination process will be described with reference to FIG. 15. FIG. 15 is a flowchart illustrating an example of the operating status report determination process according to an embodiment.

The terminal extracting part 54 of the TV conference management system $50_1$ acquires a destination list of the request source terminal (the TV conference-specific terminal 10ab) from the destination list management table of the destination list management DB 3003 (step S1601). Note that the destination list of the TV conference-specific terminal 10ab acquired by the terminal extracting part 54 of the TV conference management system $50_1$ includes "01aa@TVconference management system", "02AA@text chat management system", etc.

Next, the reporting destination determination part 57 of the TV conference management system $50_1$ determines whether there are any transmission terminals managed by other transmission systems 50 in the destination list acquired in step S1601 (step S1602).

In this example, the destination list of the TV conference-specific terminal 10ab (the communications ID "01ab") includes "02AA@text chat management system" managed by another transmission system 50. Hence, since there is a transmission terminal managed by another transmission management system 50, step S1603 is processed.

Note that in a case where there is no transmission terminal managed by another transmission management system 50, the process of FIG. 15 ends. That is, in this case, all the destination terminal candidates included in the acquired destination list are the transmission terminals managed by the TV conference management system $50_1$. Hence, the reporting destination determination part 57 of the TV conference management system $50_1$ determines that it is not necessary to transmit a report of the operating status of the request source terminal, or acquire the operation statuses from another transmission management system 50.

Subsequently, the reporting destination determination part 57 of the TV conference management system $50_1$ determines whether the reporting destination with respect to the request source terminal (the TV conference-specific terminal 10ab) is set in the ID management table (step S1603).

In this step, since the reporting destination of the TV conference-specific terminal 10ab (the communications ID "01ab") is not set in the ID management table, step S1605 is processed. Note that when the reporting destination of the request source terminal is set in the ID management table, step S1604 is processed. The process in step S1604 will be illustrated with reference to FIG. 18 later.

Subsequently, the reporting destination determination part 57 of the TV conference management system $50_1$ determines whether there are destination terminal candidates on the destination list of the request source terminal (the TV conference-specific terminal 10ab) that have set the TV conference management system $50_1$ itself as the reporting destination in the ID management table (step S1605).

In this example, since the "TV conference management system" is set as the reporting destination of the mobile terminal 20aa (the communications ID "02aa") serving as the destination terminal candidate included in the destination list of the TV conference-specific terminal 10ab, step S1606 is processed.

Note that when there are no destination terminal candidates that have set the transmission system itself (the TV conference management system $50_1$) as the reporting destination in the ID management table, the process ends. That is, in such a case, although there may be transmission terminals managed by another transmission management system 50 in the destination terminal candidates included in the acquired destination list, there is no need to report the operating status of the request source terminal to another transmission management system 50. That is, the transmission terminals managed by another transmission management system 50 included in the destination list do not exchange status information such as operating statuses. This may be a case where the text chat-specific terminal is included as the destination terminal candidate on the destination list of the TV conference-specific terminal 10. In such a case, the TV conference-specific terminal 10 and the text chat-specific transmission terminal are unable to their user services each other, and the status information such as the operating statuses need not to be reported to or acquired from each other.

Subsequently, the reporting destination determination part 57 of the TV conference management system $50_1$ determines that the operating status of the request source terminal needs to be reported to the transmission management system 50 that manages the destination terminal candidates setting the TV conference management system $50_1$ itself as the reporting destination, and that the operating statuses of the destination terminal candidates of the request source terminal need to be acquired (step S1606).

In this example, the reporting destination determination part 57 of the TV conference management system $50_1$ determines that the operating status needs to be reported to and acquired from the text chat management system $50_2$ that manages the mobile terminal 20aa (the communications ID "02aa") included in the destination list of the TV conference-specific terminal 10ab, and ends the process.

Subsequently, the following description is given by referring back to FIG. 14. In the operating status report determination process in step S1407, when it is determined that the operating status needs to be reported and acquired with respect to another transmission management system 50, steps S1408 to S1410 are processed. In this example, since it is determined that the operating status needs to be reported and acquired with respect to the text chat management system $50_2$ as described above, steps S1408 to S1410 are processed.

Initially, the transmitter-receiver 51 of the TV conference management system 501 transmits an acquisition request of the operating status "online (communicative)" of the request source terminal (the TV conference-specific terminal 10ab), and an acquisition request of the operating status of the corresponding destination terminal candidate (the mobile terminal 20aa) to the text chat management system $50_2$ (step S1408).

Subsequently, when the terminal status reporting-acquiring part 55 of the text chat management system $50_2$ receives the operating status of the request source terminal and the acquisition request of the operating status of the corresponding destination terminal candidate, the terminal status reporting-acquiring part 55 acquires the operating status of the destination terminal candidate, and reports the operating status of the request source terminal to the destination terminal candidate (step S1409). Note that the operating status of the request source terminal is reported to the destination terminal candidate only when the operating status of the destination terminal candidate is "online".

In this case, the terminal status reporting-acquiring part 55 of the text chat management system $50_2$ acquires the operating status of the mobile terminal 20aa (the communications ID "02aa") serving as the destination terminal candidate from the ID management DB 9003. Then, since the operating status of the mobile terminal 20aa is "online", the terminal status reporting-acquiring part 55 of the text chat management system $50_2$ reports to the mobile terminal 20aa that the TV conference-specific terminal 10ab is "online". Hence, the mobile terminal 20aa may be able to detect that the TV conference-specific terminal 10ab serving as the destination terminal candidate on the destination list of the mobile terminal 20aa itself is "online".

Subsequently, the transmitter-receiver 51 of the text chat management system $50_2$ reports the operating status of the destination terminal candidate (the mobile terminal 20aa) to the TV conference management system $50_1$ (step S1410).

The terminal status reporting-acquiring part 55 of the TV conference management system $50_1$ acquires the operating status of the transmission terminal managed by itself (the TV conference management system $50_1$), among the destination terminal candidates of the request source terminal (the TV conference-specific terminal 10ab), from the ID management DB 9003 (step S1411). In this case, the terminal status reporting-acquiring part 55 of the TV conference management system $50_1$ acquires the operating status of the transmission terminal serving as the TV conference-specific terminal 10aa (the communications ID "01aa") managed by itself (the TV conference management system $50_1$), among the destination terminal candidates of the TV conference-specific terminal 10ab, from the ID management DB 9003.

Then, the transmitter-receiver 51 of the TV conference management system $50_1$ transmits the destination list information (the communications ID of the destination terminal candidate, etc.), and the operating statuses of the destination terminal candidates acquired in steps S1410 and 1411 to the request source terminal (the TV conference-specific terminal 10ab) (step S1412). In this example, the transmitter-receiver 51 transmits the destination list information of the TV conference-specific terminal 10ab serving as the request source terminal, and the operating statuses of the TV conference-specific terminal 10aa and the mobile terminal 20aa serving as the destination terminal candidates included in the destination list to the TV conference-specific terminal 10ab.

When the destination list creating part 17 of the TV conference-specific terminal 10ab receives the destination list information and the operating statuses of the destination terminal candidates from the TV conference management system $50_1$, the destination list creating part 17 creates a destination list and displays the destination list on the display 120ab (step S1413). Note that the destination list illustrated in FIG. 16 may be displayed on the display 120ab of the TV conference-specific terminal 10ab.

Figure 16:
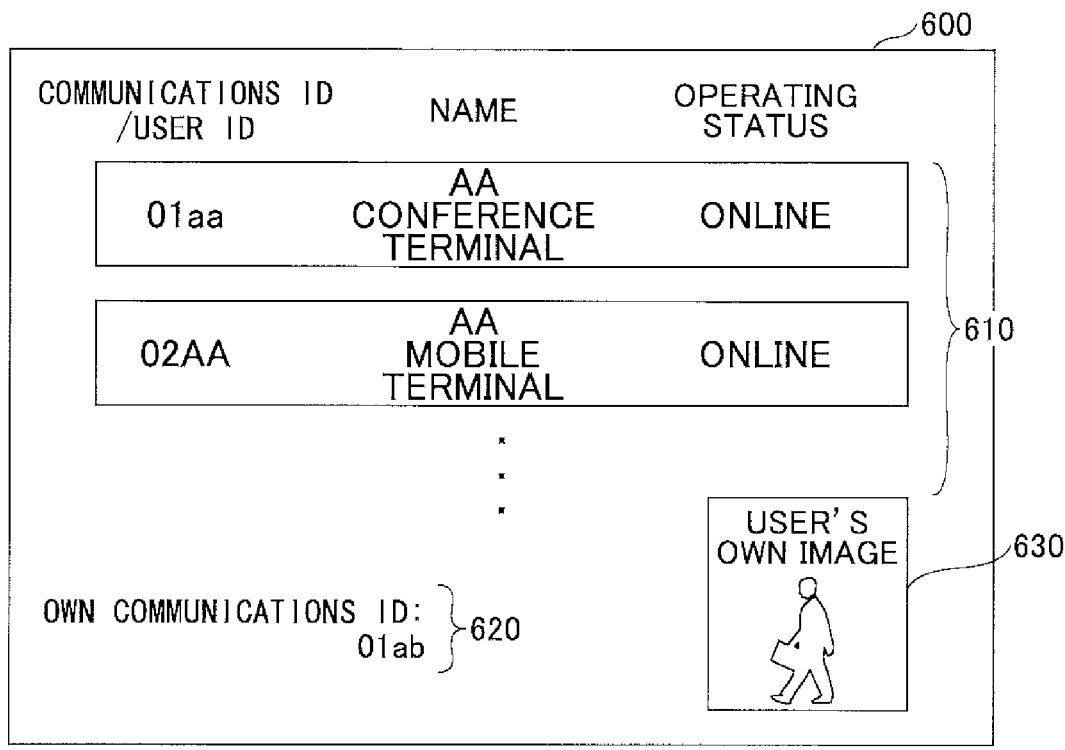
FIG. 16 is an image diagram illustrating an example of the destination list display screen displayed on the TV conference-specific terminal.

FIG. 16 is an image diagram illustrating an example of the destination list display screen displayed on the TV conference-specific terminal. The destination list display screen 600 illustrated in FIG. 16 includes a destination list 610, the communications ID 620 of the own terminal, and an image display 630 imaged by the own terminal. The destination list 610 displays a list of the transmission terminals serving as the destination terminal candidates of the TV conference-specific terminal 10ab. The list of the destination terminal candidates displays the communications IDs, names and operating statuses of the destination terminal candidates.

The communications ID 620 indicates the communications ID of the TV conference-specific terminal 10ab that displays the destination list display screen 600. The image display 630 displays an image imaged by the camera 1021 of the TV conference-specific terminal 10ab that displays the destination list display screen 600.

The user of the TV conference-specific terminal 10ab may be able to select a desired one of the transmission terminals that the user wishes to perform communications with from the destination list 610 of the destination list display screen 600 so as to perform the TV conference with the selected transmission terminal. Note that among the destination terminal candidates displayed on the destination list 610, the transmission terminal having the operating status being "offline" or the transmission terminal that is engaged in the communications with another transmission terminal even when the operating status is "online", the user of the TV conference-specific terminal 10ab may fail to perform the TV conference with such a transmission terminal.

Figure 17:
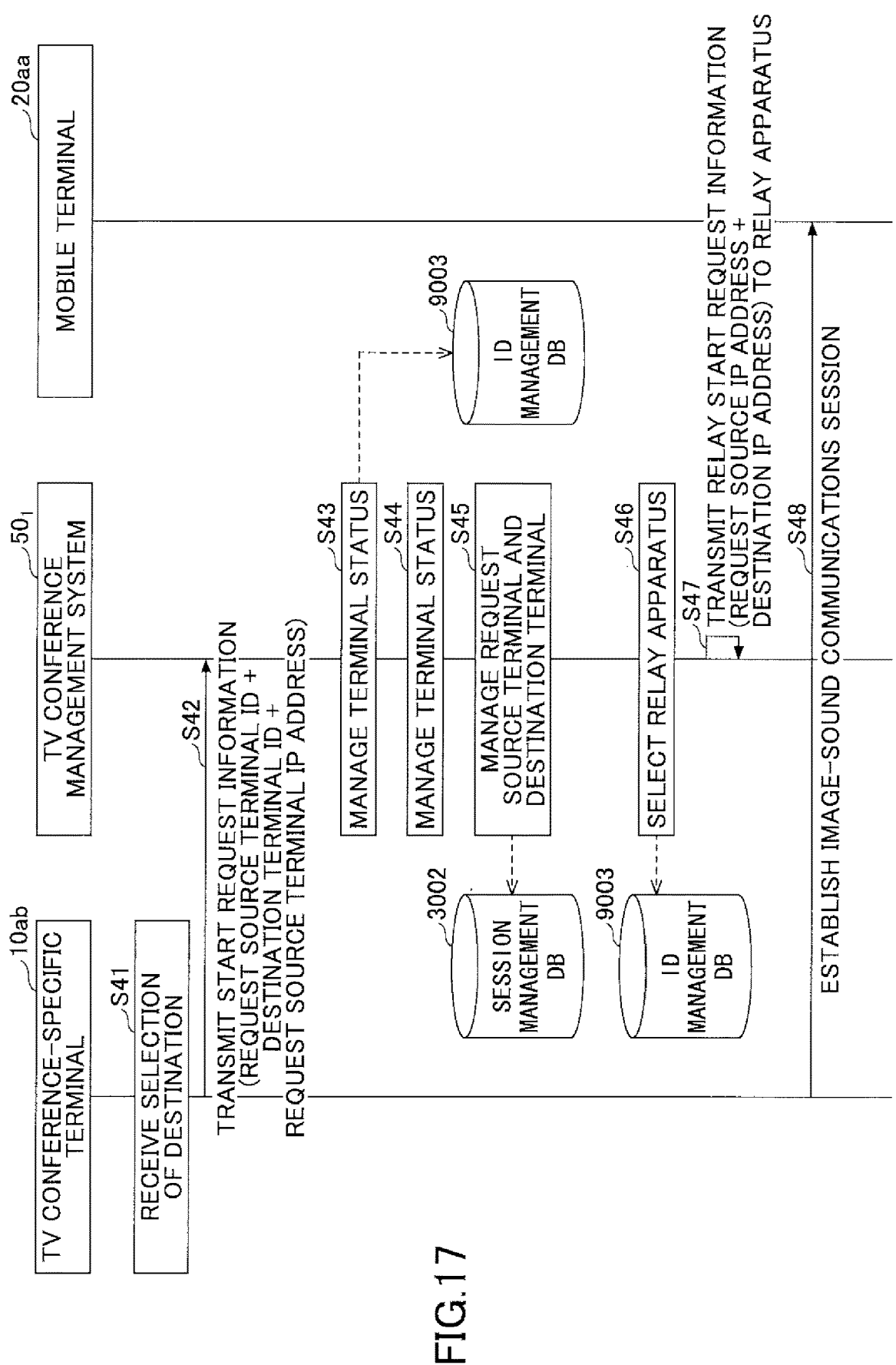
FIG. 17 is a sequence diagram illustrating an example of a process in which the TV conference-specific terminal establishes a session.

Next, a description is given, with reference to FIG. 17, of a process in which the TV conference-specific terminal establishes a session. In this embodiment, the request source terminal 10ab (the TV conference-specific terminal 10ab) is capable of performing communications with the TV conference-specific terminal 10aa having the operating status "online" and the communications ID "01aa", and the mobile terminal 20 having the communications ID "02aa", among the TV conference-specific terminals 10 serving as the destination candidates, based on the destination status information received in step S1412. The following description illustrates a case where the user having the request source terminal 10aa selects starting the communications with the mobile terminal 20 having the communications ID "02aa".

FIG. 17 is a sequence diagram illustrating an example of a process in which the TV conference-specific terminal 10ab establishes a session. Initially, when the user presses the operation button 108 to select the mobile terminal 20aa, the operations input receiver 12 of the TV conference-specific terminal 10ab receives the selection of the destination terminal (step S41).

Subsequently, the transmitter-receiver 11 of the TV conference-specific terminal 10ab transmits start request information indicating a desire to start communications including the communications ID "01ab" of the request source terminal lab and the communications ID "02aa" of the destination terminal 20aa to the TV conference management system $50_1$ (step S42). Hence, the transmitter-receiver 51 of the TV conference management system $50_1$ receives the start request information and detects the IP address "1.2.1.3" of the request source terminal 10ab serving as the transmission source.

Subsequently, the status manager 53 changes field parts of the operating statuses of the records including the communications ID "01ab" and the communications ID "02aa" into "engaged" in the ID management table of the ID management DB 9003, based on the communications ID "01ab" of the request source terminal 10ab and the communications ID "02aa" of the destination terminal 20aa included in the start request information (step S43).

The TV conference management system $50_1$ generates a selection session ID for use in the execution of the session for selecting the relay apparatus 30 (step S44). Subsequently, the session manager 53 stores and manages the selection session ID "set" generated in step S44 in association with the communications ID "01ab" of the request source terminal 10aa, and the communications ID of the destination terminal 20aa in the session management table of the nonvolatile storage 3000 (step S45).

Thereafter, the transmission management system 50 extracts the relay apparatus 30 for relaying the communications between the request source terminal 10ab and the mobile terminal 20aa serving as the destination terminal; however, a detailed description is omitted from the specification.

Next, the session manager 56 of the TV conference management system $50_1$ stores and manages the relay apparatus ID "111a" of the selected relay apparatus 30a in a field part of the relay apparatus ID having the selection session ID "se1" in the session management table of the session management DB 3002 (step S46).

The transmitter-receiver 51 transmits relay start request information to the relay apparatus 30a (step S47). The relay start request information includes respective IP addresses ("1.2.1.3" and "1.3.2.4") of the request source terminal 10ab and the destination terminal 20aa.

Accordingly, the relay apparatus 30a detects the IP addresses of the TV conference-specific terminal 10ab and the mobile terminal 20aa, and establishes a session for communicating the image data and sound data between the TV conference-specific terminal 10ab and the mobile terminal 20aa (step S48). As a result, the TV conference-specific terminal 10ab and the mobile terminal 20aa may be able to start the TV conference.

Logging into Text Chat Management System

Figure 18:
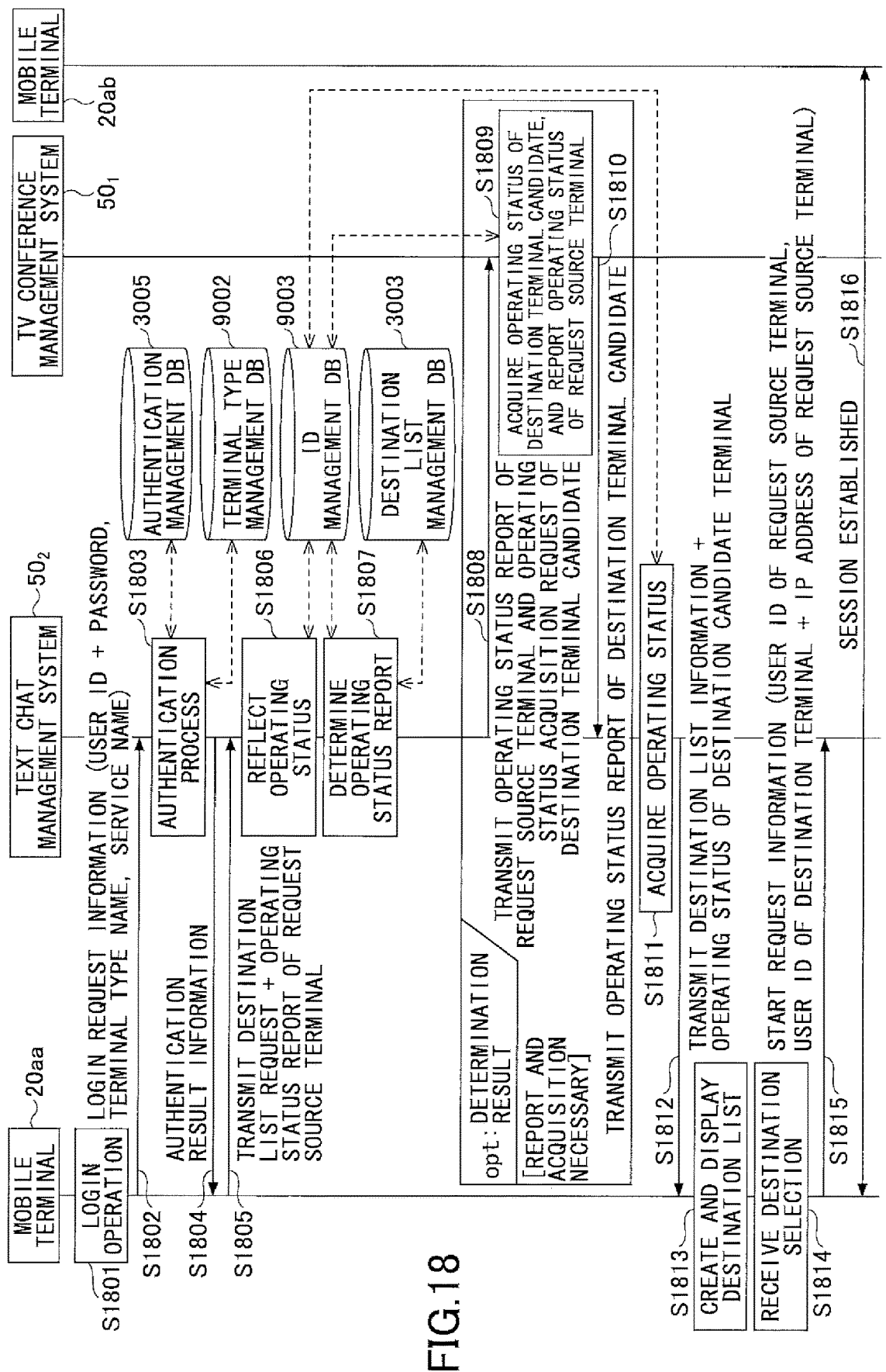
FIG. 18 is a sequence diagram illustrating an example of a process from a mobile terminal login step to a destination list display step according to an embodiment.

Next, a description is given, with reference to FIG. 18, of a detailed process of displaying a destination list that is a list of destination terminal candidates for the mobile terminal 20aa by a user operating the mobile terminal 20aa. FIG. 18 is a sequence diagram illustrating an example of a process from a mobile terminal login step to a destination list display step according to an embodiment. Note that FIG. 18 differs from FIG. 14 in that the communications ID is changed to the user ID, and the login destination is changed to the text chat management system $50_2$. Hence, the following description mainly illustrates such differences. The mobile terminal 20aa is an example of a first transmission terminal, and the mobile terminal 20ab is an example of a second transmission terminal.

The user performs a login operation via the mobile terminal 20 via the input device 202 (step S1801). The operations input receiver 12 of the mobile terminal 20 receives the login operation and transmits login request information to the text chat management system $50_2$ (step S1802). This login request information includes a user ID and a password of the mobile terminal 20aa serving as the request source terminal. Further, the login request information includes a terminal type name, and service names of the mobile terminal 20. Note that the user ID and the password are input from the user via the operations input receiver 12 when the user performs a login operation. Further, the text chat management system $50_2$ may be able to detect the IP address of the mobile terminal 20aa serving as the transmission side.

Subsequently, when the authentication part 52 of the text chat management system $50_2$ receives the login request information via the transmitter-receiver 51, the authentication part 52 performs an authentication process (step S1803). This authentication process is similar to that of the TV conference-specific terminal 10ab.

The transmitter-receiver 51 of the text chat management system $50_2$ transmits an authentication result generated in the authentication process of the step S1803 to the mobile terminal 20aa (step S1804). In the following description, it is assumed that the text chat management system $50_2$ has transmitted the authentication result indicating a successful login to the mobile terminal 20aa.

When the transmitter-receiver 11 of the mobile terminal 20aa receives the authentication result indicating the successful login from the text chat management system $50_2$, the mobile terminal 20aa transmits a destination list request and a report of an operating status of the mobile terminal 20aa (step S1805). Note that the operating status of the mobile terminal 20aa is information indicating the operating status being "online (communicative)".

Subsequently, the status manager 53 of the text chat management system $50_2$ changes the operating status of the request source terminal (the mobile terminal 20aa) in the ID management DB 9003 of the common information management apparatus 80 into "online (communicative)" (step S1806).

Then, the text chat management system $50_2$ performs a process of determining the operating status report (an operating status report determination process) (step S1807). This operating status report determination process is similar to that illustrated with reference to FIG. 15. However, since the "TV conference management system" set in the reporting destination in the ID management system of the mobile terminal 20aa (the user ID "02Aa") in step S1603, step S1604 is processed.

The reporting destination determination part 57 of the text chat management system $50_2$ determines that the operating status of the request source terminal needs to be transmitted to another transmission management system 50 (the TV conference management system $50_1$) set as the reporting destination of the request source terminal in the ID management table, and also that the operating statuses of the destination terminal candidates need to be acquired, and then ends the process (step S1604). As described above, when the reporting destination of the request source terminal is set in the ID management table, the reporting destination determination part 57 determines that the operating status of the request source terminal needs to be transmitted to the reporting destination, and that the operating statuses of the destination terminal candidates of the request source terminal need to be acquired.

Referring back to FIG. 18, in the operating status report determination process in step S1807, when it is determined that the operating status needs to be reported and acquired with respect to another transmission management system 50, steps S1808 to S1810 are processed. In this example, since it is determined that the operating status needs to be reported and acquired with respect to the TV conference management system $50_1$ as described above, steps S1808 to S1810 are processed.

Initially, the transmitter-receiver 51 of the text chat management system $50_2$ transmits an acquisition request of the operating status "online (communicative)" of the request source terminal (the mobile terminal 20aa), and an acquisition request of the operating status of the corresponding destination terminal candidate (the TV conference-specific terminal 10ab) to the TV conference management system $50_1$ (step S1808).

Subsequently, when the terminal status reporting-acquiring part 55 of the TV conference management system $50_1$ receives the operating status of the request source terminal and the acquisition request of the operating status of the corresponding destination terminal candidate, the terminal status reporting-acquiring part 55 acquires the operating status of the destination terminal candidate, and reports the operating status of the request source terminal to the destination terminal candidate (step S1809). Note that the operating status of the request source terminal is reported to the destination terminal candidate only when the operating status of the destination terminal candidate is "online".

In this case, the terminal status reporting-acquiring part 55 of the TV conference management system $50_1$ acquires the operating status of the TV conference-specific terminal 10ab (the communications ID "01ab") serving as the destination terminal candidate from the ID management DB 9003. Since the operating status of the TV conference-specific terminal 10ab is "offline", the operating status of the request source terminal (the mobile terminal 20aa) is not reported to the TV conference-specific terminal 10ab.

Subsequently, the transmitter-receiver 51 of the text chat management system $50_2$ reports the operating status of the destination terminal candidate (the TV conference-specific terminal 10ab) to the text chat management system $50_2$ (step S1810).

The terminal status reporting-acquiring part 55 of the text chat management system $50_2$ acquires the operating status of the transmission terminal managed by itself (the text chat management system $50_2$), among the destination terminal candidates of the request source terminal (the mobile terminal 20aa), from the ID management DB 9003 (step S1811). In this case, the terminal status reporting-acquiring part 55 of the text chat management system $50_2$ acquires the operating status of the mobile terminal 20ab (the user ID "02AB") managed by itself (the text chat management system $50_2$), among the destination terminal candidates of the mobile terminal 20aa, from the ID management DB 9003.

Then, the transmitter-receiver 51 of the text chat management system $50_2$ transmits the destination list information (the communications ID of the destination terminal candidate, etc.), and the operating statuses of the destination terminal candidates acquired in steps S1810 and 1811 to the request source terminal (the mobile terminal 20aa) (step S1812). In this example, the transmitter-receiver 51 transmits the destination list information of the mobile terminal 20aa serving as the request source terminal, and the operating statuses of the mobile terminal 20ab and the TV conference-specific terminal 10ab serving as the destination terminal candidates included in the destination list to the mobile terminal 20aa.

When the destination list creating part 17 of the mobile terminal 20aa receives the destination list information and the operating statuses of the destination terminal candidates from the text chat management system $50_2$, the destination list creating part 17 creates a destination list and displays the destination list on the display device 203 (step S1813). Note that the destination list illustrated in FIG. 19 may be displayed on the display device 203 of the mobile terminal 20aa.

Figure 19:
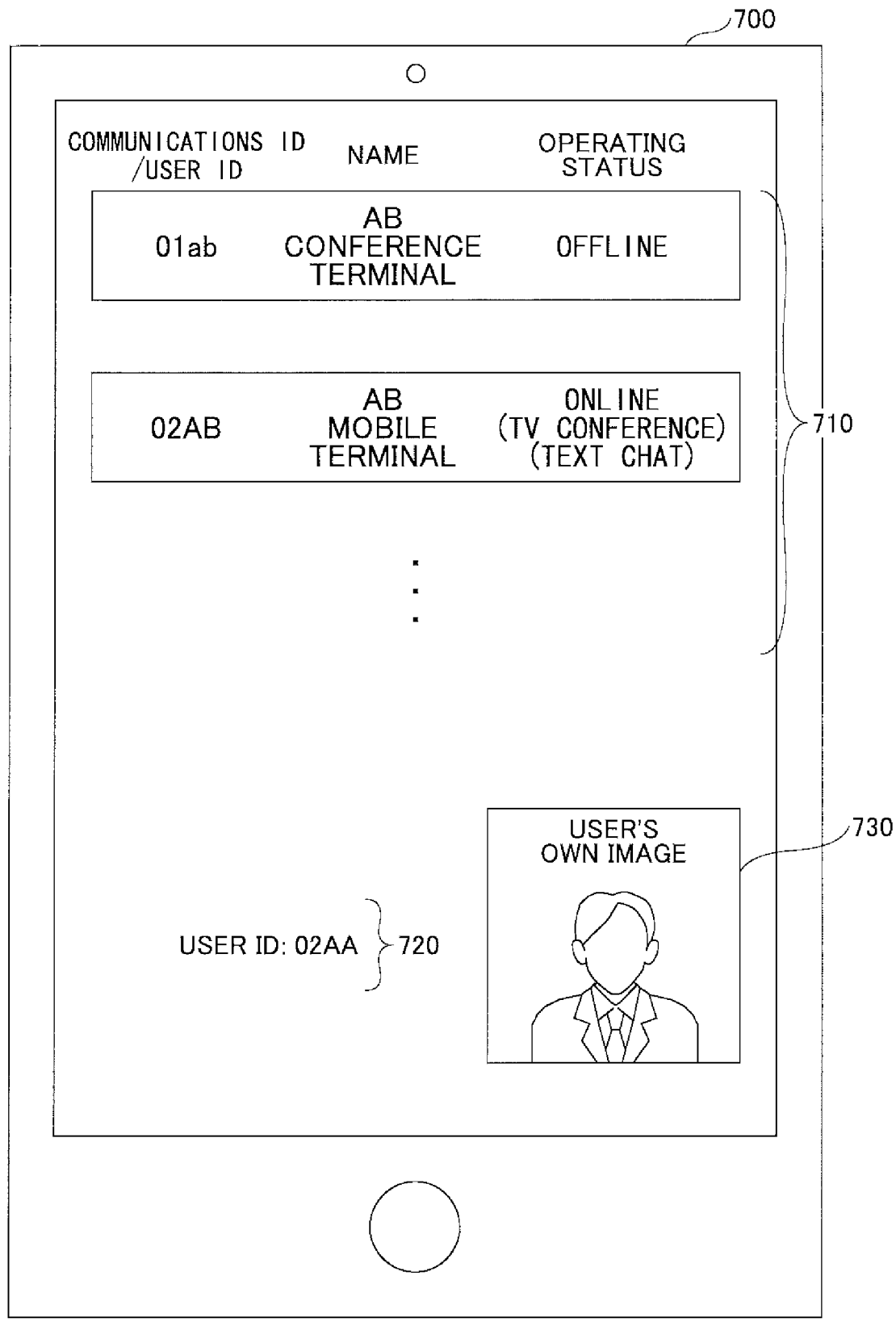
FIG. 19 is an image diagram illustrating an example of the destination list display screen displayed on the mobile terminal.

FIG. 19 is an image diagram illustrating an example of the destination list display screen displayed on the mobile terminal. The destination list display screen 700 illustrated in FIG. 19 includes a destination list 710, the user ID 720 of the own terminal, and an image display 730 imaged by the own terminal. The destination list 710 displays a list of the transmission terminals serving as the destination terminal candidates of the mobile terminal 20aa. The list of the destination terminal candidates displays the communications IDs, the user IDs, names, the operating statuses of the destination terminal candidates, and the services (TV conference, text chat) available to the destination terminal candidates.

The user ID 720 indicates the user ID of the mobile terminal 20aa that displays the destination list display screen 700. The image display 730 displays an image imaged by the camera 210 of the mobile terminal 20aa that displays the destination list display screen 700.

The following description is given by referring back to FIG. 18. The user of the mobile terminal 20aa selects a desired one of the transmission terminals the user wishes to perform the communications with from the destination list 710 of the destination list display screen 700 (step S1814).

Subsequently, the transmitter-receiver 11 of the mobile terminal 20aa transmits start request information indicating a desire to start communications including the user ID "02AA" of the request source terminal 20aa and the user ID "02AB" of the destination terminal 20ab to the text chat management system $50_2$ (step S1815). The start request information is an example of a communications connecting request.

Accordingly, the text chat management system $50_2$ reads the IP address of the mobile terminal 20ab serving as the destination terminal by referring to the ID management table, and establishes a text chat session between the mobile terminal 20aa and the mobile terminal 20ab (step S1816).

The text chat management system $50_2$ transmits or receives text chat data between the mobile terminal 20aa and the mobile terminal 20ab. In this case, it is not necessary for the relay apparatus 30 to establish a session; however, the relay apparatus 30 may relay the text chat data.

Logging into TV Conference Management System Utilizing Authentication by Text Chat Management System As described above, in this embodiment, the transmission management system that has received a login request transmits a report of the status information such as the operating status of the transmission terminal associated with the login request to another transmission management system. Further, the transmission management system may be able to acquire the status information of a predetermined transmission terminal managed by another transmission management system and provide the user with the acquired status information.

However, in the related art technology, the user who has logged into the text chat management system needs to have the communications ID and password in order to log into the TV conference management system, the user needs to have the user ID and password in order to log into the text chat management system.

Accordingly, in the transmission system according to this embodiment, the user may be able to log into the TV conference management system $50_1$ by utilizing a condition in which the user has logged into the text chat management system $50_2$, or the user may be able to log into the text chat management system $50_2$ by utilizing a condition in which the user has logged into the TV conference management system $50_1$. In the following, such processes are described.

Figure 20:
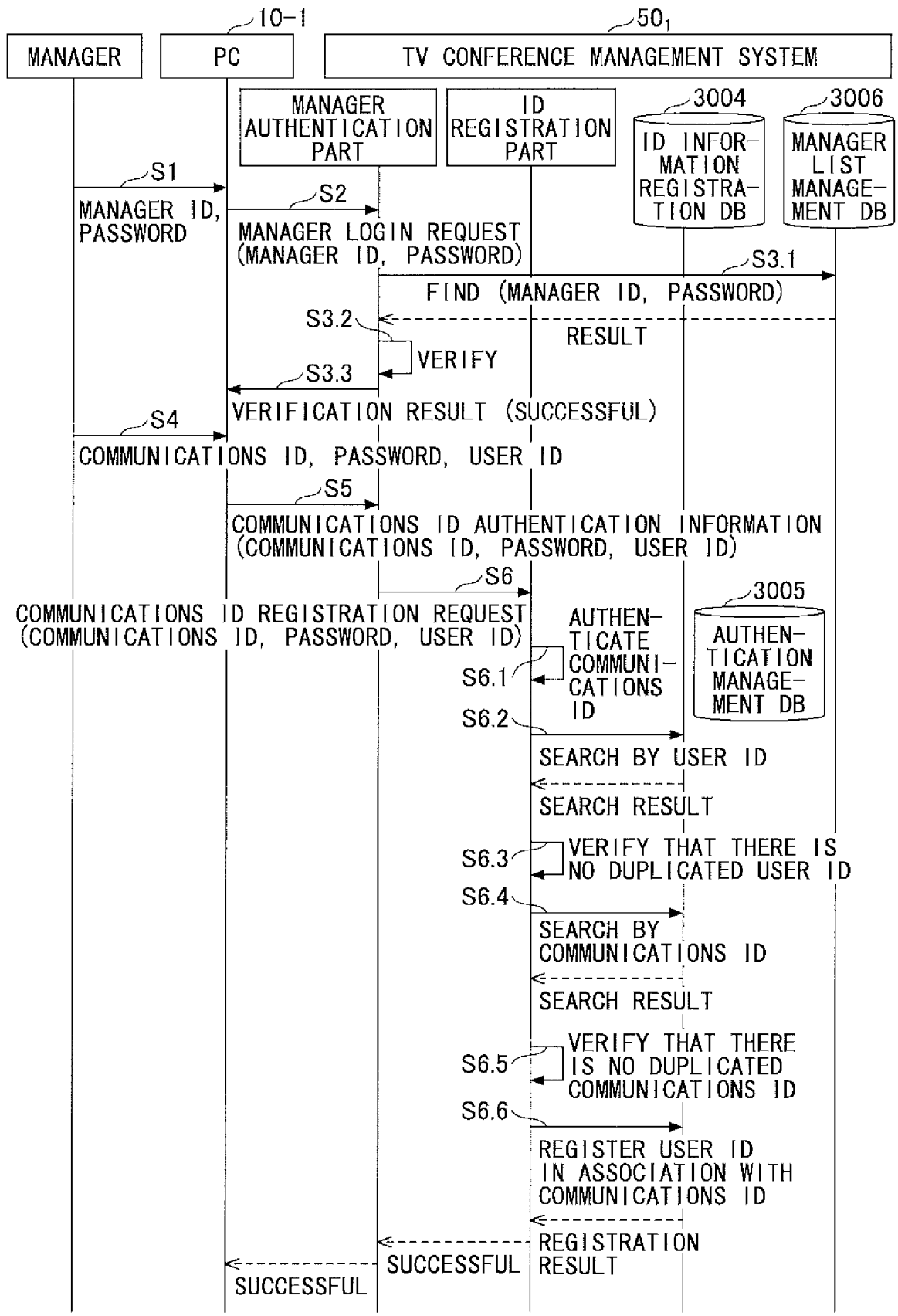
FIG. 20 is a sequence diagram illustrating an example of a process in which a manager who operates a PC registers a user ID and a communications ID in the ID information registration table.

Registration of Communications ID and User ID in ID Information Registration Table First, a description is given, with reference to FIG. 20, of registration of the communications ID in association with the user ID. When the communications ID is registered in association with the user ID, the user who has logged into one of the TV conference management system $50_1$ and the text chat management system $50_2$ may be able to acquire the ID (the communications ID or the user ID) of the other one of the TV conference management system $50_1$ and the text chat management system $50_2$. Accordingly, the user who has once logged into one of the systems may be able to use the other system into which the user has not logged.

FIG. 20 is a sequence diagram illustrating an example of a process in which a manager who operates a PC registers the user ID and the communications ID in the ID information registration table.

First, the manager operates a PC 10-1 to log into the TV conference management system 50₁. The PC 10-1 may be any apparatus insofar as the apparatus is able to log into the TV conference management system 50₁, and the above-described communications terminal may be given as an example of such an apparatus. In step S1, the manager operates a PC 10-1 to display a web page for registering the communications ID from the TV conference management system 50₁, and inputs a manager ID and a password. In step S2, the PC 10-1 transmits the manager ID and password as a manager login request to the manager authentication part 61 of the TV conference management system 50₁.

In step S3.1, the manager authentication part 61 searches the manager list table illustrated in FIG. 10 for the manager ID and password to determine whether the manager ID and password are registered in the manager list table. Note that in FIG. 20, a command "find" is cited; however, this command "find" is only an example, and the command is not limited to "find". The manager authentication part 61 acquires a search result from the manager list table. In this example, when a combination of the manager ID and the password transmitted with the command "find" is registered in the manager list table, the manager authentication part 61 acquires (receives) the manager ID and the password identical to those transmitted with the command "find" as the search result. In step S3.2, the manager authentication part 61 verifies whether the authentication of the manager is established based on the acquired search result. That is, the manager authentication part 61 verifies whether the manager ID and password transmitted with the command "find" match the manager ID and password acquired as the search result. In step S3.3, the manager authentication part 61 transmits a verification result (successful) to the PC 10-1. In step S4, the manager inputs the communications ID, the password, and the user ID into the PC 10-1. This password has been registered in association with the communications ID in the authentication management table illustrated in FIG. 8A.

Figure 21:
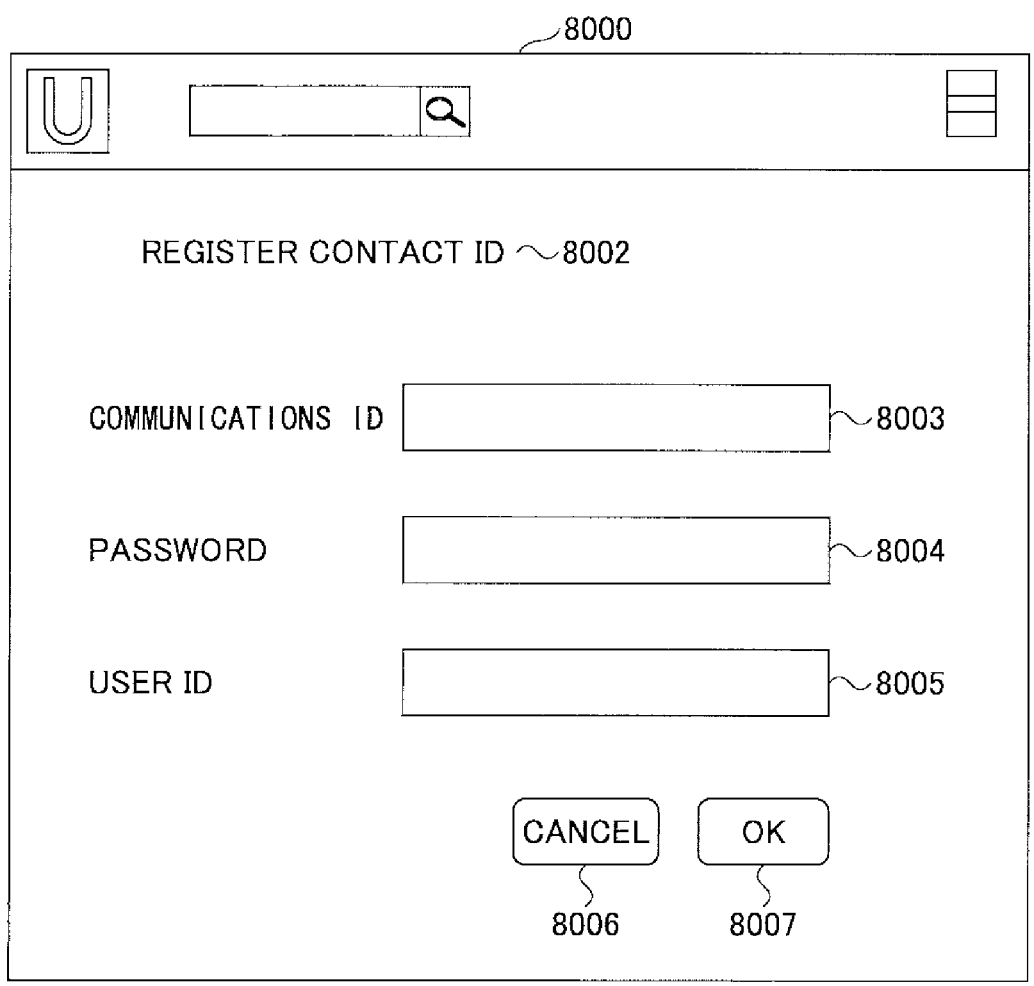
FIG. 21 is a diagram illustrating an example of an ID-password input screen.

FIG. 21 is a diagram illustrating an example of an ID-password input screen 8000. The ID-password input screen 8000 is used by the manager for registering the communications ID, for example.

The ID-password input screen 8000 includes a message 8002 for indicating the ID-password input screen 8000, a communications entry field 8003 for inputting the communications ID, a password entry field 8004 for inputting the password, a user ID entry field 8005 for inputting the user ID, a cancel button 8006 for cancelling the registration of the communications ID and the password, and an OK button for transmitting the communications ID and the password to the TV conference management system 50₁. This password is an example of authentication identification information.

In this example of the ID-password input screen 8000, one communications ID is registered. However, when the manager manages two or more communications IDs, the manager may select one of the communications IDs subject to management and associate the selected communications ID with the user ID, or may register two or more communications IDs in association with the respective user IDs.

Note that there is a case where the user ID is used as the manager ID. That is, when the manager and the user are the same, the manager may use the user ID instead of the manager ID. In such a case, the manager logs into the system with the user ID, and hence, the manager only needs to input the communications ID and the password, and does not need to input the user ID.

The following description is given by referring back to FIG. 20. It is assumed that the user has pressed the OK button 8007. In step S5, the PC 10-1 transmits the communications ID input into the communications ID entry field 8003, the password input into the password entry field 8004, the user ID input into the user ID entry field 8005 to the manager authentication part 61. In step S6, the manager authentication part 61 transmits the communications ID, the user ID, and the password with a communications ID registration request to the ID registration part 60. In step S6.1, the ID registration part 60 authenticates the communications ID and the password requested for registration. That is, the ID registration part 60 determines whether the authentication is established based on whether the communications ID and the password requested for registration are registered in the authentication management table illustrated in FIG. 8A. In this example, it is assumed that the authentication is established (successful). In step S6.2, the ID registration part 60 searches for the user ID in the ID registration information table by the user ID transmitted from the PC 10-1. This is because the user ID needs to be unique despite the fact that the same user ID is already registered in the ID information registration table. In a case where the user ID and the communications ID are registered in a condition where the same user ID is already registered in the ID information registration table, the communications ID may fail to be uniquely identified by the user ID due to the fact that the different communications IDs are registered in association with one user ID. Note that the same user IDs are registered, the ID registration part 60 acquires this use ID as a search result.

In step S6.3, the ID registration part 60 verifies that the user ID transmitted from the PC 10-1 has not been registered in the ID registration information table by verifying that the search result does not include the user ID transmitted from the PC 10-1. In this example, it is assumed that the user ID has not been registered. In step S6.4, the ID registration part 60 searches for the communications ID in the ID registration information table by the communications ID transmitted from the PC 10-1. This is because the communications ID needs to be unique despite the fact that the same communications ID is already registered in the ID information registration table. In a case where the user ID and the communications ID are registered in a condition where the same communications ID is already registered in the ID information registration table, the user ID may fail to be uniquely identified by the communications ID due to the fact that the different user IDs are registered in association with one communications ID. Note that the same communications IDs are registered, the ID registration part 60 acquires this communications ID as a search result.

In step S6.5, the ID registration part 60 verifies that the communications ID transmitted from the PC 10-1 has not been registered in the ID registration information table by verifying that the search result does not include the communications ID transmitted from the PC 10-1. In this example, it is assumed that the communications ID has not been registered.

In step S6.6, the ID registration part 60 registers the communications ID in association with the user ID.

Note that when the duplicated user ID or the duplicated communications ID is detected in step S6.3 or S6.5, the ID registration part 60 overwrites the ID registration information table with a set of the user ID and the communications ID transmitted from the PC 10-1. For example, in a case where the user ID and the communications ID transmitted from the PC 10-1 are "01aa01AA", but a record of "01aa01CC" is registered in the ID registration information table, the ID registration part 60 overwrites "01aa01CC" with the "01aa01AA". When a record of "01cc01AA" is registered in the ID registration information table, the ID registration part 60 overwrites "01cc01AA" with the "01aa01AA". When two records of "01aa01CC" and "01cc01AA" are registered in the ID registration information table, the ID registration part 60 deletes any one of the records, and overwrites the remaining record with 01aa01AA".

Alternatively, the ID registration part 60 may transmit a set of the communications ID and the user ID already registered in the ID registration information table with an error to the PC 10-1, and encourage the user to delete the existing record for newly associating the communications ID and the user ID. In this example, the user may be able to select whether to delete the existing user ID and communications ID.

Logging into Text Chat Management System

Figure 22:
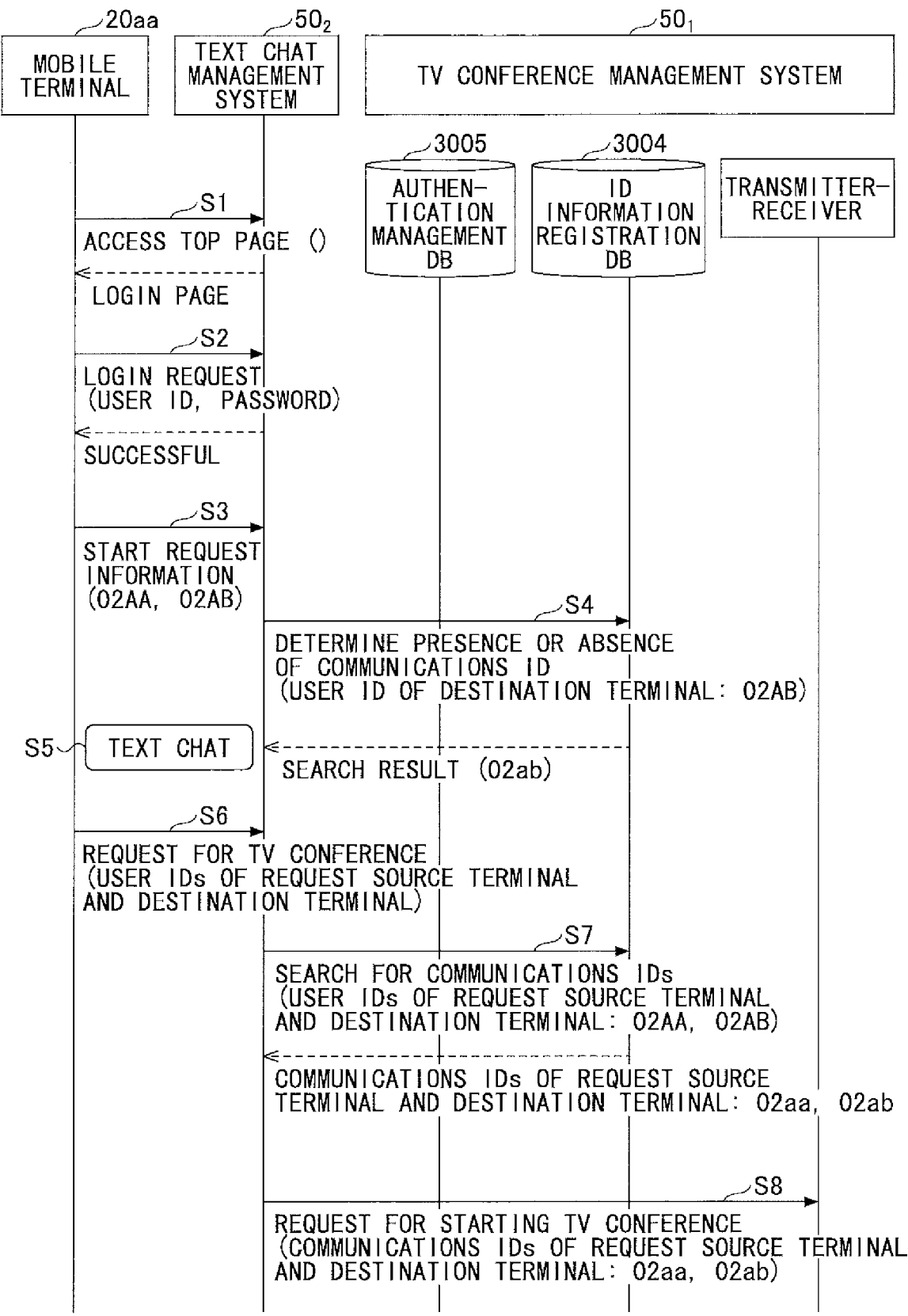
FIG. 22 is a sequence diagram illustrating an example of a process in which the mobile terminal conducts a TV conference after logging into the text chat system.

Next, a description is given, with reference to FIG. 22, of a process of logging into the text chat management system 50$_2$, and starting a TV conference. FIG. 22 is a sequence diagram illustrating an example of a process in which the mobile terminal 20 conducts a TV conference after logging into the text chat management system 50$_2$. In step S1, the mobile terminal 20aa accesses a top page of the text chat management system 50$_2$. As a result, the display device 203 of the mobile terminal 20aa displays a login screen.

Figure 23:
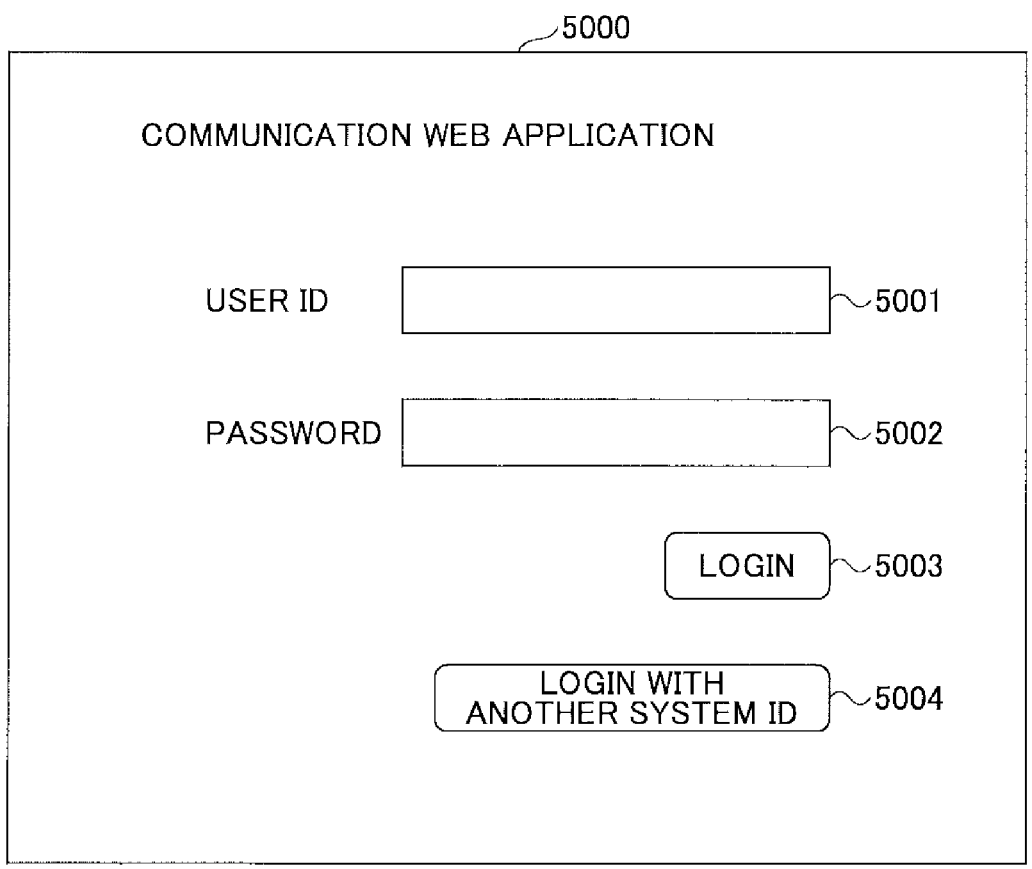
FIG. 23 is a diagram illustrating an example of the login screen.

FIG. 23 is a diagram illustrating an example of the login screen. The login screen 5000 includes a user ID entry field 5001, a password entry field 5002, a login button 5003, and a login with another system ID button 5004. The user is able to log in on the system via the login button 5003 or login with another system ID button 5004; however, the former case where the user selects the login button 5003 is illustrated first. In step S2, referring back to FIG. 22, when the user inputs the user ID and password in the login screen 5000, and presses the login button 5003, the mobile terminal 20aa transmits the user ID and password with the login request to the text chat management system 50$_2$. The authentication process performed by the text chat management system 50$_2$ is already described with reference to FIG. 18. As already illustrated with reference to FIG. 18, the display device 203 of the mobile terminal 20aa displays the destination list display screen illustrated in FIG. 19.

In step S3, the mobile terminal 20aa transmits the start request information illustrated in step S1814 of FIG. 18 to the text chat management system 50$_2$ by the user's selection of the destination terminal. The start request information includes the user ID (02AB) of the destination terminal. In step S4, the ID acquisition part 62 of the text chat management system 50$_2$ transmits the communications ID presence/absence determination to the ID information registration DB 3004 using the user ID included in the start request information. Since the communications ID (02ab) in association with the user ID (02AB) of the destination terminal is returned from the ID information registration DB 3004 as a search result, the ID acquisition part 62 of the text chat management system 50$_2$ is able to determine whether the mobile terminal 20aa is able to conduct the TV conference with a partner of the text chat. In step S5, the user operates the mobile terminal 20aa to perform text chat with a user of the destination terminal.

Figure 24:
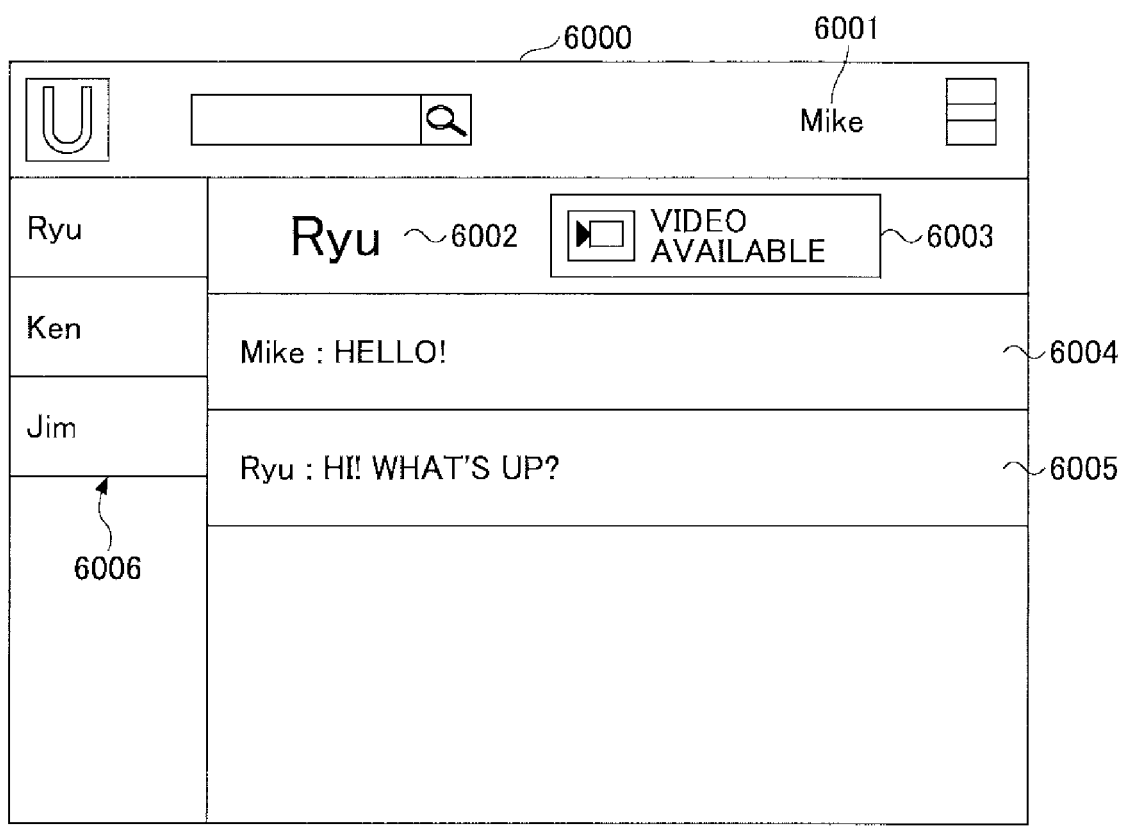
FIG. 24 is a diagram illustrating an example of a text chat screen.

FIG. 24 is a diagram illustrating an example of a text chat screen. The text chat screen 6000 includes a user name display 6001 indicating the user name of himself/herself, a partner user name display 6002 indicating a partner name of the text chat, a TV conference start button 6003, chat display fields 6004 and 6005, and a text chat available user display field 6006.

Initially, the user name display 6001 indicates that a user having the user name "Mike" has logged into the text chat management system 50$_2$. Further, the partner user name display 6002 indicates that a current chat partner is a user having the user name "Ryu". Further, the chat display field 6004 displays text input by the user having the user name "Mike", and the chat display field 6005 displays text input by the user having the user name "Ryu". In addition, the text chat available user display field 6006 displays user names of the users available for the text chat. The users available for the text chat indicate those who own the transmission terminals that are online (communicative), or those who own the transmission terminals having an operating status in the ID management table "online". That is, the users of the mobile terminals 20 that are online are among the destination terminal candidates included in the destination list illustrated in FIG. 19.

The "video available" presented on the TV conference start button 6003 indicates that the user "Mike" is able (ready) to start a TV conference with the current chat partner "Ryu". In the TV conference, the destination is specified by the communications ID as described above. Hence, in a condition where the user is ready to start the TV conference, at least the user ID and the communications ID of the user "Ryu" need to be associated with each other in the ID information registration table. Accordingly, the "video available" presented indicates the user ID and the communications ID are associated with each other in the ID information registration table.

In this embodiment, the TV conference management system 50$_1$ has the communications ID associated with the user ID. Hence, although the user "Mike" does not know the communications ID of the current chat partner "Ryu", the user "Mike" is able to conduct the TV conference only by transmitting the TV conference request to the user "Ryu". That is, the user "Mike" is able to hold the TV conference with the user "Ryu" by simply pressing the TV conference start button 6003. In step S6, referring back to FIG. 22, the user of the mobile terminal 20aa transmits the TV conference request to the mobile terminal 20ab having the user name "Ryu" to hold the TV conference with the mobile terminal 20ab by simply pressing the TV conference start button 6003 of the text chat screen 6000. This TV conference request includes the respective user IDs (02AA and 02AB) of the request source terminal and the destination terminal. In step S7, the ID acquisition part 62 of the text chat management system 50$_2$ searches the ID information registration DB 3004 by the respective user IDs (02AA and 02AB) of the request source terminal and the destination terminal transmitted with the TV conference request. As a search result, the respective communications IDs (02aa and 02ab) of the request source terminal and the destination terminal are acquired.

In step S8, the text/TV invoking part text 58 of the text chat management system 50$_2$ transmits a TV conference start request to the TV conference management system 50$_1$. The TV conference start request includes the respective communications IDs of the request source terminal and the destination terminal.

The start of the TV conference in step S8 corresponds to the transmission of the start request information in step S42 in FIG. 17. Hence, when the operating status is "online" and the IP address of the destination terminal is registered in the ID management table, the TV conference may be able to start as illustrated in FIG. 17.

Note that a technique for the destination terminal to transmit the IP address to the TV conference management system $50_1$ may include transmitting the IP address to the TV conference management system $50_1$ while conducting the text chat.

Logging into Another System with System ID

Next, a description is given of a case where login with another system ID button 5004 is pressed in the login screen 5000 illustrated in FIG. 23. The user may be able to specify the authentication destination by pressing the login button 5003 with the system ID button 5004. Note that the login with the system ID button 5004 may be prepared corresponding to the number of other systems.

Figures 25A, 25B:
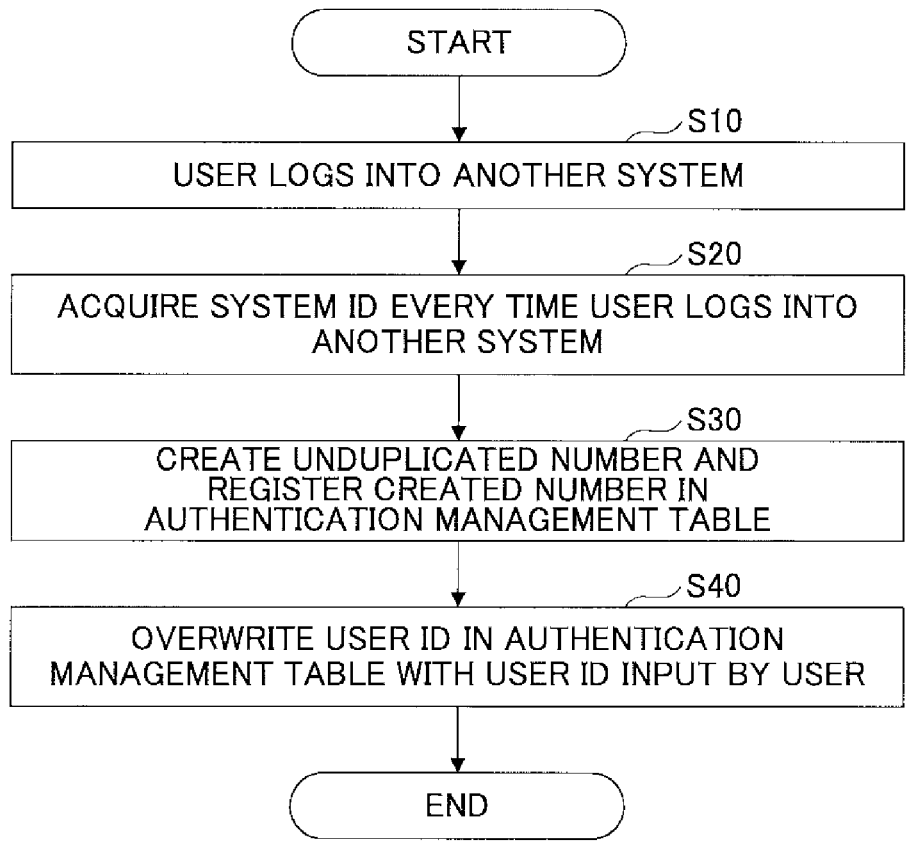
FIGS. 25A and 25B are diagrams illustrating an example of an authentication management table registering system IDs of other systems and an example of a process of registering the system IDs of other systems.

Since the user logs into another system with another system ID, the authentication management table registers the system Ids of the other systems. FIG. 25A is a diagram illustrating an example of an authentication management table registering the system IDs of other systems. The authentication management table illustrated in FIG. 25A enables the users to log into the text chat management system $50_2$ by utilizing the system IDs of other systems in addition to the user IDs of the text chat management system $50_2$. The authentication management table is an example of identification information registration information.

In the following, a description is given of a registration method in the authentication management table in FIG. 25A. In the text chat management system $50_2$, it is assumed that the user is able to log into the text chat management system $50_2$ with authentication information of another system in addition to the user ID. This embodiment utilizes capabilities of the user logging into another system A or another system B, and of the text chat management system $50_2$ acquiring the system ID from a login destination of the system A or the system B.

FIG. 25B is a flowchart illustrating an example of a registration process of the system ID. Step S10: The user presses a login button 5004 with another system ID in the login screen 5000 illustrated in FIG. 23. As a result, the user inputs a system ID and a password in the login screen of the other system (see an example in FIG. 27) to log into another system. Step S20: When the user has logged into another system, the other system sends the system ID to the text chat management system $50_2$. A process in which the system ID is transmitted will be illustrated later with reference to FIG. 26. Step S30: Another system linking part 59 of the text chat management system $50_2$ allocates the user a unique (unduplicated) number, and registers the user in association with the allocated number in the authentication management table. Step S40: Multiple user IDs may be associated with one user; however, the user may be prompted to input the user ID allocated in advance after the user has logged into the text chat management system $50_2$ with the system ID. When the user ID is already registered in the authentication management table, the user ID registered in step S30 is overwritten with the user ID input by the user.

As a result, the system ID and the user ID are associated. The user ID allocated may be any ID insofar as the ID is unique. The user may be able to create a password to be in association with the allocated user ID and register the password; however, the user may be able to log into the text chat management system $50_2$ without registering the password.

For example, the user IDs and passwords are registered for the users of the numbers 1, and 6 to 8, and hence, those users are able to log into the text chat management system $50_2$ without logging into another system.

The system ID of the system A and the user ID are registered for the user of the number 2. Hence, the user of the number 2 has logged into the text chat management system $50_2$ via the system A.

The system ID of the system B, the user ID and the password are registered for the user of the number 3. Hence, the user of the number 3 is capable of logging into the text chat management system $50_2$ without logging into another system, and has logged into the text chat management system $50_2$ via another system B.

The system ID of the system B, and the user ID are registered for the user of the number 4. Hence, he user of the number 4 has logged into the text chat management system $50_2$ via another system B.

The system IDs of the system A and the system B are registered for the user of the number 5. Hence, the user of the number 5 has logged into the text chat management system $50_2$ via the system A and the system B.

Thus, the correspondence between the user IDs and the system IDs is maintained based on the login results of other systems.

Note that when the user (e.g., see the user of the number 3) having his/her user ID and password already registered has logged into another system, the user ID "01BA" is able to be associated with the system ID "9876" of the system B by following the above step S40.

When the user ID is obtained as described above, the manager may be able to register the user ID in association with the communication ID as illustrated in FIG. 20. Hence, the user who has logged into the text chat management system by utilizing the authentication of another system may be able to use the TV conference management system seamlessly.

Further, the text chat management system $50_2$ may be merely provided with the number without having to be provided with the user ID. The text chat management system $50_2$ may be able to user the number as the user ID by securing the uniqueness of the number. When the manager registers the number in association with the communications ID, the number provides the effect similar to that of the user ID.

For example, since the system ID is associated with the number of the user of the number 9. Hence, the user of the number 9 has logged into the text chat management system $50_2$ via the system A. The user is provided with the unique number 9. Hence, the user of the number 9 may be able to start the TV conference when the number 9 is associated with the communications ID in the ID information registration DB 3004.

Login Process Using System ID

Figure 26:
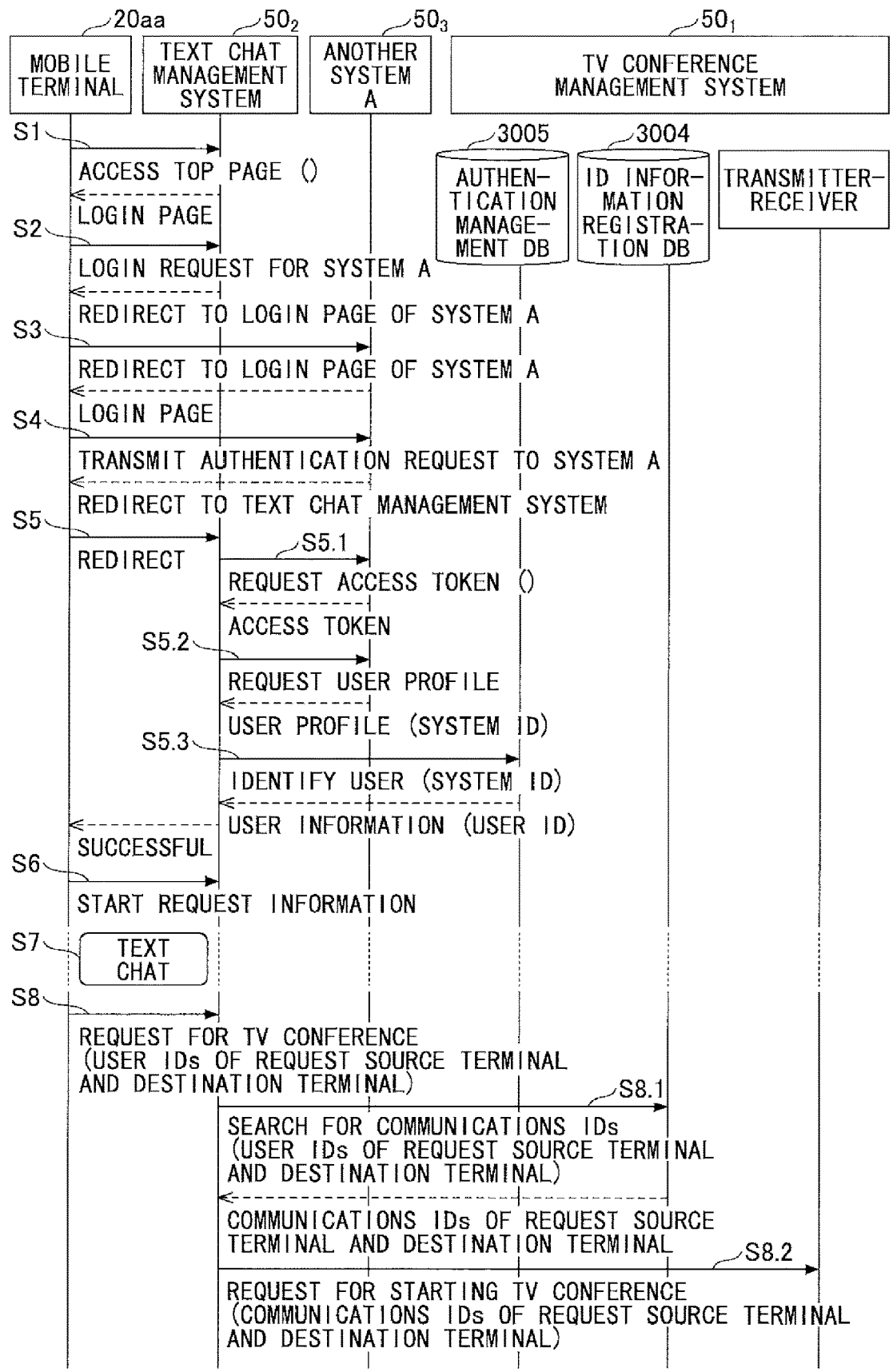
FIG. 26 is a sequence diagram illustrating an example of a process of logging into the text chat management system by utilizing the authentication management table registering the system ID of another system.

FIG. 26 is a sequence diagram illustrating an example of a process of logging into the text chat management system $50_2$ by utilizing the authentication management table registering the system IDs of another system $50_3$. In FIG. 26, an illustration is given of an example in which the system ID of the system A is used; however, the user of the system ID of the system B may follow a similar process. In step S1, the user operates the mobile terminal 20aa to access a top page of the text chat management system $50_2$. The display device 203 of the mobile terminal 20aa displays a login page of the text chat management system $50_2$ illustrated in FIG. 23. In step S2, the user presses a login button 5004 in the system $50_3$. As a result, the mobile terminal 20aa transmits a login request via the system A to the text chat management system $50_2$. In response, the text chat management system $50_2$ redirects the mobile terminal 20aa to a login page of the system A. In step S3, the mobile terminal 20aa is redirected to the login page of the system A. That is, the display of the mobile terminal 20aa moves to the login page of the system A. As a result, the display device 203 of the mobile terminal 20aa displays a login screen of the system A.

Figure 27:
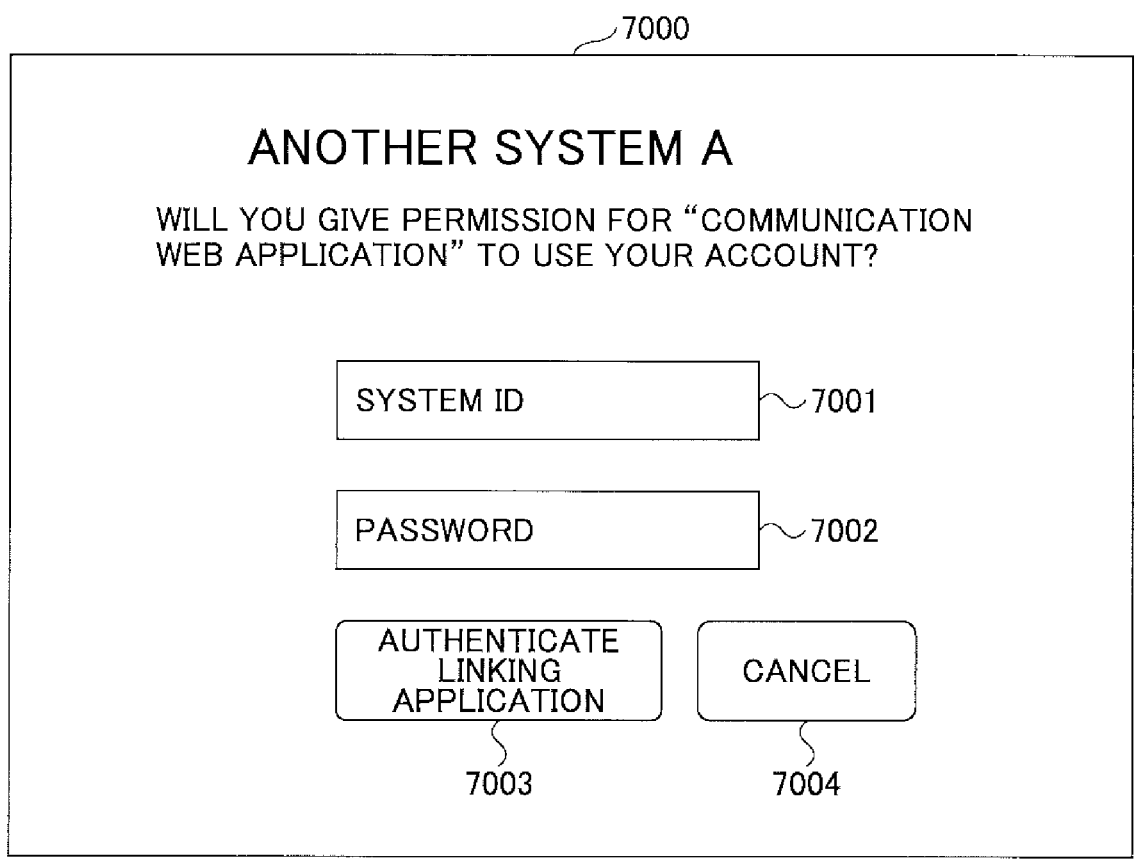
FIG. 27 is a diagram illustrating an example of the login screen of another system A.

FIG. 27 is a diagram illustrating an example of the login screen of the system A. The login screen 7000 of the system A includes a system ID entry field 7001, a password entry field 7002, a linking application authentication button 703, and a cancel button 7004. The user inputs the system ID of the system A in the system ID entry field 7001. Note that the user may input the user name instead of the system ID. Since the user name is associated with the system ID, the system A may be able to specify the system ID from the user name. The user presses the linking application authentication button 7003 to transmit an authentication request to the system A. In step S4, referring back to FIG. 26, the mobile terminal 20aa transmits the authentication request to the system A. In response, the system A authenticates the user, and requests the text chat management system $50_2$ to redirect the mobile terminal 20aa. In the following description, it is assumed that the authentication is established. The text chat management system $50_2$ may be able to acquire the system ID from the system A by the establishment of the authentication. In step S5, the mobile terminal 20aa is redirected to the text chat management system $50_2$. In step S5.1, the other system linking part 59 of the text chat management system $50_2$ requests the system A to transmit an access token of the mobile terminal 20aa. The system A returns (transmits) the access token. The access token includes authorization of the user. The access processes in steps S2 to S5 comply with the OAuth 2.0; however, the access processes in steps S2 to S5 are not necessarily in compliance with the OAuth 2.0 in this embodiment. In this embodiment, the text chat management system $50_2$ may simply be able to acquire the system ID of the system A. In step S5.2, the other system linking part 59 of the text chat management system $50_2$ requests the system A to transmit a user profile of the user. Information specifying the mobile terminal 20aa is included in the redirection in step S5. In response, the system A returns (transmits) the user profile at least including the system ID. According to this process, the system A may be able to specify the user who has logged into the text chat management system $50_2$. In step S5.3, the ID acquisition part 62 of the text chat management system $50_2$ reads the user ID associated with the system ID acquired in step S5.2 from the authentication management table of the authentication management DB 3005. As described above, the users who has previously had the system ID logs into the text chat management system $50_2$ via the system A. Further, the manager or the like associates the user ID with the communications ID in the ID information registration table. In the above-described process, the process of logging into the text chat management system $50_2$ is completed, and a successful login is reported to the mobile terminal 20aa. Accordingly, the display device 203 of the mobile terminal 20aa displays the destination list display screen 7000 illustrated in FIG. 19.

In step S6, subsequent processes are similar to those of the login process by utilizing the user ID. The mobile terminal 20aa transmits the start request information to the text chat management system $50_2$. This start request information corresponds to the above-described start request information in step S1814 illustrated with reference to FIG. 18. In step S7, the mobile terminal 20aa performs text chat with the user of the destination terminal. In step S8, the user of the mobile terminal 20aa requests holding the TV conference with the mobile terminal 20ab having the user name "Ryu" by simply pressing the TV conference start button 6003 of the text chat screen 6000. This TV conference request includes the respective user IDs (02AA and 02AB) of the request source terminal and the destination terminal. In step S8.1, the ID acquisition part 62 of the text chat management system $50_2$ searches the ID information registration DB 3004 by the respective user IDs (02AA and 02AB) of the request source terminal and the destination terminal transmitted with the TV conference request. As a search result, the respective communications IDs (02aa and 02ab) of the request source terminal and the destination terminal are acquired.

In step S8.2, the text/TV invoking part text 58 of the text chat management system $50_2$ transmits a TV conference start request to the TV conference management system $50_1$. This TV conference start request includes the respective communications IDs of the request source terminal and the destination terminal, and the transmission of this TV conference start request corresponds to the transmission of the start request information in step S42 illustrated in FIG. 17. Accordingly, the mobile terminal 20aa and the mobile terminal 20ab may be able to start the TV conference as illustrated in FIG. 17.

As described above, the user of the mobile terminal 20aa is not only able to log into the text chat management system $50_2$ but also to conduct the TV conference by utilizing the capability of logging into the system A. As a result, the user may be able to user the TV conference service without having to input the communications ID or without being aware of the communications ID.

Logging into TV Conference Management System Using System ID

In the example in FIG. 26, the mobile terminal 20aa has logged into the text chat management system $50_2$ by logging into the system A; however, the mobile terminal 20aa may log into the TV conference management system $50_1$ by logging into the system A.

In this case, as illustrated in FIG. 28, the communications IDs are registered in association with the passwords and the system IDs in the authentication management table. FIG. 28 is a diagram illustrating an example of an authentication management table registering the system IDs of other systems. Such an authentication management table may be created by the same process as the process of creating the authentication management table of FIG. 25A; however, the communications IDs and the passwords need to be registered in advance in the authentication management table since the TV conference management system 501 is unable to optionally allocate the communications IDs (because the communications IDs are provided by licenses). Hence, the user of the number 9 in FIG. 25A will not be in the authentication management table in FIG. 28. Note that the user of the number 9 in FIG. 25A may be included in the authentication management table in FIG. 28 during a trial period or the like where the communications IDs are distributed for free.

Figure 29:
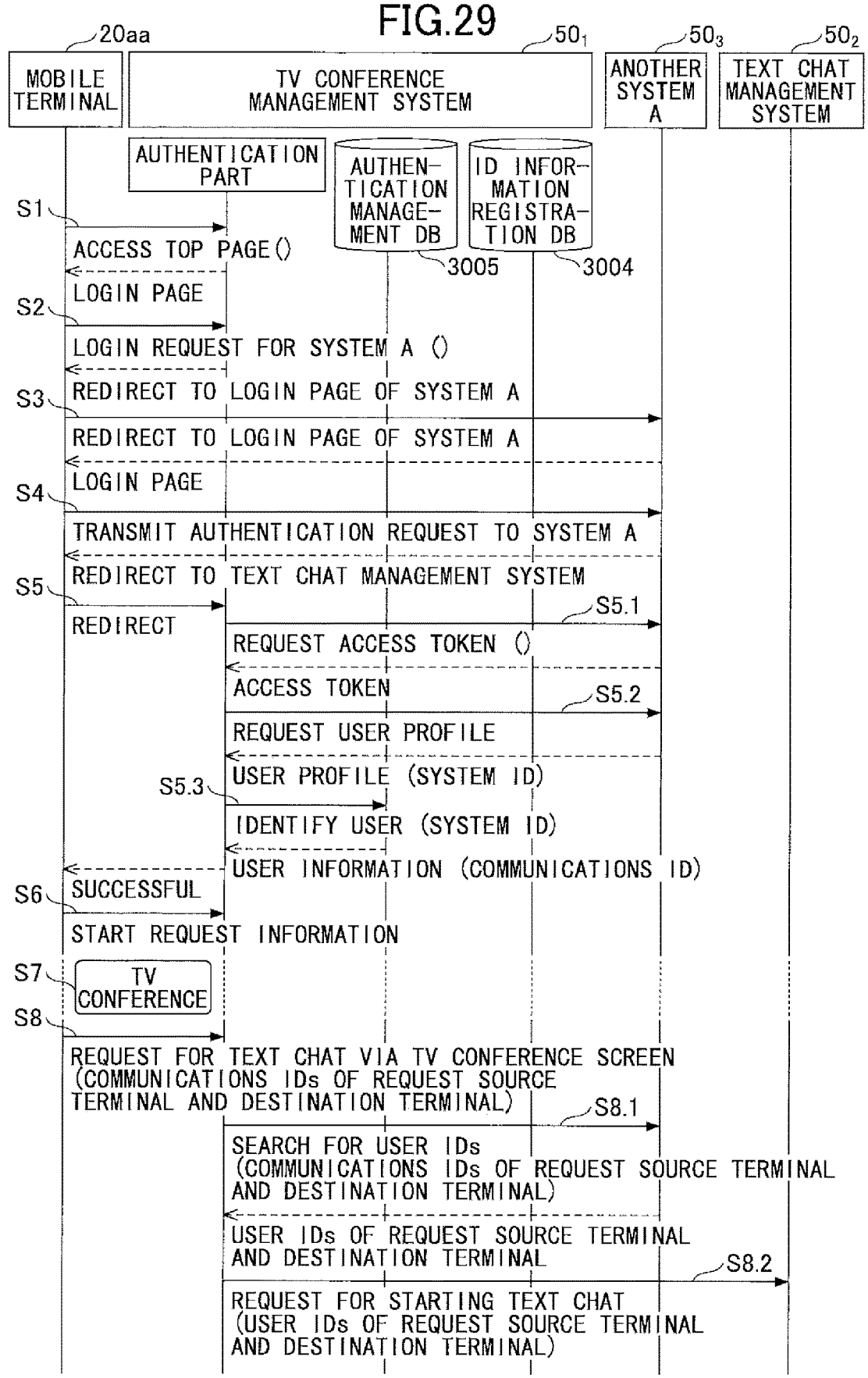
FIG. 29 is a sequence diagram illustrating an example of a process of logging into the TV conference management system by utilizing the authentication management table registering the system IDs of other systems.

FIG. 29 is a sequence diagram illustrating an example of a process of logging into the TV conference management system $50_1$ by utilizing the authentication management table registering the system IDs of another system $50_3$. The process of FIG. 29 is similar to that of FIG. 26, and hence, the difference between the two is mainly described. In step S1, the user operates the mobile terminal 20*aa* to access a top page of the TV conference management system 50$_1$. The display device 203 of the mobile terminal 20*aa* displays a login page of the TV conference management system 50$_1$ similar to that illustrated in FIG. 23.

In step S2, the user presses a login button 5004 in the system 50$_3$. As a result, the mobile terminal 20*aa* transmits a login request via another system A to the TV conference management system 50$_1$. In response, the other system linking part 59 of the TV conference management system 50$_1$ redirects the mobile terminal 20*aa* to a login page of the system A. In step S3, the mobile terminal 20*aa* is redirected to the login page of the system A. That is, the display of the mobile terminal 20*aa* moves to the login page of the system A. As a result, the display device 203 of the mobile terminal 20*aa* displays a login screen 7000 of the system A similar to that illustrated in FIG. 27. When the user presses the linking application authentication button 7003, the system A is requested to authenticate the system ID. In step S4, the mobile terminal 20*aa* transmits the authentication request to the system A. In response, the system A authenticates the user, and requests the TV conference management system 50$_1$ to redirect the mobile terminal 20*aa*. The TV conference management system 50$_1$ may be able to acquire the system ID from the system A by the establishment of the authentication. In step S5, the mobile terminal 20*aa* is redirected to the TV conference management system 50$_1$. In step S5.1, the other system linking part 59 of the TV conference management system 50$_1$ requests the system A to transmit an access token of the mobile terminal 20*aa*. The system A returns (transmits) the access token. In step S5.2, the other system linking part 59 of the TV conference management system 50$_1$ requests the system A to transmit a user profile of the user. In response, the system A returns (transmits) the user profile at least including the system ID. According to this process, the system A may be able to specify the user who has logged into the TV conference management system 50$_1$. In step S5.3, the ID acquisition part 6.2 reads the communications ID (02*aa*) associated with the system ID in step S5.2 from the authentication management table. In the above-described process, the process of logging into the TV conference management system 50$_1$ is completed, and a successful login is reported to the mobile terminal 20*aa*. In step S6, subsequent processes are similar to those of the login process by utilizing the user ID. The mobile terminal 20*aa* transmits the start request information to the TV conference management system 50$_1$. This start request information corresponds to the above-described start request information in step S42 illustrated with reference to FIG. 17.

In step S7, the mobile terminal 20*aa* performs a TV conference with the user of the destination terminal. In step S8, when the user performs operations to start text chat via the TV conference screen, the mobile terminal 20*aa* requests the TV conference management system 50$_1$ to hold a TV conference with the user of the destination terminal. This TV conference request includes the respective communications IDs (02*aa* and 02*ab*) of the request source terminal and the destination terminal. In step S8.1, the ID acquisition part 62 of the TV conference management system 50$_1$ searches the ID information registration DB 3004 by the respective communications IDs (02*aa* and 02*ab*) of the request source terminal and the destination terminal transmitted with the TV conference request. As a search result, the respective user IDs (02AA and 02AB) of the request source terminal and the destination terminal are acquired. In step S8.2, the text/TV invoking part text 58 of the TV conference man-agement system 50$_1$ transmits a text chat start request to the text chat management system 50$_2$. This text chat start request corresponds to the start request information illustrated in step S1814 of FIG. 18, and includes the respective user IDs (02AA and 02AB) of the request source terminal and the destination terminal. Hence, the text chat may be started as illustrated in FIG. 18.

As described above, the user of the mobile terminal 20*aa* is not only able to log into the TV conference management system 50$_1$ but also to conduct the text chat by utilizing the capability of logging into the system A. Accordingly, the user may be able to start the TV conference even though the text chat is initially started before the TV conference, or may be able to start the text chat even though the TV conference is initially started before the text chat without inputting the ID and password second time.

Authorization from Destination Terminal

In the TV conference management system or the text chat system, the user may need to be authorized in advance in order for the user to communicate with a partner. This process may prevent the user from being contacted by unknown users and requested to perform the TV conference or the text chat. Specifically, when Mr. A desires to perform communications with Ms. B, Mr. A transmits an authorization request to Ms. B. When Ms. B authorizes Mr. A, Ms. B is registered in an address book of Mr. A, which enables Mr. A to transmit a TV conference request or text chat request to Ms. B.

In the above case, when Mr. A transmits the TV conference request to Ms. B, whether Ms. B is registered in Mr. A's destination list management table of the TV conference management system 50$_1$ is not verified.

However, in order to limit the users who are allowed to transmit the TV conference request to Ms. B, it may be preferable to verify whether Ms. B is registered in Mr. A's destination list management table of the TV conference management system 50$_1$ before Mr. A and Ms. B utilize the text chat service and Mr. A transmits the TV conference request to Ms. B. In the following, a description is given of a process of such a verification.

Figure 30:
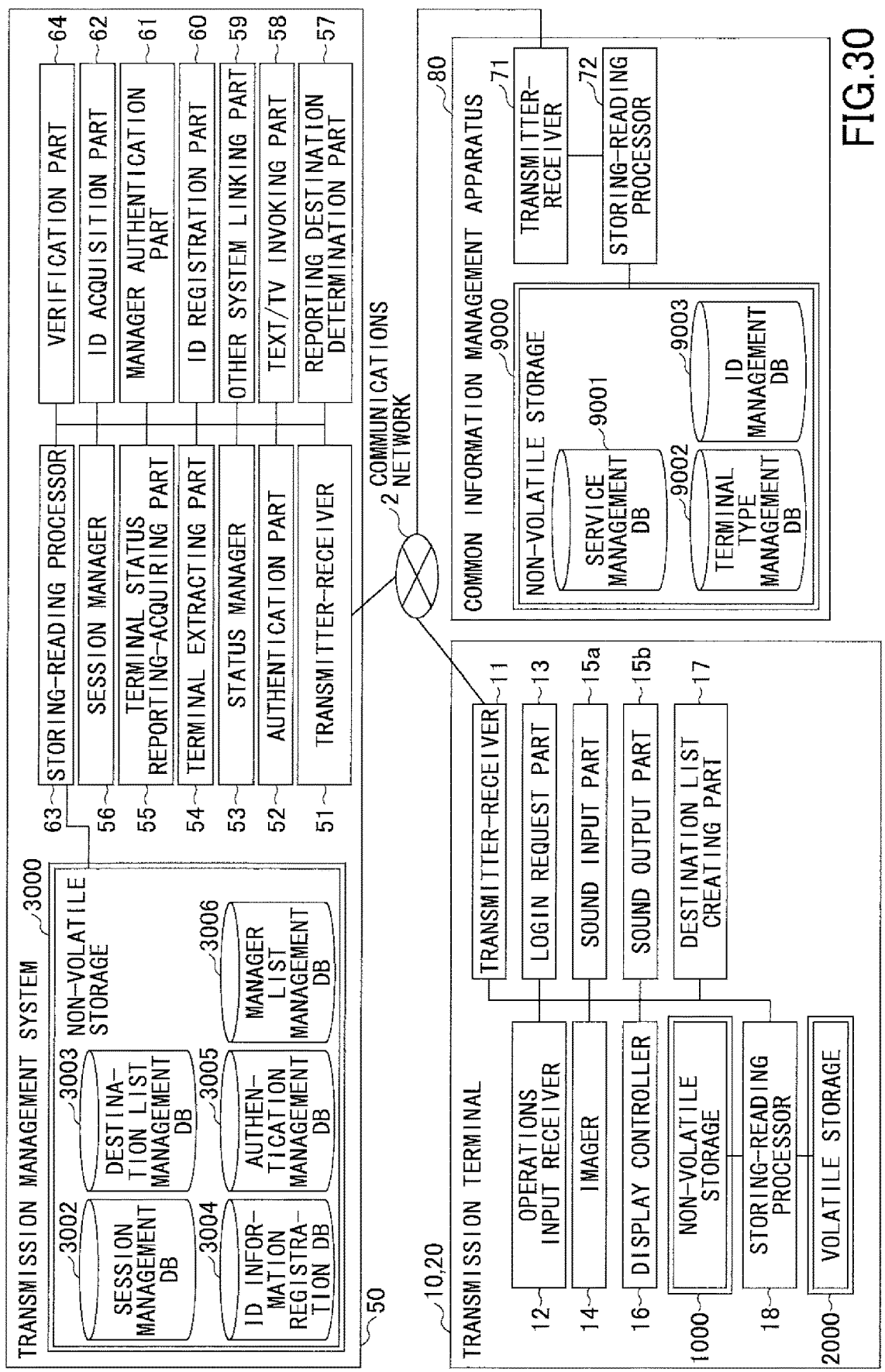
FIG. 30 is a functional block diagram illustrating examples of a transmission management system and a transmission terminal.

FIG. 30 is a functional block diagram illustrating examples of the transmission management system 50 and the transmission terminal 10 in the transmission system according to an embodiment. In the transmission system according to the embodiment in FIG. 30, components that are provided with the same reference numbers as those of the transmission system in FIG. 5 implement the same functional components. Hence, main components of this embodiment may be described below.

The transmission management system 50 in FIG. 30 includes a verification part 64. The verification part 64 of the transmission management system 50 illustrated in FIG. 30 is implemented by instructions from the CPU 301 illustrated in FIG. 4, and is configured to verify whether the communications ID of the destination terminal is registered in association with the communications ID of the request source terminal in the destination list management table. The verification part 64 is an example of a determination part.

This destination list management table corresponds to the address book. Note that an illustration is given of the destination list management table differing from that of FIG. 7 for convenience of illustration.

FIG. 31 illustrates another example of the destination list management table. The TV conference management system 50$_1$ includes the destination list management table illustrated in FIG. 30 in the destination list management DB 3003. In this destination list management table, the communications IDs (02*ab*, 02*ba*, 02*bb*, 02*cb*, 02*da*, 02*db*, etc.) are associated with the communications ID (02*aa*). Hence, according the destination list management table in FIG. 30, the user of the communications ID (02*aa*) is allowed to transmit the TV conference start request only to the communications IDs (02*ab*, 02*ba*, 02*bb*, 02*cb*, 02*da*, 02*db*, etc.) to.

Figure 32:
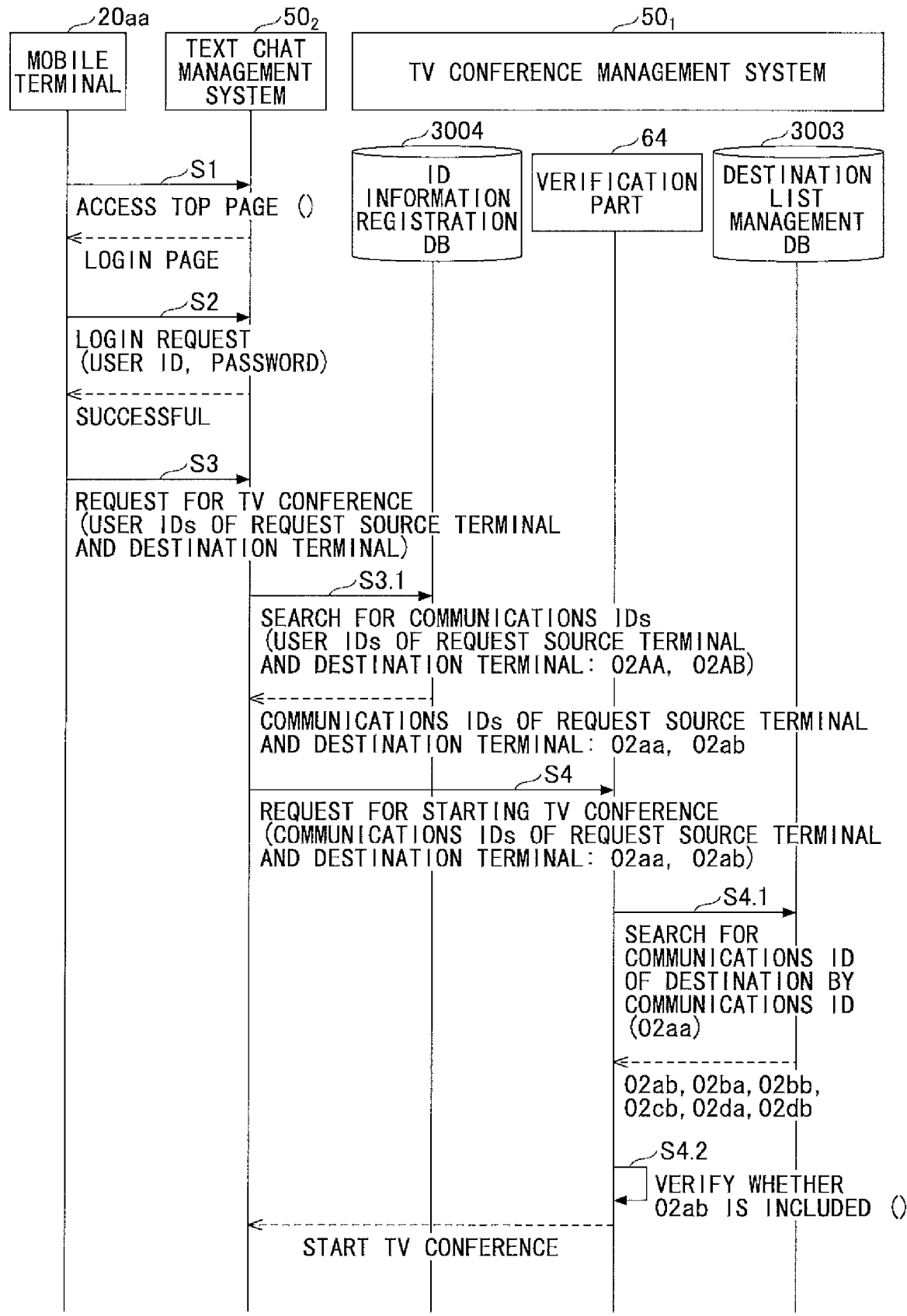
FIG. 32 is a sequence diagram illustrating a process in which the TV conference management system verifies whether the destination terminal is registered in the destination list management table of the request source terminal.

FIG. 32 is a sequence diagram illustrating a process in which the TV conference management system $50_1$ verifies whether the destination terminal is registered in the destination list management table of the request source terminal. When the destination terminal is not registered in the destination list management table of the request source terminal, the TV conference management system $50_1$ does not allow the user of the request source terminal to start the TV conference. Accordingly, when the user transmits the TV conference start request, the text chat management system $50_2$ verifies the communications ID of the destination terminal is registered in association with the communications ID of the request source terminal in the destination list management table in the TV conference management system $50_1$.

The processes in steps S1 and S2 are the same as those described in FIG. 22. In step S3, the mobile terminal 20*aa* transmits the start request information illustrated in step S1814 of FIG. 18 to the the text chat management system $50_2$ by the user's selection of the destination terminal. The start request information includes the respective user IDs (02AA and 02AB) of the request source terminal and the destination terminal.

In step S3.1, the ID acquisition part 62 of the text chat management system $50_2$ transmits the communications ID presence/absence determination to the TV conference management system $50_1$ using the user ID included in the start request information. The storing-reading processor 63 of the TV conference management system $50_1$ reads the respective communications IDs (02*aa* and 02*ab*) in association with the user IDs (02AA and 02AB) of the request source terminal and the destination terminal from the ID information registration DB 3004. As a result, the ID acquisition part 62 of the text chat management system $50_2$ may be able to acquire the respective communications IDs (02*aa* and 02*ab*) in association with the user IDs (02AA and 02AB).

In step S4, the text/TV invoking part 58 of the text chat management system $50_2$ transmits the TV conference start request with the communications IDs (02*aa* and 02*ab*) acquired in step S3.1 to the TV conference management system $50_1$.

In step S4.1, the verification part 64 of the TV conference management system $50_1$ reads the communications IDs (02*ab*, 02*ba*, 02*bb*, 02*cb*, 02*da*, and 02*db*) in association with the communications ID (02*aa*) from the destination list management table in FIG. 31.

In step S4.2, the verification part 64 determines whether the communications ID (02*ab*) is included in the communications IDs read in step 4.1. Since the communications ID (02*ab*) is included in the communications IDs read in step 4.1, the verification result indicates a successful verification result.

The TV conference management system $50_1$ reports indication to start the TV conference to the text chat management system $50_2$. That is, the TV conference starts based on the assumption of the TV conference management system $50_1$ having acquired the start request information in a manner similar to step S8 in FIG. 22.

Figure 33:
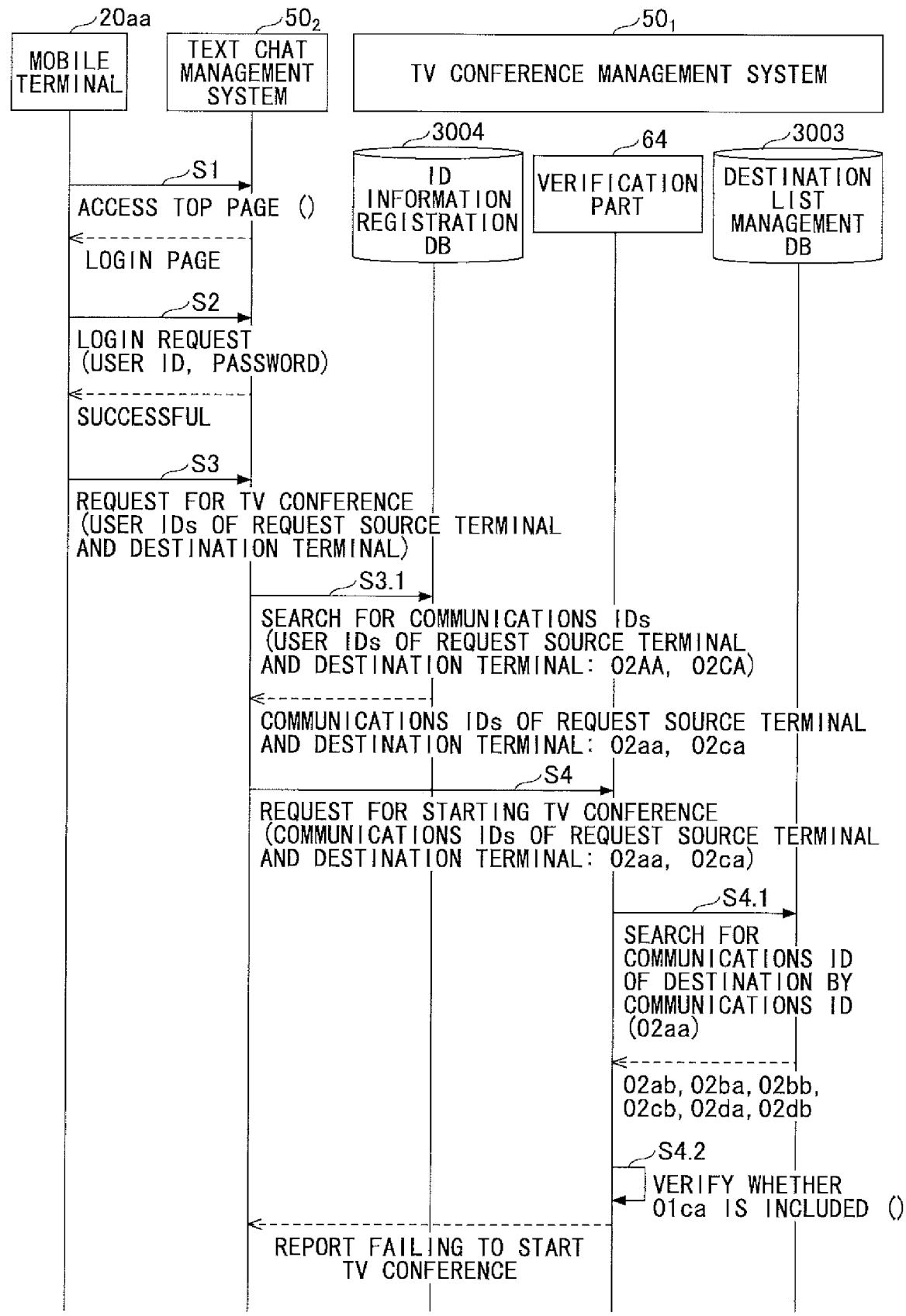
FIG. 33 is a sequence diagram illustrating a process in which the TV conference management system verifies whether the destination terminal is registered in the destination list management table of the request source terminal.

FIG. 33 is a sequence diagram illustrating a process in which the TV conference management system $50_1$ verifies whether the destination terminal is registered in the destination list management table of the request source terminal. The process in FIG. 33 describes an example of the verification being failed, differing from the process in FIG. 32.

In step S3.1, the ID acquisition part 62 of the text chat system $50_2$ transmits the communications ID presence/absence determination to the TV conference management system $50_1$ using the user ID included in the start request information. As a result, the ID acquisition part 62 of the text chat system $50_2$ may be able to acquire the respective communications IDs (02*aa* and 02*ca*) in association with the user IDs (02AA and 02CA).

In step S4, the text/TV invoking part 58 of the text chat management system $50_2$ transmits the TV conference start request with the communications IDs (02*aa* and 02*ca*) acquired in step S3.1 to the TV conference management system $50_1$.

In step S4.1, the verification part 64 of the TV conference management system $50_1$ reads the communications IDs (02*ab*, 02*ba*, 02*bb*, 02*cb*, 02*da*, and 02*db*) in association with the communications ID (02*aa*) from the destination list management table in FIG. 31. In step S4.2, the verification part 64 determines whether the communications ID (02*ca*) is included in the communications IDs read in step 4.1. Since the communications ID (02*ca*) is not included in the communications IDs read in step 4.1, the verification result indicates a failed verification result.

In this case, the TV conference management system $50_1$ transmits indication of the TV conference being unable to start to the text chat management system $50_2$. That is, since the communications ID (02*ca*) is not registered in association with the communications ID (02*aa*) in the destination list management table of the TV conference management system $50_1$, the TV conference fails to start.

Figure 34:
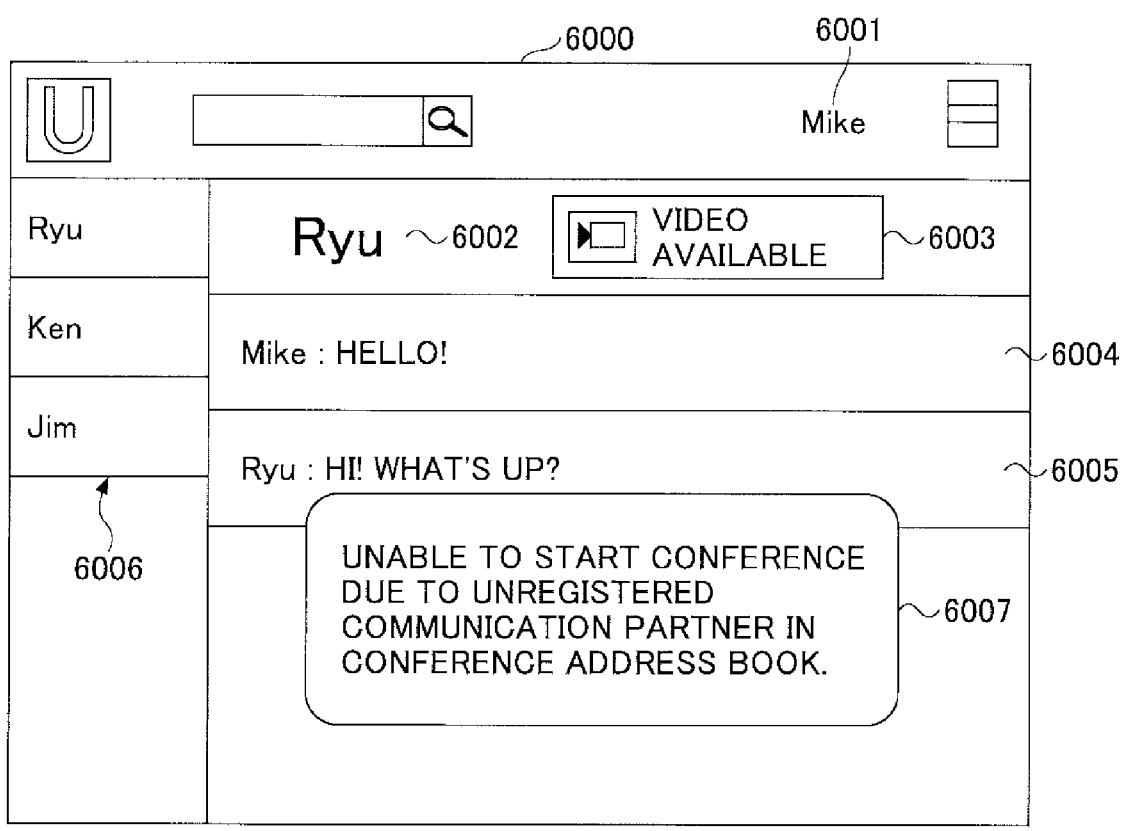
FIG. 34 is a diagram illustrating an example of a text chat screen.

The indication of the TV conference being unable to start is transmitted from the text chat management system $50_2$ to the mobile terminal 20*aa*. The mobile terminal 20 displays a message such as that illustrated in FIG. 34 on the text chat screen 6000. As illustrated in FIG. 34, the text chat screen 6000 displays a message 6007 indicating "unable to start conference due to unregistered communication partner in conference service address book". By the presentation of such a message, the user acknowledges the reason why the TV conference is unable to start.

As described above, since the registration status of the destination list management table is verified when the TV conference management system $50_1$ and the text chat management system $50_2$ are linked, the communications method performed in the transmission system 1 according to the embodiment may be able to link the two systems while maintaining security.

Preferred Modification

The preferred embodiments and examples are described above; however, the present invention is not limited to those embodiments and examples. Various alteration and modification may be made within the scope without departing from the gist of the present invention.

For example, various types of databases included in the common information management apparatus 80 may be held by the transmission system 50.

Further, in the above embodiments, the TV conference management system $50_1$ includes the ID information registration DB 3004. However, the text chat management system $50_2$ or the common information management apparatus 80 may include the ID information registration DB 3004. Further, the nonvolatile storages 3000, 1000, and 9000 may be located anywhere insofar as the nonvolatile storages 3000, 1000, and 9000 are accessible by the common information management apparatus 80 via the communications network 2.

In addition, there may be multiple TV conference management systems $50_1$ and multiple text chat management systems $50_2$ in the transmission system 1. Moreover, some functional components of the multiple TV conference management systems $50_1$ and functional components of the multiple text chat management systems $50_2$ may be held by different apparatuses.

Further, the transmission system 1 according to the above described embodiments is illustrated by giving the examples of the TV conference system and the text chat system; however, a combination of any of a telephony system, an SNS (social network service), and an electronic mail system may be applied to the transmission system 1.

In addition, the embodiments illustrate an example of seamless login from the text chat system to the TV conference system; however, the seamless login may be implemented from the text chat system to a telephony system.

According to the embodiments and modification, there is provided an information processing apparatus enabling the terminal to utilize services of the difference systems.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general-purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is not limited to the specifically disclosed embodiments, and variations and modifications may be made without departing from the scope of the present invention.

The present application is based on and claims the benefit of priority of Japanese Priority Application No. 2014-206230 filed on Oct. 7, 2014, and Japanese Priority Application No. 2015-146952 filed on Jul. 24, 2015, the entire contents of which are hereby incorporated herein by reference.

What is claimed is:

1. A text chat management system connected via a network to a video conference management system, the video conference management system providing a video conference service, the text chat management system providing a text chat service, the text chat management system comprising:
    processing circuitry configured to:
        register, in a memory, a communication ID authenticated by the video conference management system in association with a corresponding user ID managed in the text chat service;
        establish a communication connection for providing the text chat service that transmits first content data between a first transmission terminal specified based on a first user ID and a second transmission terminal specified based on a second user ID;
        receive, from the first transmission terminal, a start request to start the video conference service in which users participating in a text chat can participate, in response to an operation input to a video conference start button displayed on a screen of the text chat in which at least the first user and a second user identified by the second user ID participate, and wherein the video conference start button is displayed based on the association between the communication ID and the corresponding user ID registered in the memory; and
        request the video conference management system to start the video conference service based on the operation input to the video conference start button.

2. The text chat management system of claim 1, wherein the communication ID registered in the memory is identification information used for authentication when the first user logs into the video conference management system.

3. The text chat management system of claim 1, wherein the screen of the text chat service includes a user name of the first user, a user name of the second user, and a chat display field in which text is displayed.

4. The text chat management system of claim 1, wherein the processing circuitry is further configured to, in response to the start request, acquire a particular communication ID from the memory.

5. The text chat management system of claim 1, wherein the video conference start button is displayed in response to determining that a second communication ID is registered in association with the second user ID in the memory.

6. The text chat management system of claim 1, wherein the text chat service is different from the video conference service.

7. The text chat management system of claim 1, wherein the processing circuitry is further configured to establish the communication connection for providing the text chat service, which transmits the first content data including at least text data.

8. The text chat management system of claim 1, wherein the processing circuitry is further configured to receive the start request to start the videoconference with a particular user identified by a particular user ID, which is displayed on the screen of the text chat service as a party to a text chat, in response to pressing of the video conference start button by the first user.

9. The text chat management system of claim 1, wherein the processing circuitry is configured to request the video conference management system to start the videoconference service, without the first user specifying a particular communication ID on the screen of the text chat service.

10. The text chat management system of claim 1, wherein the processing circuitry is further configured to receive the start request to start the video conference service with a particular user, when the particular user ID is registered in the memory in association with a particular communication ID of the particular user.

11. The text chat management system of claim 1, wherein the processing circuitry is further configured to establish the communication connection when authentication based on the first user ID transmitted from the first transmission terminal is established.

12. The text chat management system of claim 1, wherein the first content data includes at least text data.

13. The text chat management system of claim 1, wherein the memory is included in any one of the text chat management system, the video conference management system, and a network storage.

14. The text chat management system of claim 1, wherein the corresponding user ID is a user ID of a user participating in the text chat.

15. A method for starting a video conference service using a text chat management system connected via a network to a video conference management system, the video conference management system providing the video conference service, the text chat management system providing a text chat service, the method comprising:
   registering, in a memory, a communication ID authenticated by the video conference management system in association with a corresponding user ID managed in the text chat service;
   establishing a communication connection for providing the text chat service that transmits first content data between a first transmission terminal specified based on a first user ID and a second transmission terminal specified based on a second user ID;
   receiving, from the first transmission terminal, a start request to start the video conference service in which users participating in a text chat can participate, in response to an operation input to a video conference start button displayed on a screen of the text chat in which at least the first user and a second user identified by the second user ID participate, and wherein the video conference start button is displayed based on the association between the communication ID and the corresponding user ID registered in the memory; and
   requesting the video conference management system to start the video conference service based on the operation input to the video conference start button.

16. The method of claim 15, wherein the first communication ID registered in the memory is identification information used for authentication when the first user logs into the video conference management system.

17. The method of claim 15, wherein the screen of the text chat service includes a user name of the first user, a user name of the second user, and a chat display field in which text is displayed.

18. The method of claim 15, further comprising, in response to the start request, acquiring a particular communication ID from the memory.

19. The method of claim 15, wherein the first content data includes at least text data.

20. The method of claim 15, wherein the memory is included in any one of the text chat management system, the video conference management system, and a network storage.

21. The method of claim 15, wherein the corresponding user ID is a user ID of a user participating in the text chat.

22. A system, comprising:
   a text chat management system connected via a network to a video conference management system; and
   the video conference management system providing a video conference service, the text chat management system providing a text chat service,
   wherein the text chat management system includes processing circuitry configured to
      register, in a memory, a communication ID authenticated by the video conference management system in association with a corresponding user ID managed in the text chat service;
      establish a communication connection for providing the text chat service that transmits first content data between a first transmission terminal specified based on a first user ID and a second transmission terminal specified based on a second user ID;
      receive, from the first transmission terminal, a start request to start the video conference service in which users participating in a text chat can participate, in response to an operation input to a video conference start button displayed on a screen of the text chat in which at least the first user and a second user identified by the second user ID participate, and wherein the video conference start button is displayed based on the association between the communication ID and the corresponding user ID registered in the memory; and
      request the video conference management system to start the video conference service based on the operation input to the video conference start button.

* * * * *